US012632187B2

(12) United States Patent
Otsuka

(10) Patent No.: US 12,632,187 B2
(45) Date of Patent: May 19, 2026

(54) MEMORY CIRCUIT

(71) Applicant: Socionext Inc., Kanagawa (JP)

(72) Inventor: Tatsushi Otsuka, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 106 days.

(21) Appl. No.: 18/663,727

(22) Filed: May 14, 2024

(65) Prior Publication Data

US 2024/0295973 A1 Sep. 5, 2024

Related U.S. Application Data

(63) Continuation of application No. PCT/JP2021/042634, filed on Nov. 19, 2021.

(51) Int. Cl.
*G06F 12/00* (2006.01)
*G06F 3/06* (2006.01)

(52) U.S. Cl.
CPC .......... *G06F 3/0625* (2013.01); *G06F 3/0659* (2013.01); *G06F 3/0683* (2013.01)

(58) Field of Classification Search
CPC ....... G06F 3/061; G06F 3/0659; G06F 3/0673
USPC ........................................ 711/154
See application file for complete search history.

(56) References Cited

U.S. PATENT DOCUMENTS

2006/0047899 A1 3/2006 Ilda et al.
2013/0170298 A1* 7/2013 Kim .......................... G11C 7/10
365/185.11

2017/0220094 A1 8/2017 Ozawa
2017/0289377 A1 10/2017 Goda et al.
2020/0213464 A1* 7/2020 Nakamura .............. G06F 13/18

FOREIGN PATENT DOCUMENTS

JP 2006-065697 A 3/2006
JP 2010-501916 A 1/2010
JP 2017-138785 A 8/2017
JP 2017-184049 A 10/2017
(Continued)

OTHER PUBLICATIONS

International Search Report dated Dec. 28, 2021 issued in International Patent Application No. PCT/JP2021/042634, with English translation.

(Continued)

*Primary Examiner* — Mohamed M Gebril
(74) *Attorney, Agent, or Firm* — Rimon P.C.

(57) ABSTRACT

A memory circuit includes memory groups each of which includes memory cells, and is configured to execute a write operation or a read operation in response to a request signal; memory group controllers each of which is provided for a corresponding one of the memory groups; and a first memory controller configured to output a request signal received from an outside to an adjacent memory group controller, wherein, in a case where an address signal included in the received request signal indicates the corresponding one of the memory groups, said each of the memory group controllers outputs the request signal to the corresponding one of the memory groups, and in a case where the address signal indicates a memory group other than the corresponding one of the memory groups, outputs the request signal to a memory group controller at a succeeding stage.

9 Claims, 34 Drawing Sheets

(56)        References Cited

FOREIGN PATENT DOCUMENTS

JP          2020-006605  A       1/2020

OTHER PUBLICATIONS

Written Opinion of the International Searching Authority dated Dec. 28, 2021 issued in International Patent Application No. PCT/JP2021/042634, with English translation of the relevant parts.
Notice of Reasons for Refusal dated Aug. 5, 2025 issued in the corresponding Japanese Patent Application No. 2023-562054, with English translation.
Decision of Refusal issued in the corresponding Japanese patent application No. 2023-562054, mailed on Nov. 18, 2025.

* cited by examiner

Figure 12:
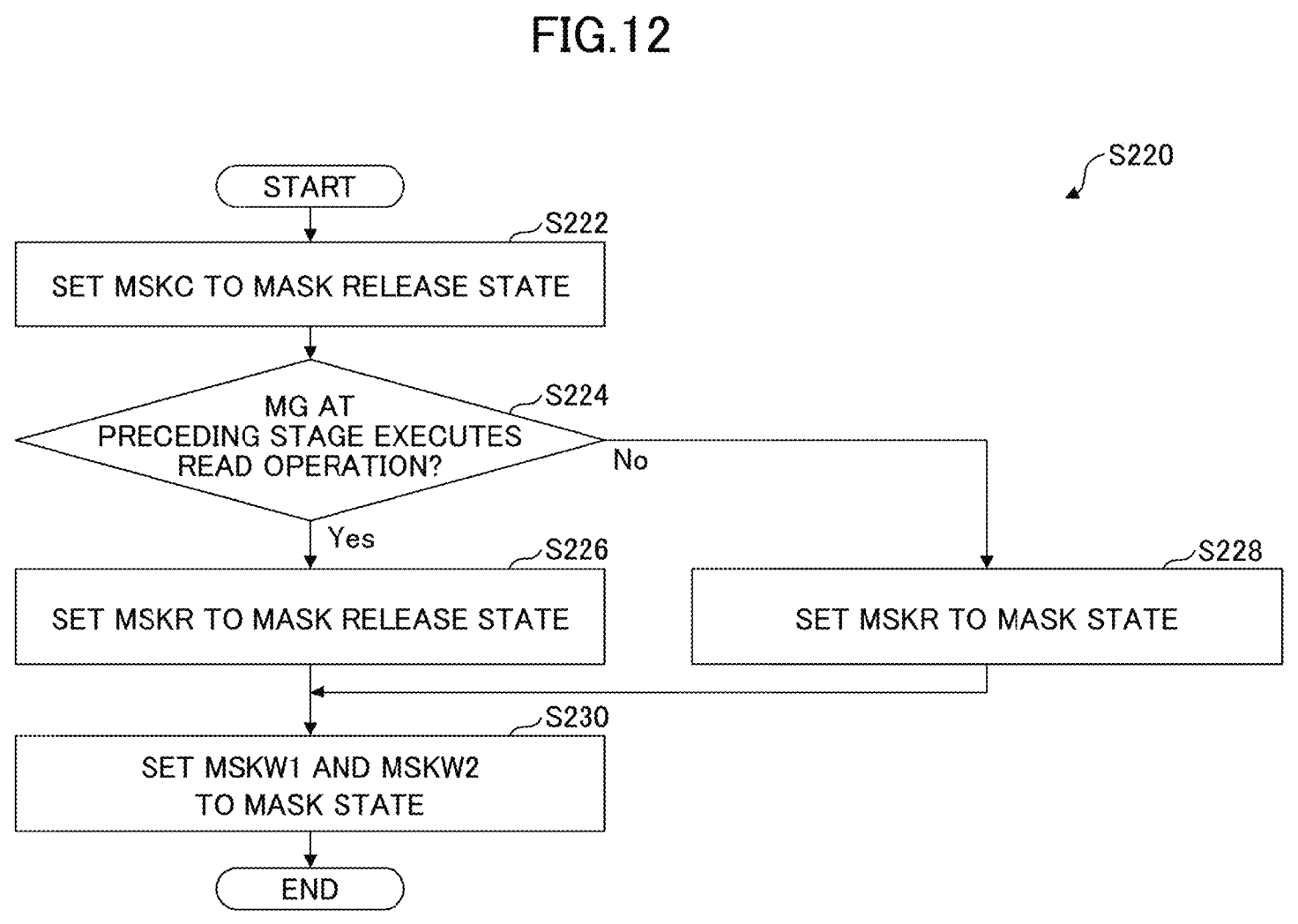

START

S222

SET MSKC TO MASK RELEASE STATE

S224

MG AT PRECEDING STAGE EXECUTES READ OPERATION?

No

Yes

S228

SET MSKR TO MASK STATE

S226

SET MSKR TO MASK RELEASE STATE

S230

SET MSKW1 AND MSKW2 TO MASK STATE

END

FIG.15

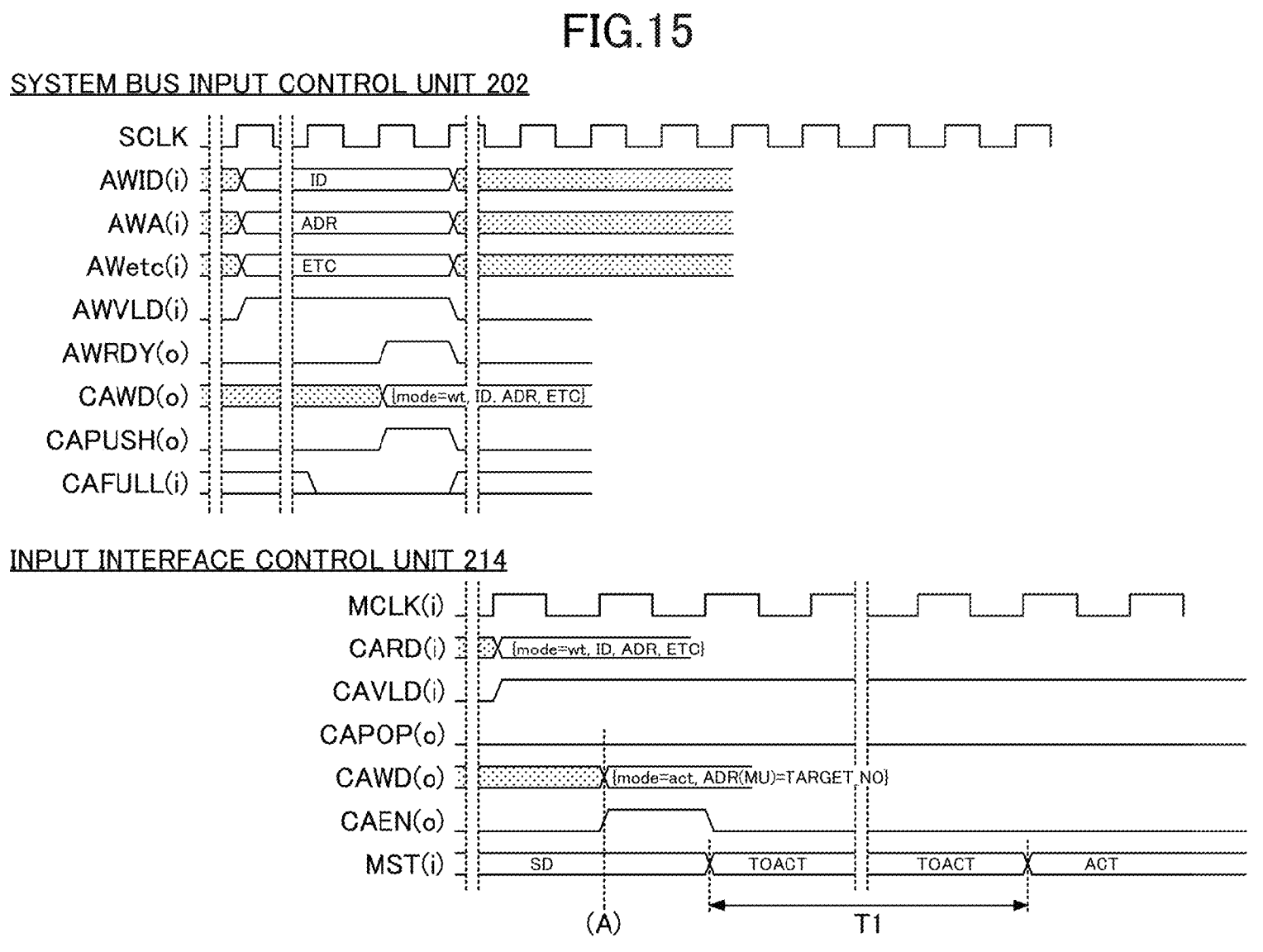

SYSTEM BUS INPUT CONTROL UNIT 202

SCLK

AWID(i)                ID

AWA(i)               ADR

AWetc(i)             ETC

AWVLD(i)

AWRDY(o)

CAWD(o)          {mode=wt, ID, ADR, ETC}

CAPUSH(o)

CAFULL(i)

INPUT INTERFACE CONTROL UNIT 214

MCLK(i)

CARD(i)          {mode=wt, ID, ADR, ETC}

CAVLD(i)

CAPOP(o)

CAWD(o)          {mode=act, ADR(MU)=TARGET_NO}

CAEN(o)

MST(i)          SD          TOACT          TOACT          ACT (A)          T1

SYSTEM BUS INPUT CONTROL UNIT 202

INPUT INTERFACE CONTROL UNIT 214

MEMORY GROUP CONTROL CIRCUITS MCNT40 AND MCNT41

OUTPUT INTERFACE CONTROL UNIT 220

SYSTEM BUS OUTPUT CONTROL UNIT 226

MEMORY CIRCUIT

CROSS-REFERENCE TO RELATED APPLICATIONS

This U.S. non-provisional application is a continuation application of and claims the benefit of priority under 35 U.S.C. § 365 (c) from PCT International Application PCT/JP2021/042634 filed on Nov. 19, 2021, which is designated the U.S., the entire contents of which are incorporated herein by reference.

TECHNICAL FIELD

The present disclosure relates to a memory circuit.

BACKGROUND ART

In an image processing device that includes SRAMs (Static Random Access Memories), a technique has been known in which the SRAMs are divided into multiple groups that can be switched between a low-power mode and a normal mode, and encoded image data is stored in one of the groups. The image processing device reduces the power consumption by switching only the group storing the encoded image data from the low-power mode to the normal mode (see, e.g., Patent Document 1).

RELATED ART DOCUMENTS

Patent Documents

[Patent Document 1] Japanese Laid-Open Patent Application No. 2020-6605

Meanwhile, a semiconductor device such as a system LSI (Large-Scale Integration) that processes video data may have, for example, a memory circuit such as a frame memory that stores the video data in units of frames. As the size of one frame of the video data increases, the memory capacity to be used increases, and the size of the memory circuit installed in the system LSI increases. Accordingly, the power consumption of the memory circuit increases, bus interconnects and the like in the memory circuit become longer, and thereby, the access time of the memory circuit increases.

SUMMARY

According to one aspect of the present disclosure, a memory circuit includes a plurality of memory groups each of which includes a plurality of memory cells, and is configured to execute a write operation or a read operation in response to a request signal; a plurality of memory group controllers each of which is provided for a corresponding one of the plurality of memory groups; and a first memory controller configured to output a request signal received from an outside to an adjacent memory group controller, wherein, in a case where an address signal included in the received request signal indicates the corresponding one of the memory groups, said each of the plurality of memory group controllers outputs the request signal to the corresponding one of the memory groups, and in a case where the address signal indicates a memory group other than the corresponding one of the memory groups, outputs the request signal to a memory group controller at a succeeding stage.

BRIEF DESCRIPTION OF DRAWINGS

FIG. 3 is a block diagram illustrating an example of a configuration of a memory block in FIG. 1;

FIG. 5 is a block diagram illustrating an example of a configuration of a memory unit in FIG. 4;

FIG. 12 is a flow chart illustrating an example of Step S220 in FIG. 11;

FIG. 15 is a timing chart illustrating an example of timing of signals upon transitioning to the active mode in FIG. 14;

DETAILED DESCRIPTION

In the following, embodiments will be described with reference to the drawings. According to the disclosed techniques, increase in power consumption can be suppressed while suppressing increase in access time in an SRAM.

In the following, for a signal line through which information on a signal or the like is transmitted, the same reference symbol as the signal name is used. In addition, although a signal line designated by a thick line is constituted with multiple bits, in some cases, a signal line indicated by a thin line is constituted with multiple bits.

Figure 1:
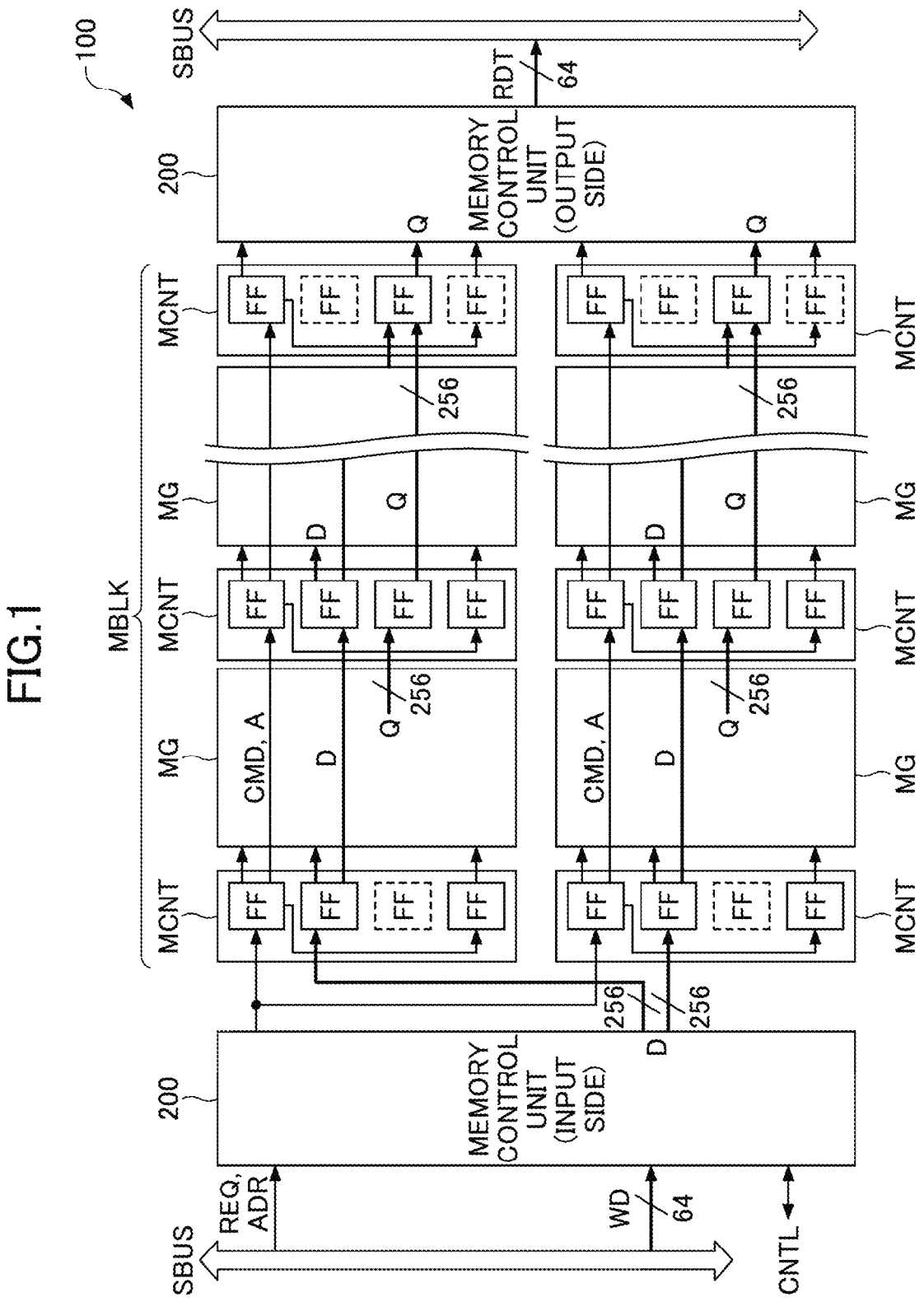
FIG. 1 is a block diagram illustrating an example of a memory circuit according to a first embodiment.

FIG. 1 illustrates an example of a memory circuit according to a first embodiment. A memory circuit 100 illustrated in FIG. 1 is installed in a semiconductor device such as a system LSI that processes image data. For example, a semiconductor device that includes the memory circuit 100 is installed in an imaging device such as a monitoring camera, a head-mount device such as AR/VR (Augmented Reality/Virtual Reality) glasses, a digital camera, or the like, to generate moving image data to be displayed on a display device.

The memory circuit 100 includes a memory block MBLK, a memory control unit 200 (on the input side) connected to the input side of the memory block MBLK, and a memory control unit 200 (on the output side) connected to the output side of the memory block MBLK. The memory control unit 200 (on the input side) is an example of a first memory controller, and the memory control unit 200 (on the output side) is an example of a second memory controller. In the following, in the case where the memory control units 200 (on the input side) and 200 (on the output side) are described without distinction, these units are referred to as the memory control unit(s) 200.

The memory block MBLK includes multiple memory groups MG arranged in one direction each of which includes multiple memory cells, and multiple memory group control units MCNT arranged on the input side of respective signals of the multiple memory groups MG. The memory group control unit MCNT is an example of a memory group controller. In addition, the memory block MBLK includes memory group control units MCNT arranged on the output side of signals of memory groups MG at the last stage. For example, each of the memory groups MG is arranged between a pair of memory group control units MCNT. In other words, the memory group control units MCNT and the memory groups MG are arranged alternately. The memory group control unit MCNT functions as an interface circuit for signals input and output between the memory control unit 200 and the memory group MG, or as an interface circuit for signals input and output between the memory group control units MCNT.

Each of the memory group control units MCNT includes flip-flops FF to receive an access request signal (a control signal CMD, an address signal A, etc.), a memory write data signal D, and a read data signal Q, respectively. In the case of receiving an access request signal for the memory group MG adjacent to the output side (hereafter, also referred to as the own memory group MG or the memory group MG to be managed), each of the memory group control units MCNT outputs the access request signal to the own memory group MG. In the following, a memory group control unit MCNT that outputs the access request signal to a focused memory group control unit MCNT is referred to as the memory group control unit MCNT at the preceding stage. A memory group control unit MCNT that receives the access request signal from the focused memory group control unit MCNT is referred to as the memory group control unit MCNT at the succeeding stage.

In this case, except for signals used by the memory group control unit MCNT at the last stage, each of the memory group control units MCNT suppresses output of the access request signal to the memory group control unit MCNT at the succeeding stage. The memory group control unit MCNT at the succeeding stage is a memory group control unit MCNT located on the memory control unit 200 side (on the output side) across one memory group MG with respect to the focused memory group control unit MCNT.

In addition, in the case of receiving an access request signal for a memory group MG other than the own memory group MG, each of the memory group control units MCNT transfers the access request signal to the memory group control unit MCNT at the succeeding stage. In this case, each of the memory group control units MCNT suppresses output of the access request signal to the own memory group MG.

Each of the memory group control units MCNT transfers, upon a read operation, a memory read data signal Q read from the own memory group MG or a memory read data signal Q transferred from the memory group control unit MCNT at the preceding stage to the memory group control unit MCNT at the succeeding stage.

In this way, access can be controlled for each of the memory groups MG by each of the memory group control units MCNT. A command line CMD, an address line A, a write data line D, and a read data line Q are not routed by a long distance across multiple memory groups MG, and thereby, increase in interconnect load can be suppressed. As a result, increase in power consumption can be suppressed while suppressing increase in access time of the memory circuit 100.

In addition, the respective numbers of clock cycles required for transfer of the access request signal, the memory write data signal D, and the memory read data signal Q between a pair of memory group control units MCNTs arranged on both sides of the memory group MG are set to be the same as each other. For example, the number of clock cycles required for transfer of a signal between a pair of memory group control units MCNTs arranged on both sides of the memory group MG is "1". A signal transferred between the memory group control units MCNTs is not affected by the load of the signal interconnect in the memory group MG (signal skew, etc.), and hence, the number of clock cycles required for transfer can always be the same regardless of the number of arranged memory groups MG.

Therefore, for example, in the case of adding a memory group MG between the memory control unit 200 (on the input side) and the memory control unit 200 (on the output side), the number of clock cycles may be increased in accordance with the number of added groups. Accordingly, also in the case where the number of memory groups MG is increased or decreased to newly design another memory circuit having a different memory capacity, timing design can also be easily performed. Note that in FIG. 1, the memory group control unit MCNT at the last stage adjacent to the memory control unit 200 (on the output side) does not include a memory group MG to be managed, but has a function of adjusting timing with respect to the memory control unit 200 (on the output side). The memory group control unit MCNT at the last stage without a memory group MG to be managed has a subset of the functions of the other memory group control units MCNT.

The memory control unit 200 is connected to a system bus SBUS of a semiconductor device and a peripheral bus for inputting and outputting various control signals CNTL. Although not limited in particular, the system bus SBUS may input and output, for example, signals based on AXI4 (Advanced eXtensible Interface 4, registered trademark of another company) of Arm Limited (registered trademark of said other company). The memory control unit 200 functions as an interface circuit between signals input to and output from the system bus SBUS and signals input to and output from the memory group control unit MCNT.

In FIG. 1, an example is illustrated in which two columns, each of which includes memory group control units MCNT and memory groups MG, are arranged between the memory control units 200 (on the input side) and the memory control units 200 (on the output side). However, the number of columns of the memory group control units MCNT and the memory groups MG simply needs to be one or more. In addition, the columns of the memory group control units MCNT and the memory groups MG may be arranged in a U-shape. In this case, the memory control unit 200 (on the input side) and the memory control unit 200 (on the output side) are arranged together at one end of the arrangement area of the memory group control units MCNT and the memory groups MG.

The memory control unit 200 (on the input side) receives a request signal REQ of a read operation, a write operation, or the like; an address signal ADR; a write data signal WD; and the like with respect to the memory circuit 100 from a higher-level controller such as a CPU (Central Processing Unit) via the system bus SBUS. The request signal REQ is an example of a request signal (access request signal) that causes the memory group MG to execute a write operation or a read operation, or a request signal that causes the memory group MG to change the operation mode. The access request signal is a write request signal or a read request signal. Note that in FIG. 1, only main information signal flows are illustrated for the sake of simplification of the figure. Although illustration is omitted, there are signals indicating additional information and the validity or invalidity of the respective signals, and control signals indicating a data output command, a data obtainment command, and the like.

The memory control unit 200 (on the input side) generates a control signal CMD that includes additional information for accessing a memory in the memory groups MG, based on a request signal REQ that includes an address signal ADR, a request ID or an access size, and the like. The memory control unit 200 (on the input side) outputs the generated control signal CMD to the memory group control unit MCNT at the first stage.

For example, the memory control unit 200 (on the input side) outputs a 512-bit memory write data signal D to the two memory group control units MCNT at the first stage in units of 256 bits every time in response to receiving 64-bit write data signals WD at most eight times. In other words, the memory control unit 200 (on the input side) converts N-bit (64 bits in this example) write data signals WD received from the system bus SBUS into an (N×M)-bit (in this example, M is '8') memory write data signal D, and causes the memory group MG to execute the write operation of the memory write data signal D. Depending on the address ADR or data size from the system bus SBUS, before receiving write data signals WD eight times, i.e., in the case of not all of the 512 bits of the memory write data signal D being valid data, only valid data is written to the memory circuit 100 according to mask information included in the control signal CMD and the like.

In addition, the memory control unit 200 (on the input side) receives a control signal CNTL that sets operational specifications of at least one of the memory group MG and the memory group control unit MCNT, via the peripheral bus. Further, the memory control unit 200 (on the input side) outputs the operational specifications of at least one of the memory group MG and the memory group control unit MCNT to the peripheral bus as a control signal CNTL. The peripheral bus is, for example, a slower interface as compared to the system bus SBUS.

The memory control unit 200 (on the output side) receives access control signals such as a command signal CMD, an address signal A, and the like from one of the two memory group control units MCNT at the last stage. The memory control unit 200 (on the output side) receives a memory read data signal Q from the two memory group control units MCNT at the last stage, and outputs a read data signal RDT to the system bus SBUS. For example, the memory control unit 200 (on the output side) outputs 64-bit read data signals RDT eight times, every time in response to receiving two 256-bit memory read data signals Q. In other words, the memory control unit 200 converts parallel memory read data signals Q read from the memory group MG into serial read data signals RDT, and outputs the converted signals to the system bus SBUS.

The 512-bit data input and output with respect to the memory block MBLK is eight times longer than the 64-bit data input and output with respect to the system bus SBUS. Therefore, the operating frequency of the memory block MBLK can ideally be set to $\frac{1}{8}$ of the operating frequency of the system bus SBUS. Therefore, compared with the case where 64-bit data is input and output with respect to the memory block MBLK, the power consumption of the memory block MBLK can be reduced. The operating frequency of the memory block MBLK can be reduced, and hence, the operating margin of the memory group control unit MCNT and the memory group MG can be set to have some room, and the timing design and the like of the circuit can be performed easily.

Note that the number of bits of data input and output with respect to the memory block MBLK is the number of bits of data input and output with respect to the system bus SBUS multiplied by two to the n-th power (where n is an integer greater than or equal to 1; in this example, n=3, i.e., 64×2^3=512).

Figure 2:
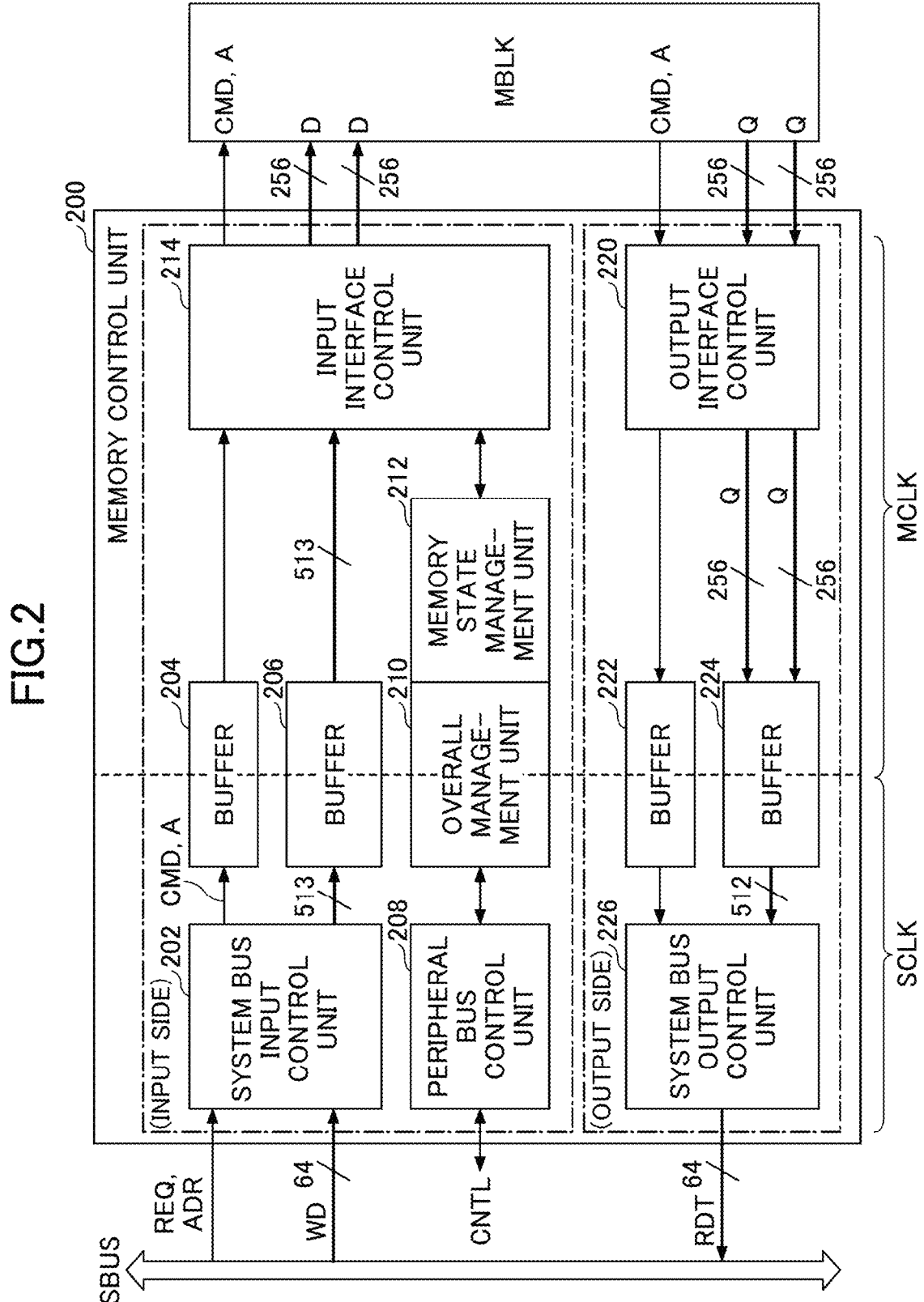
FIG. 2 is a block diagram illustrating an example of a memory control unit in FIG. 1.

FIG. 2 is a block diagram illustrating an example of the memory control unit 200 in FIG. 1. The memory control unit 200 (on the input side) includes a system bus input control unit 202, buffers 204 and 206, a peripheral bus control unit 208, an overall management unit 210, a memory state management unit 212, and an input interface control unit 214. The memory control unit 200 (on the output side) includes an output interface control unit 220, buffers 222 and 224, and a system bus output control unit 226.

The system bus input control unit 202 stores a command signal CMD that includes additional information for memory control, and an address signal A in the buffer 204 from an address signal ADR and a request signal REQ that includes information on a request ID, an access size, or the like received from the system bus SBUS, receives write data signals WD received from the system bus SBUS at most eight times, and stores a total of 513 bits of 512-bit data and one bit of additional information (Last information) (hereafter, explanation of the Last information will be omitted unless otherwise noted, and the total as 512 bits will be discussed) in the buffer 206.

The buffers 204 and 206 are, for example, FIFO (First-In First-Out) buffers. The buffer 204 outputs control signals CMD and address signals A to the input interface control unit 214, in the order of holding the signals in the buffer. The buffer 206 outputs write data signals WD to the input interface control unit 214, in the order of holding the data in the buffer. The buffer 204 outputs 512-bit memory write data signals WD to the input interface control unit 214.

The input interface control unit 214 waits until valid information is prepared in the buffer 204. Once the information in the buffer 204 becomes valid, the input interface control unit 214 confirms information on the address signal A, and in the case where the state of a memory area as the access target in the target memory block MBLK is not in the active state, executes a process of making the state of the target active. Once the state becomes active, the input interface control unit 214 confirms information on CMD in the buffer 204, and in the case of a read operation to the memory block MBLK, takes out the information in the buffer 204, and outputs the control signal CMD, the address A, and the like to the memory block MBLK, to cause the memory block MBLK to execute the read operation.

In the case where confirmation of the information on CMD in the buffer 204 indicates a write operation to the memory block MBLK, the input interface control unit 214 further waits until the information in the buffer 206 becomes valid. Once the information in the buffer 206 becomes valid, the input interface control unit 214 takes out information on D and the Last information, outputs the control signal CMD, the address A, and the like to cause the memory block MBLK to execute the write operation or the read operation, and outputs the write data signal WD as two 256-bit memory write data signals D to the memory block MBLK.

The peripheral bus control unit 208 outputs various control signals CNTL received from the peripheral bus to the overall management unit 210. In addition, the peripheral bus control unit 208 outputs various control signals CNTL received from the overall management unit 210 to the peripheral bus.

The overall management unit 210 includes multiple registers (not illustrated) for setting operational specifications including the operation mode and the like of the memory group MG (FIG. 1). The overall management unit 210 sets the registers in response to various control signals CNTL from the peripheral bus. For example, as operation modes, there are a shutdown mode, a sleep mode, and an active mode. For example, switching among the shutdown mode, the sleep mode, and the active mode is executed in units of columns of memory units MUC that will be described later. Note that the switching unit of the mode is not limited to the column of memory units MUC.

For example, in the shutdown mode, the power supply to the memory cell area is cut off in the column of memory units MUC to be shut down, and for peripheral circuits other than the memory cell area, the power supply to peripheral circuits not related to shutdown and sleep control is cut off. In the sleep mode, in the column of memory units MUC to be slept, the power supply to the memory cell area is lowered to a low voltage at which data held in the memory cell can be maintained, and for peripheral circuits other than the memory cell area, the power supply to peripheral circuits not related to shutdown and sleep control is cut off. Note that although the present embodiment describes an example in which the memory block MBLK itself includes a built-in power supply circuit to implement a shutdown function and a sleep function, even in the case where the memory block MBLK itself does not have such a power supply circuit, if a power supply circuit provided outside the memory block MBLK can adjust the power supply voltage in the memory cell area, and adjust the power supply voltage in the peripheral circuits other than the memory cell area or shut down the power supply in units of columns of memory units MUC or memory groups MG, the present technique can be applied.

In the active mode, a write operation or a read operation can be executed. In addition, a register of the memory state management unit 212 may be set with a time to transition to the sleep mode in the case where there is no access during the active mode.

The memory state management unit 212 manages the operation mode of the columns of memory units MUC, based on setting values of multiple built-in registers. In addition, the memory state management unit 212 holds defect information indicating the locations of defective memory cells in the memory groups MG, and executes management to access a normal memory cell instead of a defective memory cell.

The output interface control unit 220 stores two 256-bit memory read data signals Q received from the memory block in the buffer 224, in a read operation of the memory block MBLK. In addition, the output interface control unit 220 stores, in the buffer 222, a control signal CMD that includes additional information for memory control and an address signal A received from the memory block MBLK.

The buffers 222 and 224 are, for example, FIFO buffers. The buffer 222 outputs control signals CMD that include additional information for memory control and address signals A to the system bus output control unit 226 in the order of holding the signals in the buffer. The buffer 224 outputs two 256-bit memory read data signals Q as 512-bit read data to the system bus output control unit 226.

Note that the memory control unit 200 includes a function of mutually converting the frequency of data and the like input and output with respect to the system bus SBUS and the frequency of data and the like input and output with respect to the memory block MBLK. For example, in the memory control unit 200, the input side of the buffers 204 and 206 is operated by a system clock signal SCLK used by the system bus SBUS. In the memory control unit 200, the output side of the buffers 204 and 206 is operated by a memory clock signal MCLK used by the memory block MBLK.

Similarly, in the memory control unit 200, the input side of the buffers 222 and 224 is operated by the memory clock signal MCLK used by the memory block MBLK. In the memory control unit 200, the output side of the buffers 222 and 224 is operated by the system clock signal SCLK used by the system bus SBUS. In this way, the buffers 204, 206, 222, and 224 also operate as clock transfer circuits.

The system bus output control unit 226 receives a control signal CMD that includes additional information for memory control and an address signal A output from the buffer 222, and a 512-bit memory read data signal Q output from the buffer 224. The system bus output control unit 226 sequentially outputs a 512-bit memory read data signal Q as a maximum of eight items of 64-bit read data RDT to the system bus SBUS, in response to the control signal CMD that includes the additional information for memory control and the address signal A. Depending on the address signal A and the size information included in the additional information, data other than of the access target may be included in the 512-bit memory read data signal Q. Only data of the access target is output to the system bus SBUS.

Figure 3:
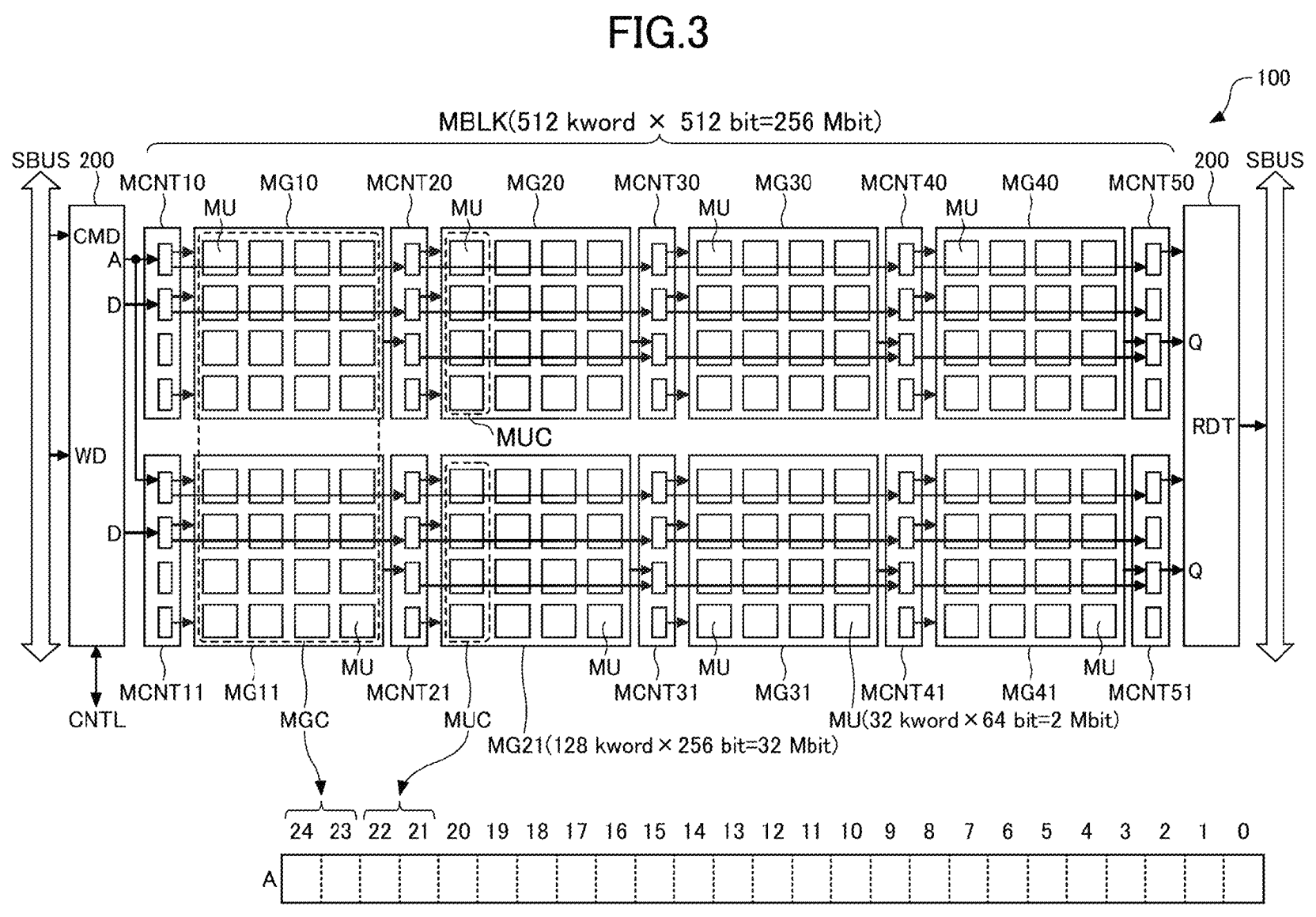

FIG. 3 illustrates an example of a configuration of the memory block MBLK illustrated in FIG. 1. In the following description, the memory block MBLK will be described as having eight memory groups MG (MG10, MG11, MG20, MG21, MG30, MG31, MG40, and MG41), two groups vertically by four groups horizontally. Note that the number and arrangement of memory groups MG installed in the memory block MBLK are not limited to the example illustrated in FIG. 3.

The memory block MBLK includes the memory group control units MCNT (MCNT10, MCNT11, MCNT20, MCNT21, MCNT30, MCNT31, MCNT40, and MCNT41) each of which is arranged on the input side of the corresponding memory group MG. In addition, the memory block MBLK includes memory group control units MCNT50 and MCNT51 arranged on the output side of the memory groups MG40 and MG41 at the last stage, respectively.

Each of the memory groups MG includes 16 memory units MU, four units vertically by four units horizontally. Note that the number and arrangement of memory units MU installed in each of the memory group MG are not limited to the example illustrated in FIG. 3.

Although not limited in particular, the size of each of the memory units MU is 32 k words×64 bits (=2M bits), and the four memory units MU that are arranged in the vertical direction input and output 256-bit data. The size of the memory group MG that includes the 16 memory units MU is 128 k words×256 bits (=32M bits). The size of the memory block MBLK that includes the eight memory groups MG is 512 k words×512 bits (=256M bits).

A column of memory groups MGC is constituted with two memory groups MG that are arranged in the vertical direction. A column of memory units MUC is constituted with four memory units MU that are arranged in the vertical direction. The column of memory units MUC is an example of a sub-memory group. For example, each of the columns of memory groups MGC is identified by bits AD [24:23] among a 25-bit address signal A. Each of the columns of memory units MUC is identified by bits AD [22:21] among the 25-bit address signal A.

In this embodiment, switching among the shutdown mode, the sleep mode, and the active mode is executed in units of columns of memory units MUC. The sleep mode is an example of a low-power mode. The column of memory units MUC is an example of a sub-memory group as the unit for switching between the sleep mode and the active mode.

Note that switching among the shutdown mode, the sleep mode, and the active mode may be executed in units of two vertically-arranged columns of memory units MUC, or in units of columns obtained by further finely dividing a column of memory units MUC into multiple columns. For example, the mode may be switched in units of columns of memories MEMC illustrated in FIG. 5 that will be described later. Further, switching among the shutdown mode, the sleep mode, and the active mode may be executed in units of memory groups MG.

For example, in each of the columns of memory units MUC, the power consumption during the shutdown mode is approximately 1/10 of the standby power during the active mode, and the power consumption during the sleep mode is approximately 1/3 of the standby power during the active mode.

The memory group control unit MCNT on the input side of each of the memory groups MG outputs a control signal CMD, an address signal A, and a memory write data signal D to the memory group MG and the memory group control unit MCNT on the output side of the memory group MG. Each of the memory groups MG outputs a memory read data signal Q to the memory group control unit MCNT on the output side. As illustrated in FIG. 3, the command line CMD and the address line A are not routed across multiple memory groups MG. Therefore, increase in interconnect load can be suppressed. As a result, increase in power consumption can be suppressed while suppressing increase in access time of the memory circuit 100.

Figure 4:
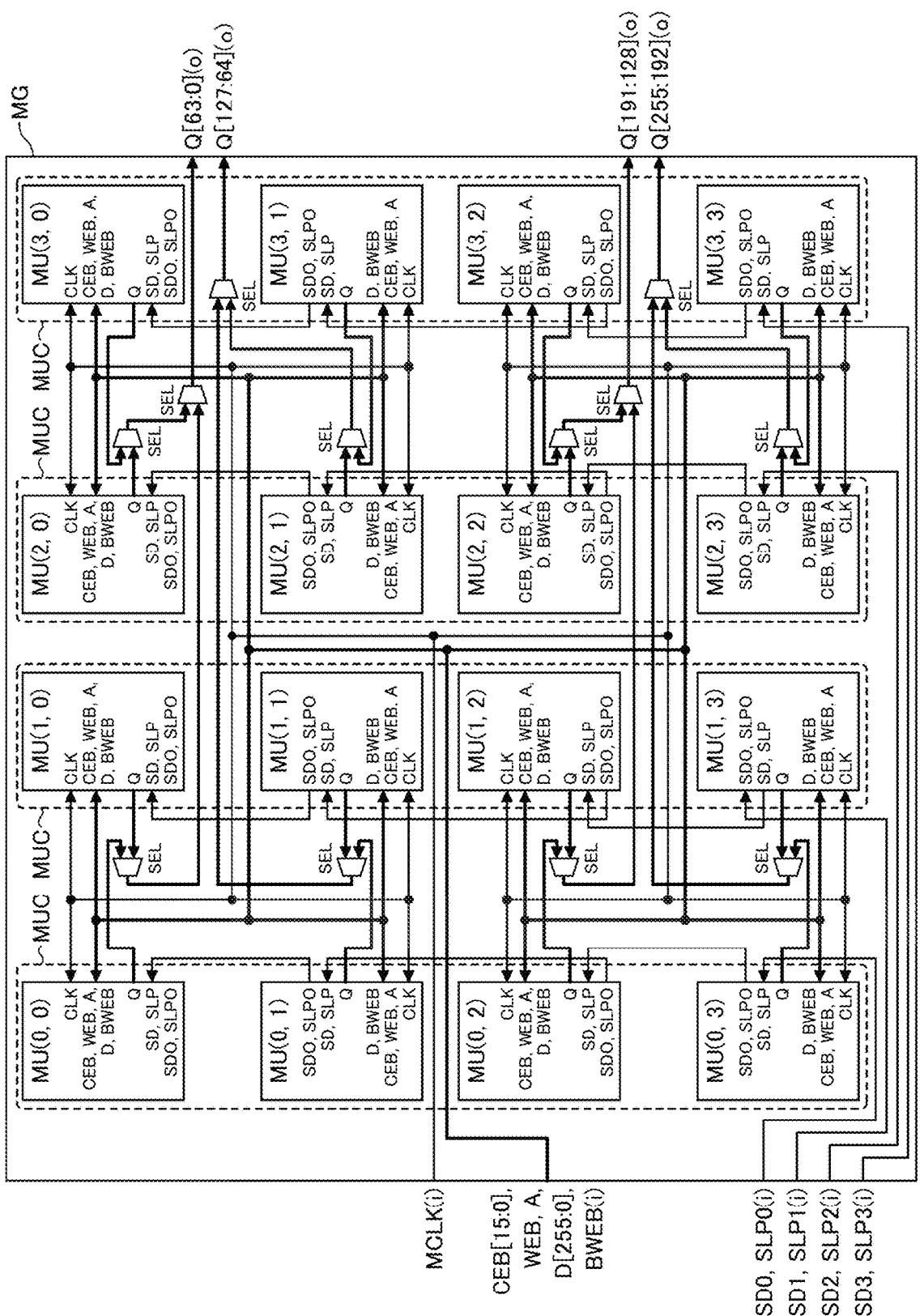
FIG. 4 is a block diagram illustrating an example of a configuration of a memory group in FIG. 3.

FIG. 4 illustrates an example of a configuration of the memory group MG illustrated in FIG. 3. A reference symbol (i) attached to the end of a signal indicates an input signal, and a reference symbol (o) attached to the end of a signal indicates an output signal. The memory group MG receives a memory clock signal MCLK, a 16-bit chip enable signal CEB, a write enable signal WEB, and a bit write enable signal BWEB from the memory group control unit MCNT as the control signal CMD illustrated in FIG. 3. The 16-bit chip enable signal CEB is divided into 4-bit signals and supplied to corresponding columns of memory units MUC, to be used for selecting a column of memory units MUC and a column of memories MEMC (see FIG. 5 that will be described later) in the column of memory units MUC.

For example, a signal with a reference symbol B at the end is a negative logic signal, and a signal without a reference symbol B at the end is a positive logic signal. The bit write enable signal BWEB is a signal for controlling write of a data signal in units of bits, and a bit to be masked for the write in the bit write enable signal BWEB is set to a high level.

In addition, the memory group MG receives an address signal A and a 256-bit memory write data signal D, and outputs a memory read data signal Q. Note that the 256-bit memory write data signal D is supplied to four memory units MU of the column of memory units MUC in units of 64 bits. The memory group MG includes multiple selectors SEL for selecting one of the 64-bit memory read data signals Q output from the four memory units MU that are arranged in the lateral direction, and outputting the selected signal to the memory group control unit MCNT.

Further, the memory group MG receives a shutdown signal SD and a sleep signal SLP from the memory group control unit MCNT as the control signal CMD in FIG. 3. As described with FIG. 3, in this embodiment, switching among the shutdown mode, the sleep mode, and the active mode is executed in units of columns of memory units MUC. Therefore, the shutdown signal SD and the sleep signal SLP are supplied in units of columns of memory units MUC.

A reference symbol SDO of each of the memory units MU indicates a terminal that outputs a shutdown signal SD to the adjacent memory unit MU in the column of memory units MUC. A reference symbol SLPO of each of the memory units MU indicates a terminal that outputs a sleep signal SLP to the adjacent memory unit MU in the column of memory units MUC. Accordingly, a shutdown signal SD and a sleep signal SLP shared by the memory units MU at the ends in the column of memory units MUC can be sequentially transmitted to the other memory units MU in the column of memory units MUC. When switching the operation mode of the memory unit MU, a phenomenon called inrush current occurs, in which the current temporarily flows more than in the normal time. By sequentially transmitting the shutdown signal SD and the sleep signal SLP to the memory units MU, the switching timing of the operation mode of the four memory units MU in the column of memory units MUC can be sequentially shifted, and the peak current can be suppressed because occurrence timings of the inrush current are also shifted.

Figure 5:
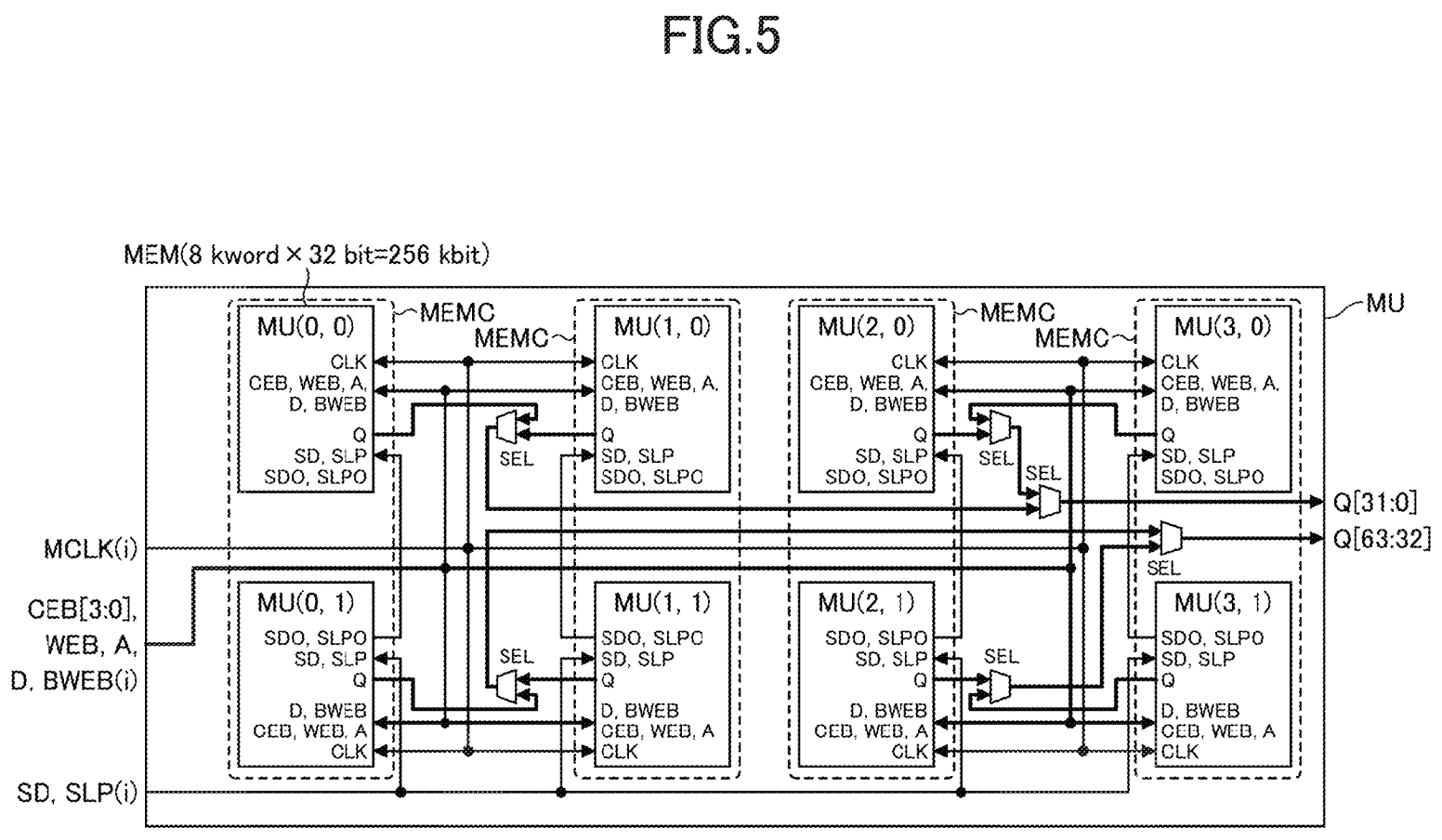

FIG. 5 illustrates an example of a configuration of the memory unit MU illustrated in FIG. 4. The memory unit MU includes eight memories MEM, two memories vertically by four memories horizontally. The size of each of the memories MEM is 8 k words×32 bits (=256 k bits). For example, the memory MEM includes multiple memory cells of SRAMs, or may include memory cells of other types of volatile memories. In addition, the memory MEM may include memory cells of non-volatile memories such as MRAM (Magnetoresistive Random Access Memory) or ReRAM (Resistive Random Access Memory). Note that the number and arrangement of memories MEM installed in the memory unit MU are not limited to the example illustrated in FIG. 5.

The memories MEM in the memory unit MU sequentially transmit a shutdown signal SD and a sleep signal SLP in substantially the same way as the memory units MU in the memory group MG illustrated in FIG. 4. Accordingly, the peak current can be further suppressed. Note that the shutdown signal SD and the sleep signal SLP may be further finely divided. For example, by controlling the shutdown signal SD and the sleep signal SLP in units of columns of memories MEMC each of which includes two memories MEM that are arranged in the vertical direction, the peak current can be further suppressed.

Figure 6:
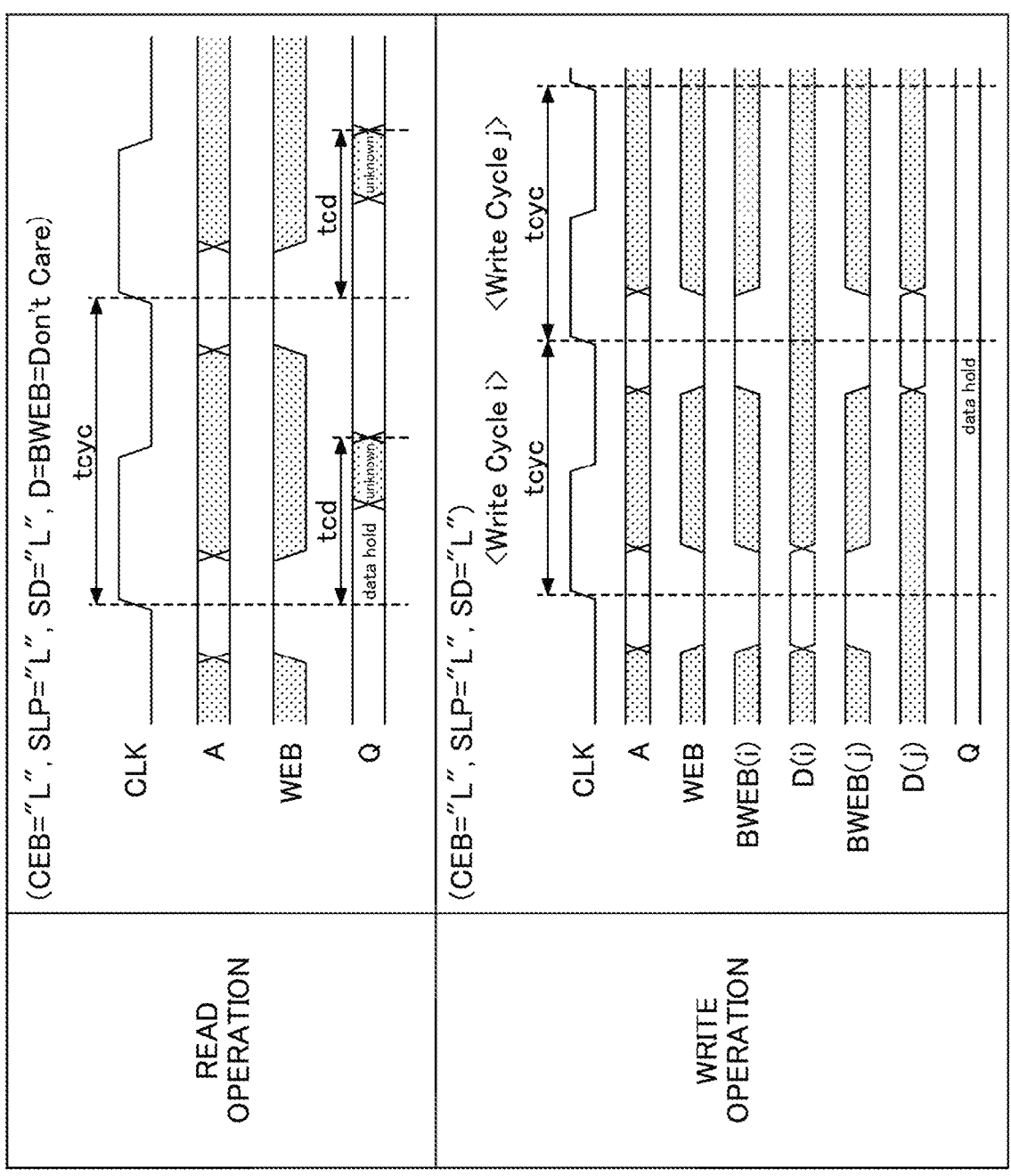
FIG. 6 is a timing chart illustrating an example of a read operation and a write operation of a memory in FIG. 5.

FIG. 6 illustrates an example of a read operation and a write operation of the memory MEM in FIG. 5. In a read operation and a write operation, the shutdown signal SD and the sleep signal SLP need to be fixed at the low level (L), and the column of memory units MUC to be operated needs to be in the active state.

A read operation is started at the rising edge of the clock signal CLK when the chip enable signal CEB is at the low level and the write enable signal WEB is at the high level. The memory MEM reads data from a memory area indicated by an address signal A received synchronously with the rising edge of the clock signal CLK, and outputs a memory read data signal Q after a time tcd from the rising edge of the clock signal CLK.

A write operation is started at the rising edge of the clock signal CLK when the chip enable signal CEB is at the low level and the write enable signal WEB is at the low level. The memory MEM receives an address signal A and a memory write data signal D synchronously with the rising edge of the clock signal CLK. Then, the memory MEM writes the memory write data signal D in a memory area indicated by the received address signal A. However, the memory MEM masks the write operation for a bit having the bit value at the high level in the bit write enable signal BWEB received synchronously with the rising edge of the clock signal MCLK.

In the case where a bit value of the bit write enable signal BWEB is at the low level, the bit value of the corresponding memory write data signal D is written to the memory cell. In FIG. 6, in Write Cycle i, as the BWEB(i) bit is at the low level, the value of the corresponding D(i) bit is written to the memory cell, and as the BWEB(j) bit is at the high level, the write of the value of the corresponding D(j) bit to the memory cell is masked. In addition, in Write Cycle j, as the BWEB(j) bit is at the low level, the value of the corresponding D(j) bit is written to the memory cell, and as the BWEB(i) bit is at the high level, the write of the corresponding D(i) bit to the memory cell is masked. Note that although not illustrated in the figure, in the case where all BWEB bits are at the low level, the values of all D bits are written to the memory cells, whereas in the case where all BWEB bits are at the high level, the write of all D bit values to the memory cells is masked.

Figure 7:
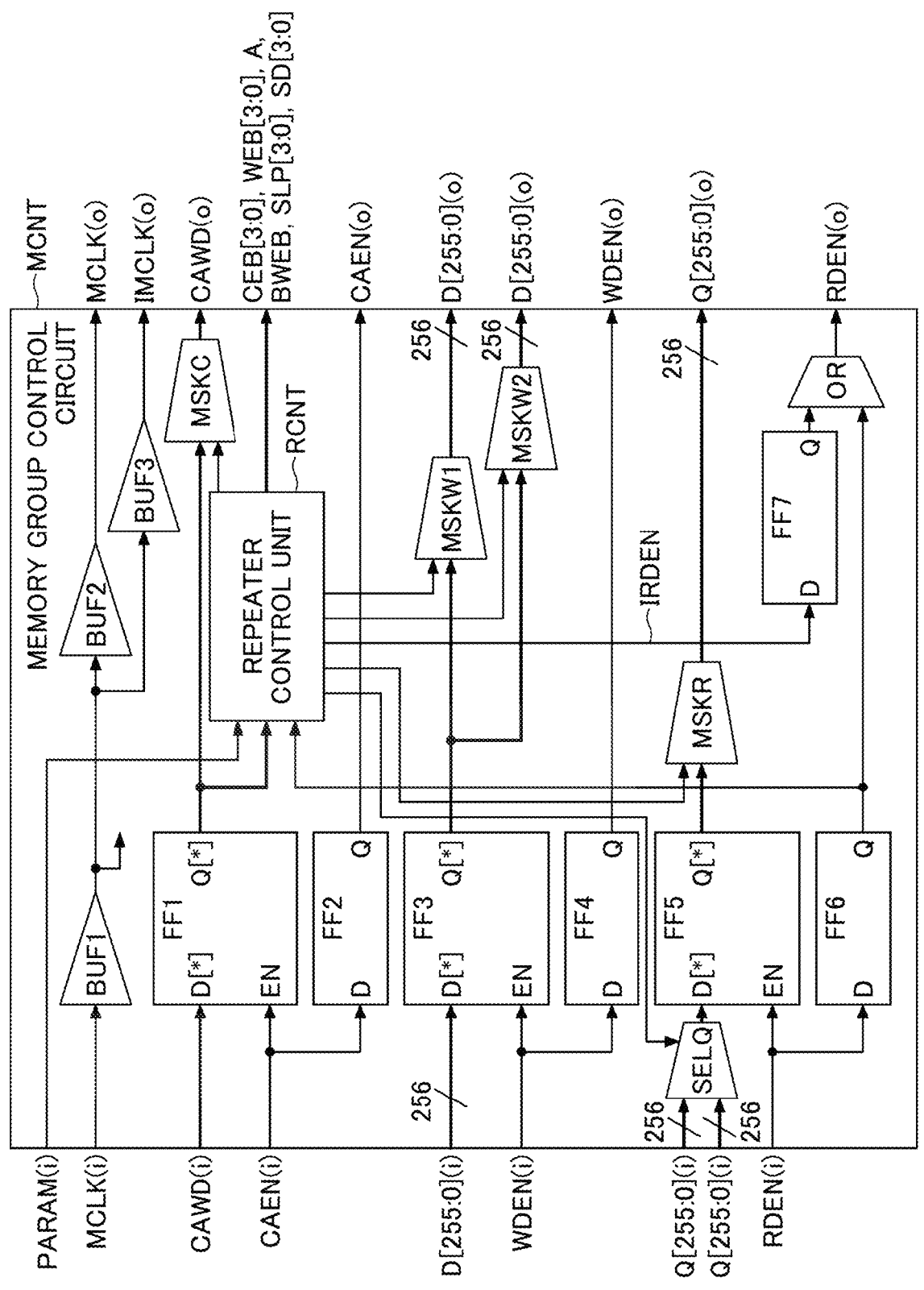
FIG. 7 is a block diagram illustrating an example of a configuration of a memory group control unit in FIG. 1.

FIG. 7 illustrates an example of a configuration of the memory group control unit MCNT illustrated in FIG. 1. The memory group control unit MCNT includes multiple flip-flops FF (FF1, FF2, FF3, FF4, FF5, FF6, and FF7), a repeater control unit RCNT, and multiple mask circuits MSK (MSKC, MSKW1, MSKW2, and MSKR). A flip-flop FF to which a thick signal line is connected is constituted with multiple flip-flops. A signal to which (i) is added at the end indicates an input signal, and a signal to which (o) is added at the end indicates an output signal.

In FIG. 7, a reference symbol PARAM(i) is a multi-bit signal used for identifying the memory group control unit MCNT and is bitwise fixed at the high or low level. The logic of the PARAM(i) signal is determined during the design of the memory circuit 100. A reference symbol CAWD(i) indicates a control signal CMD and an address A received from the memory group control unit MCNT at the preceding stage. A reference symbol D[255:0](i) indicates a memory write data signal D received from the memory group control unit MCNT at the preceding stage. A reference symbol Q[255:0](i) on the upper side indicates a memory read data signal Q from the memory group MG at the preceding stage. A reference symbol Q[255:0](i) on the lower side indicates a memory read data signal Q received from the memory group control unit MCNT at the preceding stage.

A reference symbol CAWD(o) indicates a control signal CMD and an address signal A output to the memory group control unit MCNT at the succeeding stage. Reference symbols CEB[3:0], WEB[3:0], A, BWEB, SLP[3:0], SD[3:0] indicate various control signals and an address signal A output to the own memory group MG. A reference symbol D[255:0](o) on the upper side indicates a memory write data signal D output to the memory group control unit MCNT at the succeeding stage. A reference symbol D[255:0](o) on the lower side indicates a write data signal D output to the own memory group MG. A reference symbol Q[255:0](o) indicates a memory read data signal Q output to the memory group control unit MCNT at the succeeding stage.

The memory clock signal MCLK is transmitted to each synchronous circuit in the memory group control unit MCNT via a buffer BUF1. The memory clock signal MCLK output from the buffer BUF1 is output to the memory group control unit MCNT at the succeeding stage via a buffer BUF2. In addition, the memory clock signal MCLK output from the buffer BUF1 is output to the own memory group MG via a buffer BUF3, as a memory clock signal IMCLK.

The flip-flop FF1 holds and outputs (a command address signal CAWD) that includes a control signal CMD, an address signal A, and additional information received when a command address enable signal CAEN is at the valid level. The command address enable signal CAEN is output from the memory control unit 200 together with the control signal CMD and the address signal A. The flip-flop FF2 transfers the command address enable signal CAEN received from the memory control unit 200 or the memory group control unit MCNT at the preceding stage to the memory group control unit MCNT at the succeeding stage. For example, the valid level of the command address enable signal CAEN is the high level.

The flip-flop FF3 holds and outputs a 256-bit write data signal D received when a write data enable signal WDEN is at the valid level. The write data enable signal WDEN is output from the memory control unit 200 together with the write data signal D. The flip-flop FF4 transfers the write data enable signal WDEN received from the memory control unit 200 or the memory group control unit MCNT at the preceding stage to the memory group control unit MCNT at the succeeding stage. For example, the valid level of the write data enable signal WDEN is the high level.

The flip-flop FF5 holds and outputs a 256-bit memory read data signal Q received via a selector SELQ when a read data enable signal RDEN received from the memory group control unit MCNT at the preceding stage is at the valid level. For example, the valid level of the read data enable signal RDEN is the high level.

The respective memory read data signals Q are output from the memory group MG at the preceding stage and the memory group control unit MCNT at the preceding stage. The memory group MG at the preceding stage is a memory group MG arranged adjacent to the memory control unit 200 (on the input side) with respect to the focused memory group control unit MCNT. Operations of the memory group MG at the preceding stage are controlled by the memory group control unit MCNT at the preceding stage of the focused memory group control unit MCNT.

The selector SELQ selects the memory read data signal Q read from the memory group MG at the preceding stage or the memory read data signal Q transferred from the memory group control unit MCNT at the preceding stage according to the level of a control signal from the repeater control unit RCNT. By the selector SELQ, regardless of the location of the memory group MG that outputs the memory read data signal Q, the memory read data signal Q can be transferred to the memory control unit 200.

The read data enable signal RDEN is output from one of the memory group control units MCNT at the preceding stage or a stage before the preceding stage. The flip-flop FF6 transfers the read data enable signal RDEN received from the memory group control unit MCNT at the preceding stage to the memory group control unit MCNT at the succeeding stage via an OR circuit OR. Note that the memory group control unit MCNT at the first stage does not receive a memory read data signal Q from the memory group MG at the preceding stage and a memory read data signal Q from the memory group control unit MCNT at the preceding stage. The memory group control unit MCNT at the second stage does not receive a memory read data signal Q from the memory group control unit MCNT at the preceding stage.

The flip-flop FF7 in the memory group control unit MCNT at the preceding stage receives the read data enable signal IRDEN output from the repeater control unit RCNT, and outputs the received signal as an RDEN signal to the focused memory group control unit MCNT via the OR circuit OR at a timing delayed by one clock. As illustrated in FIG. 6, the memory circuit 100 of the present embodiment outputs data with a delay of time tcd with respect to the read request timing (rising edge of CLK with CEB=L and WEB=H), and thereby, the memory read data signal Q including data read from the memory group MG at the preceding stage by the IRDEN signal is taken in the flip-flop FF5 in the memory group control unit MCNT at the succeeding stage. For example, the valid level of the read data enable signal IRDEN is the high level. Note that in the case of using a memory circuit having a timing different from the timing at which read data of the memory circuit 100 of the present embodiment becomes valid, the circuit configuration of the part to generate a RDEN signal from an IRDEN signal in the memory group control unit MCNT may be changed.

The repeater control unit RCNT controls operations of the repeater control unit RCNT itself and controls operations of the memory group MG at the succeeding stage. The memory group MG at the succeeding stage is a memory group MG arranged adjacent to the memory control unit 200 (on the output side) with respect to the focused memory group control unit MCNT, and is a memory group MG in which operations are controlled by the focused memory group control unit MCNT.

The repeater control unit RCNT operates according to a parameter signal PARAM for indicating the number of stages of the memory group control unit MCNT from the memory control unit 200. Each bit of the parameter signal PARAM is fixed at the high level or low level outside each of the memory group control units MCNT based on the overall design of the memory circuit 100, to specify which one of the stages of memory group control units MCNT the memory group control unit MCNT is located. For example, in the configuration in FIG. 3, there are five memory group control units MCNT in the lateral direction. In this case, the PARAM signal indicates one of zero to seven in three bits.

The memory group control units MCNT10 and MCNT11 on the leftmost side in FIG. 3 are set with PARAM=1. The memory group control units MCNT20 and MCNT21 second from the left are set with PARAM=2. The memory group control units MCNT50 and MCNT51 on the rightmost side and not having their own MG are set with PARAM=0. The memory group control units MCNT10 and MCNT11 with PARAM=1 are located at the leftmost side and do not receive a memory read data signal Q from the preceding stage, and hence, may or may not have circuits such as the flip-flops FF5 and FF6 and the selector SELQ for receiving a memory read data signal from the preceding stage. The memory group control units MCNT50 and MCNT51 with PARAM=0 are located at the rightmost side and do not need to transmit a memory write data signal D to the succeeding stage, and hence, may or may not have circuits such as the flip-flops FF3 and FF4 and the mask circuits MSKW1 and MSKW2.

By processing a command address signal CAWD that includes a control signal CMD, an address signal A, and additional information from the flip-flop FF1, the repeater control unit RCNT can detect a memory group MG that is to execute a write operation or a read operation. In the case of determining a write operation of the memory group MG at the succeeding stage, the repeater control unit RCNT outputs a chip enable signal CEB at the low level, a write enable signal WEB at the low level, the address A, and the bit write enable signal BWEB to the memory group MG at the succeeding stage. The chip enable signal CEB and the write enable signal WEB are generated for each of the four columns of memory units MUC in the memory group MG at the succeeding stage.

In the case of determining a read operation of the own memory group MG, the repeater control unit RCNT outputs a chip enable signal CEB at the low level, a write enable signal WEB at the high level, and the address A to the column of memory units MUC as the read target. In the case of determining transition of the own memory group MG to the sleep mode or the shutdown mode, the repeater control unit RCNT outputs a sleep signal SLP and a shutdown signal SD at predetermined logical levels to the column of memory units MUC as the control target. The sleep signal SLP and the shutdown signal SD are generated for each of the four columns of memory units MUC in the own memory group MG.

In the case of determining release from the sleep mode or the shutdown mode of the own memory group MG, the repeater control unit RCNT outputs a sleep signal SLP at the low level and a shutdown signal SD at the low level to the own memory group MG. Note that the respective states of the columns of memory units MUC are collectively managed by the memory state management unit 212 in the memory control unit 200. Then, in the case where release from the sleep mode or the shutdown mode is required before a write operation or a read operation is executed, the memory control unit 200 outputs a change command to change the state of the memory unit MUC before outputting a command of the write operation or the read operation.

For example, during the shutdown mode, the sleep signal SLP and the shutdown signal SD are set to the low level and the high level, respectively. During the sleep mode, the sleep signal SLP and the shutdown signal SD are set to the high level and the low level, respectively. During the active mode, both of the sleep signal SLP and the shutdown signal SD are set to the low level.

Note that when the memory circuit 100 is activated, the sleep signal SLP and the shutdown signal SD are set to the low level and the high level, respectively, and the columns of memory units MUC in all memory groups MG are set to the shutdown mode. Thereafter, only a column of memory units MUC to be operated transitions from the shutdown mode to the active mode ACT, and a write operation or a read operation is executed. Further, in the case where there is no access for a predetermined period during the active mode, a command to change the memory state is output from the memory control unit 200, and the column of memory units MUC in the memory group MG managed by the corresponding memory group control unit MCNT transitions from the active mode to the sleep mode. The predetermined period for determining the transition from the active mode to the sleep mode can be changed by a setting value of the register of the memory state management unit 212 illustrated in FIG. 2.

In addition, the column of memory units MUC during the sleep mode or the active mode can transition to the shutdown mode, based on a command from the memory control unit 200. In this way, the column of memory units MUC in which a write operation or a read operation is executed is set to the active mode, and the active mode is maintained while access is executed continuously. In addition, in the case where no access is detected for a certain period of time, the column is caused to transition back to the sleep mode. By minimizing the number of columns of memory units MUC set to the active mode, the power consumption of the memory circuit MEM can be reduced.

The repeater control unit RCNT detects that a memory read data signal Q is output from the memory group MG at the preceding stage or a stage before the preceding stage, based on a control signal CMD and an address signal A received from the memory group control unit MCNT at the preceding stage. In the case where a memory read data signal Q is output from the memory group MG at the preceding stage, the repeater control unit RCNT selects the memory read data signal Q from the memory group MG at the preceding stage by the selector SELQ. In the case where a memory read data signal Q is output from the memory group MG at a stage before the preceding stage, the repeater control unit RCNT selects the memory read data signal Q transferred from the memory group control unit MCNT at the preceding stage by the selector SELQ.

When the read data enable signal RDEN is at the valid level (e.g., at the high level), the repeater control unit RCNT releases the masked state of the mask circuit MSKR, and when the read data enable signal RDEN is at the invalid level (e.g., at the low level), the repeater control unit RCNT sets the mask circuit MSKR to the masked state. Accordingly, in the case of receiving a 256-bit memory read data signal Q upon execution of a read operation by the memory group MG on the preceding stage side, the memory group control unit MCNT can relay and transfer the memory read data signal Q to the memory group control unit MCNT at the succeeding stage. In addition, in the case of not receiving a memory read data signal Q from the preceding stage side, the repeater control unit RCNT suppresses transfer of an invalid memory read data signal Q to the memory group control unit MCNT at the succeeding stage. Accordingly, the power consumption can be reduced.

The repeater control unit RCNT detects that a memory read data signal Q is output from the own memory group MG, based on a command address signal CAWD that includes a control signal CMD, an address signal A, and additional information received from the memory group control unit MCNT at the preceding stage. In the case where the memory read data signal Q is output from the own memory group MG, the repeater control unit RCNT outputs a read data enable signal IRDEN at the valid level to the flip-flop FF7. The flip-flop FF7 outputs the read data enable signal IRDEN to the memory group control unit MCNT at the succeeding stage via the OR circuit OR.

The repeater control unit RCNT outputs the read data enable signal IRDEN in the same cycle as the chip enable signal CEB for causing the memory group MG at the succeeding stage to execute a read operation. Therefore, the read data enable signal RDEN output from the flip-flop FF7 is supplied to the memory group control unit MCNT at the succeeding stage after one cycle after the memory group MG at the succeeding stage starts operating the read operation. Therefore, the memory group control unit MCNT at the succeeding stage can hold the memory read data signal Q received from the corresponding one of the memory groups MG in the flip-flop FF5.

In the case where a read operation is executed in the memory group MG at the preceding stage or a stage before the preceding stage, in order to transfer the memory read data signal Q to the memory group control unit MCNT at the succeeding stage, the repeater control unit RCNT releases the masked state of the mask circuit MSKR. In addition, in the case where a write operation is executed in the memory group MG at the succeeding stage or a stage behind the succeeding stage, in order to transfer the write data signal D to the succeeding stage MCNT, the repeater control unit RCNT releases the masked state of the mask circuit MSKW1. In addition, in order to suppress transfer of the write data signal D to the own memory group MG, the repeater control unit RCNT sets the mask circuit MSKW2 to the masked state.

In order to transfer the command address signal CAWD that includes the control signal CMD, the address signal A, and the additional information to the memory group control unit MCNT at the succeeding stage, the repeater control unit RCNT releases the masked state of the mask circuit MSKC. In the case where a write operation is executed in the memory group MG at the succeeding stage or a stage behind the succeeding stage, in order to transfer the command address signal CAWD to the memory group control unit MCNT at the succeeding stage, the repeater control unit RCNT releases the masked state of the mask circuit MSKC. In the case where a write operation is executed in any memory unit of the own memory group MG, in order to transfer the command address signal CAWD to the memory group control unit MCNT at the succeeding stage, the repeater control unit RCNT sets the mask circuit MSKC to the masked state. In a read operation, the memory group control unit MCNT at the last stage can execute control to output the command address signal CAWD that includes the control signal CMD, the address signal A, and the additional information, and the memory read data signal Q to the memory control unit 200.

In the case where a write operation is executed in the own memory group MG, in order to suppress transfer of the write data signal D to the memory group control unit MCNT at the succeeding stage, the repeater control unit RCNT sets the mask circuit MSKW1 to the masked state. Further, in order to transfer the memory write data signal D to the own memory group MG, the repeater control unit RCNT releases the masked state of the mask circuit MSKW2.

In the case where a write operation is executed in the memory group MG at the succeeding stage or a stage behind the succeeding stage, in order to transfer the write data signal D to the memory group control unit MCNT at the succeeding stage, the repeater control unit RCNT releases the masked state of the mask circuit MSKW1. In the case where a write operation is executed in the memory group MG at the succeeding stage and a stage behind the succeeding stage, in order to suppress transfer of the memory write data signal D to the own memory group MG, the repeater control unit RCNT sets the mask circuit MSKW2 to the masked state.

Figure 8:
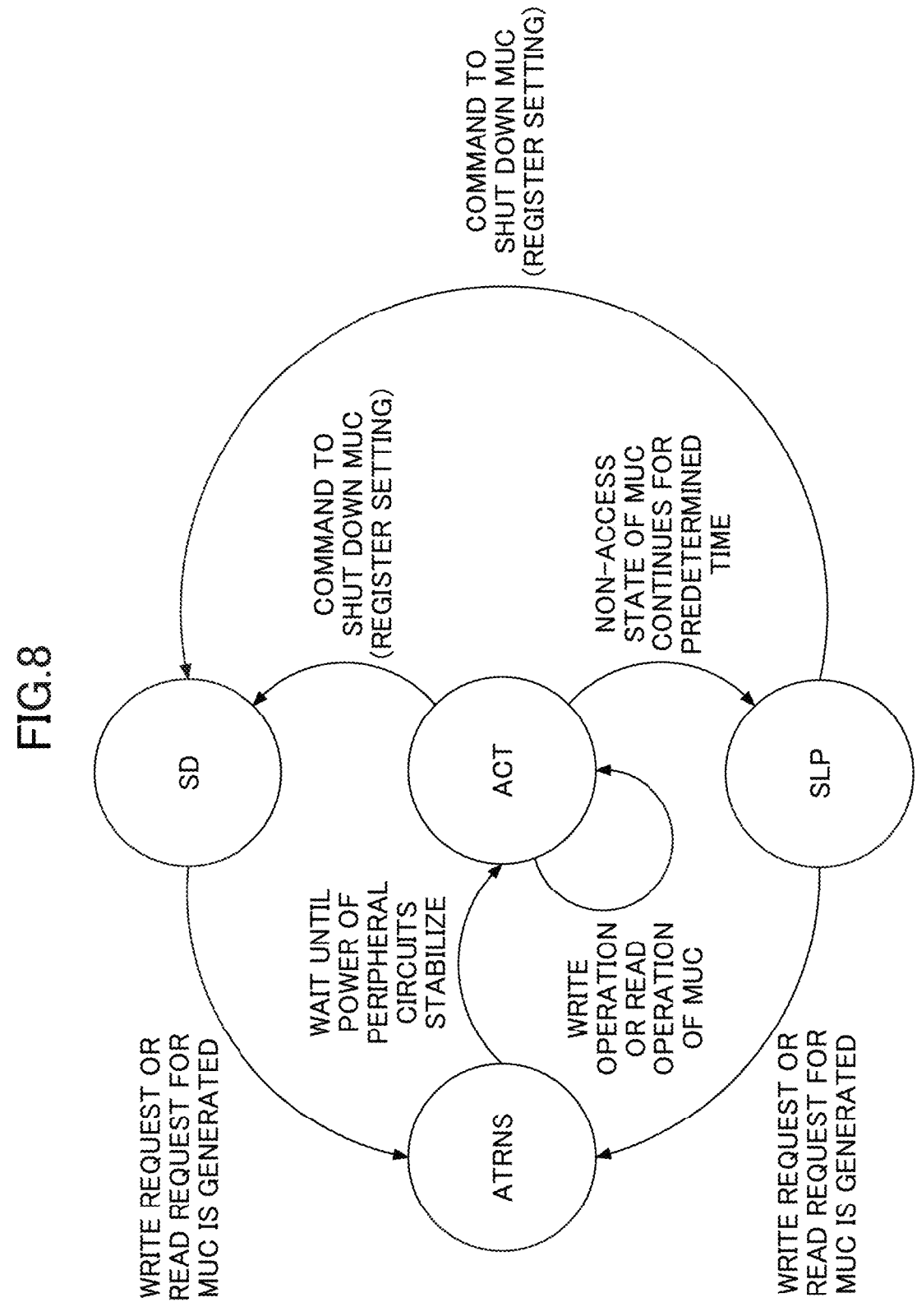
FIG. 8 is a state transition diagram illustrating an example of transitions of the operation state of a column of memory units in FIG. 4.

FIG. 8 illustrates an example of transition of operation states of the column of memory units MUC in FIG. 4. The state transition in FIG. 8 is managed by the memory group control unit MCNT that controls operations of the column of memory units MUC. However, transition to the shutdown mode SD is executed by setting registers of the memory state management unit 212 of the memory control unit 200.

Note that FIG. 8 illustrates the state transition among the shutdown mode SD, the sleep mode SLP, the active mode ACT, and an activation transit mode ATRNS in a switching unit. In the case where switching of the shutdown mode SD, the sleep mode SLP, and the active mode ACT is executed in units of memory groups MG, FIG. 8 illustrates the state transition of a memory group MG. In the case where the operation mode is switched in units of columns of memories MEMC in the column of memory units MUC, FIG. 8 illustrates the state transition executed in units of columns of memories MEMC. In the following, an example of control executed in units of columns of memory units MUC will be described.

In the case where the memory circuit MEM illustrated in FIG. 1 is activated, the state of every column of memory units MUC is set to the shutdown mode SD. A column of memory units MUC for which a write request or a read request is generated is caused to transition from the shutdown mode SD to the activation transit mode ATRNS, and, for example, the power supply of peripheral circuits other than the memory cell area is turned on. Then, after a time has elapsed for the power supply to stabilize, the column of memory units MUC is caused to transition to the active mode ACT, and the write operation or the read operation is executed. During the active mode ACT, every time a write request or a read request is generated for the column of memory units MUC, the write operation or the read operation is executed.

During the active mode ACT, in the case where a non-access state in which no write request or read request is generated continues for a predetermined period of time, the column of memory units MUC is caused to transition to the sleep mode SLP. The sleep mode SLP is an example of a low-power mode that suppresses the power consumption while holding data held in the column of memory units MUC. By switching a column of memory units MUC that does not execute a write operation or a read operation for a predetermined period of time from the active mode ACT to the sleep mode SLP, the power consumption of the memory circuit 100 can be reduced. During the sleep mode SLP, the column of memory units MUC for which a write request or a read request is generated is caused to transition to the activation transit mode ATRNS.

During the active mode ACT or the sleep mode SLP, in the case where a shutdown command of the column of memory units MUC is generated, the column of memory units MUC is caused to transition to the shutdown mode SD. The shutdown command is executed by, for example, setting registers of the memory state management unit 212, based on reception of the control signal CTNL in FIG. 2. Note that depending on the application, in the case where the sleep mode SLP continues for a predetermined period of time, it is possible to cause the column of memory units MUC to transition to the shutdown mode SD. In this case, the duration of the sleep mode SLP may be set in advance in a register of the overall management unit 210 in FIG. 2. Automatic transition to the shutdown mode SD occurs, for example, in the case where frame image data held in the memory circuit 100 is surely accessed within a certain period of time when processing moving images, and it can be guaranteed that the data held therein will not be used if there is no access for the certain period of time or longer. For example, in the case where a memory access process is executed with a certain screen size, and in the middle of processing, the screen size is switched to a smaller size while the memory access process continues, a memory area not to be used is generated among the memory areas that were used during the processing with the initial screen size. In such a case, by automatically transitioning to the shutdown mode SD based on the duration of the sleep mode SLP, access control of the memory circuit 100 can be executed easier as compared to the case of issuing a shutdown command from the outside.

Note that the duration of the sleep mode SLP before transitioning to the shutdown mode SD may be set by obtaining statistical information such as the access frequency, and based on the obtained statistical information. In this case, an obtainment circuit to obtain statistical information including the time from transition to the sleep state to transition to the active state; the frequency of transition from the active state to the sleep state; the frequency of access during the active state; and the like, and a calculation circuit of duration are added to the memory control unit 200.

FIGS. 9 to 13 illustrate examples of operations of the memory group control unit MCNT in FIG. 7. Processes illustrated in FIGS. 9 to 13 are executed for each of the columns of memory units MUC by the repeater control unit RCNT of each of the multiple memory group control units MCNT in the memory circuit 100. Note that in the processes illustrated in FIGS. 9 to 13, an example is illustrated in which switching among the shutdown mode SD, the sleep mode SLP, and the active mode ACT is executed in units of columns of memory units MUC.

First, at Step S10, the repeater control unit RCNT waits until detecting a positive edge of the system clock signal SCLK, and once detecting a positive edge, executes Step S12. At Step S12, if a state transition request is issued, the repeater control unit RCNT executes Step S100 (state transition process), or if no state transition request is issued, executes Step S14. An example of Step S100 is illustrated in FIG. 10.

The state transition request is one of an activation command to transition to the active mode ACT, a sleep command to transition to the sleep mode SLP, or a shutdown command to transition to the shutdown mode SD. For example, in the case where the column of memory units MUC as the access target is in the shutdown mode SD or the sleep mode SLP, the activation command is issued by the corresponding repeater control unit RCNT based on an issuance of a write request or a read request. The shutdown command is issued by the memory control unit 200 based on a request issued to the memory circuit 100 via the system bus SBUS. The sleep command is issued by the corresponding repeater control unit RCNT in the case of causing the column of memory units MUC in the active mode ACT to transition to the sleep mode SLP. Note that the sleep command may be issued by the memory control unit 200 based on a request issued to the memory circuit 100 via the system bus SBUS.

Figure 11:
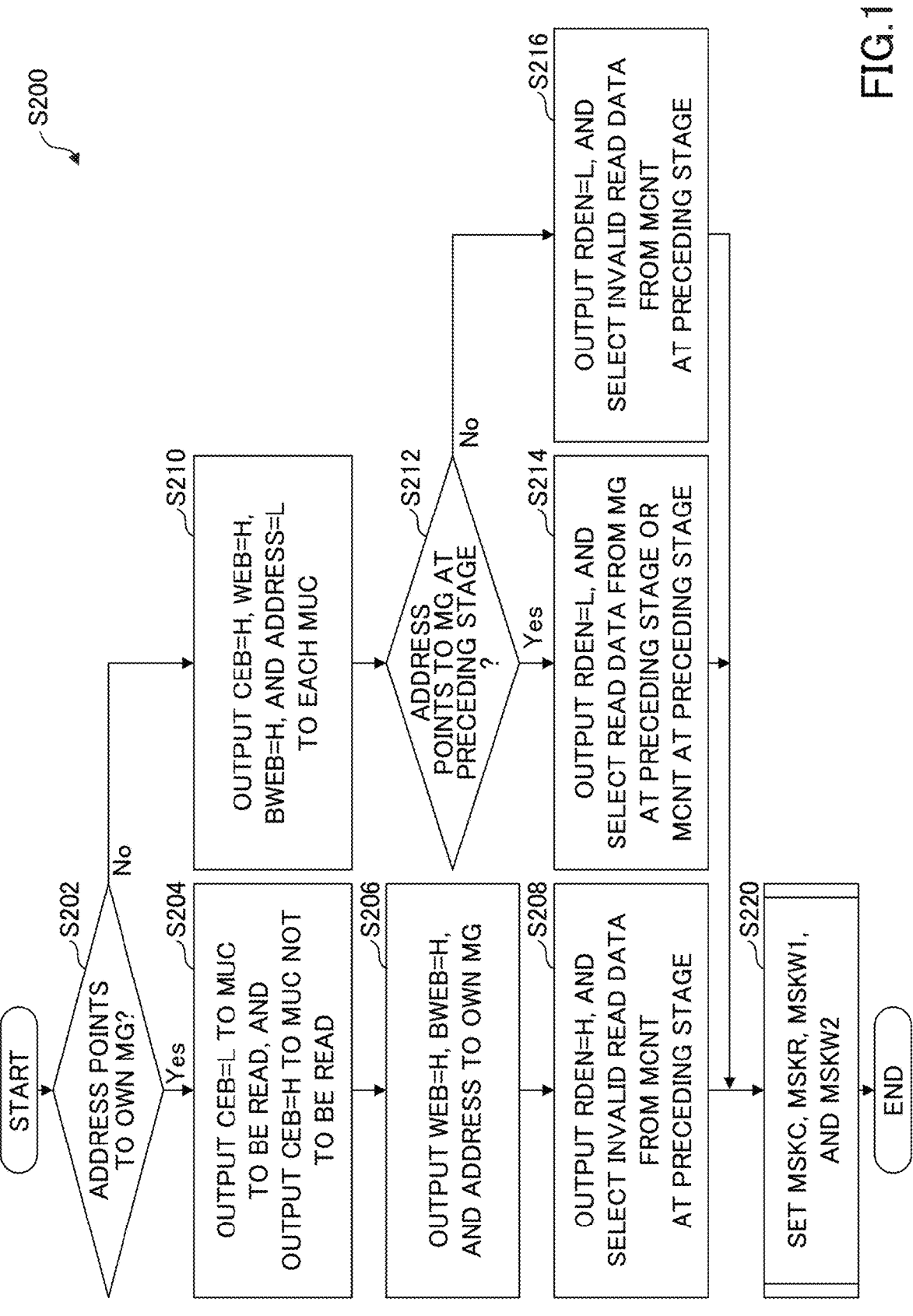
FIG. 11 is a flow chart illustrating an example of Step S200 in FIG. 9.
Figure 13:
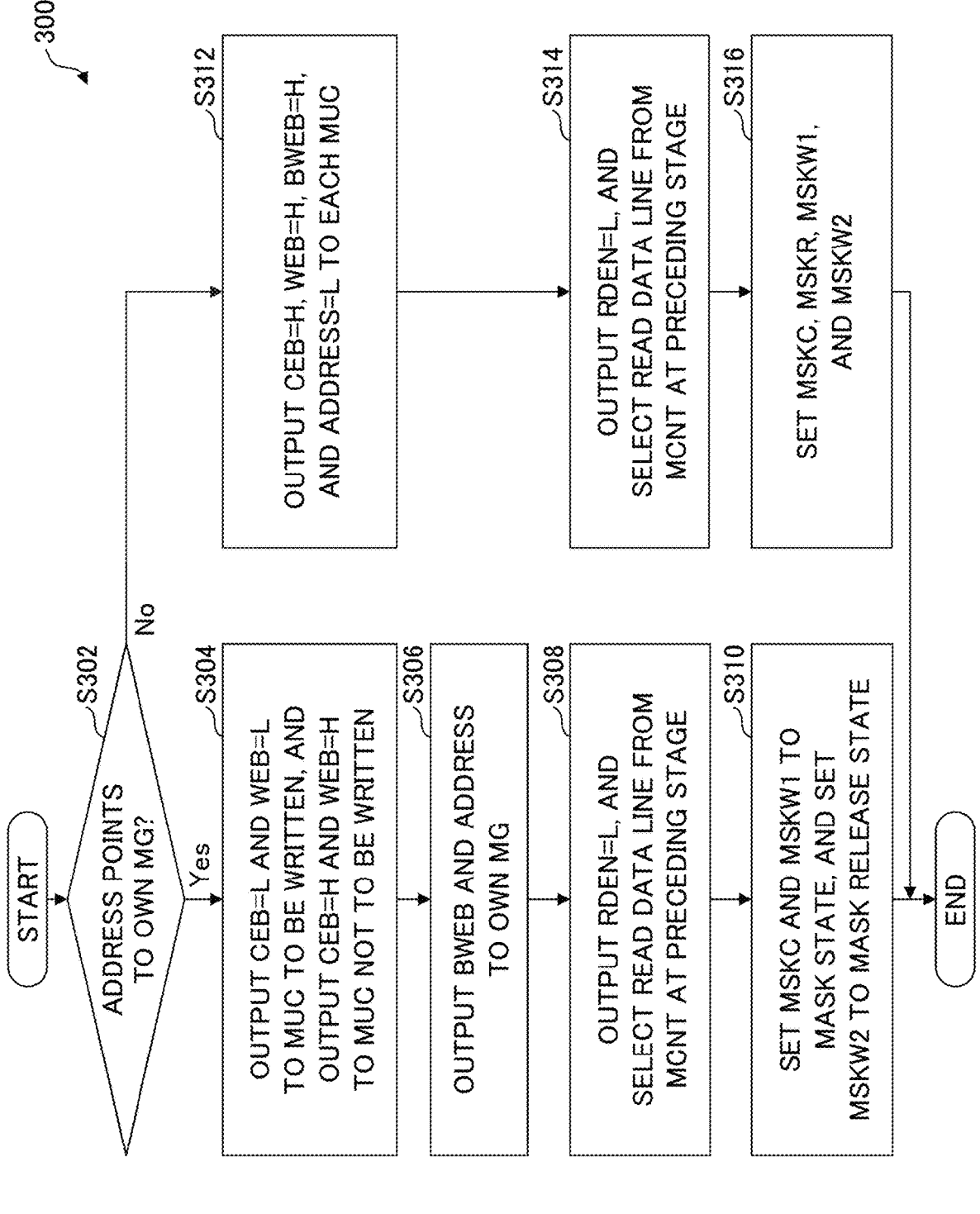
FIG. 13 is a flow chart illustrating an example of Step S300 in FIG. 9.

At Step S14, if a read request is issued, the repeater control unit RCNT executes Step S200 (read operation), or if no read request is issued, executes Step S16. An example of Step S200 is illustrated in FIGS. 11 and 12. At Step S16, if a write request is issued, the repeater control unit RCNT executes Step S300 (write operation), or if no write request is issued, returns to Step S10. An example of Step S300 is illustrated in FIG. 13.

Figure 10:
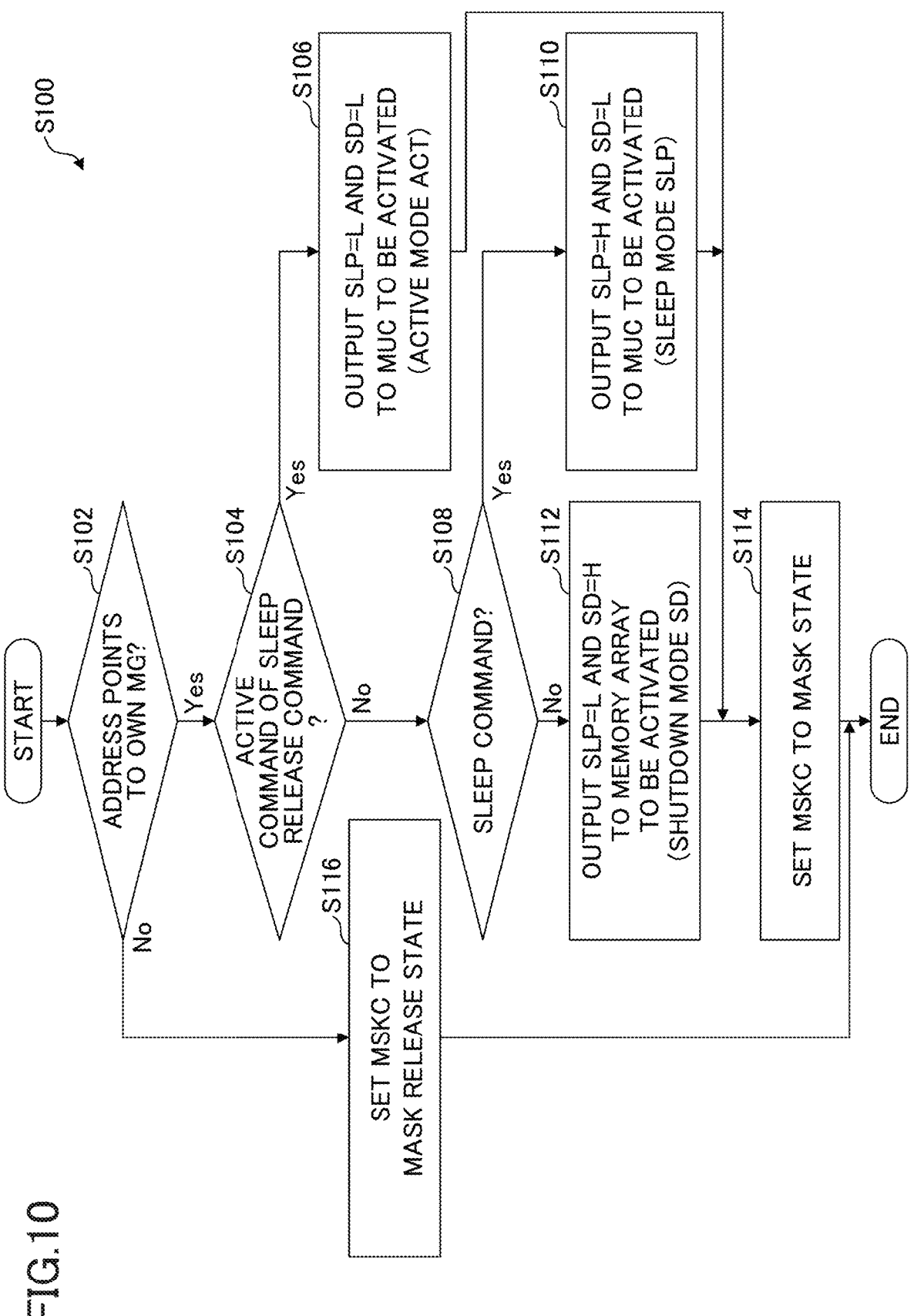
FIG. 10 is a flow chart illustrating an example of Step S100 in FIG. 9.

At Step S100, the repeater control unit RCNT executes the state transition process illustrated in FIG. 10, and returns to Step S10. At Step S200, the repeater control unit RCNT executes the read operation illustrated in FIG. 11, and returns to Step S10. At Step S300, the repeater control unit RCNT executes the write operation, and returns to Step S10.

Figure 9:
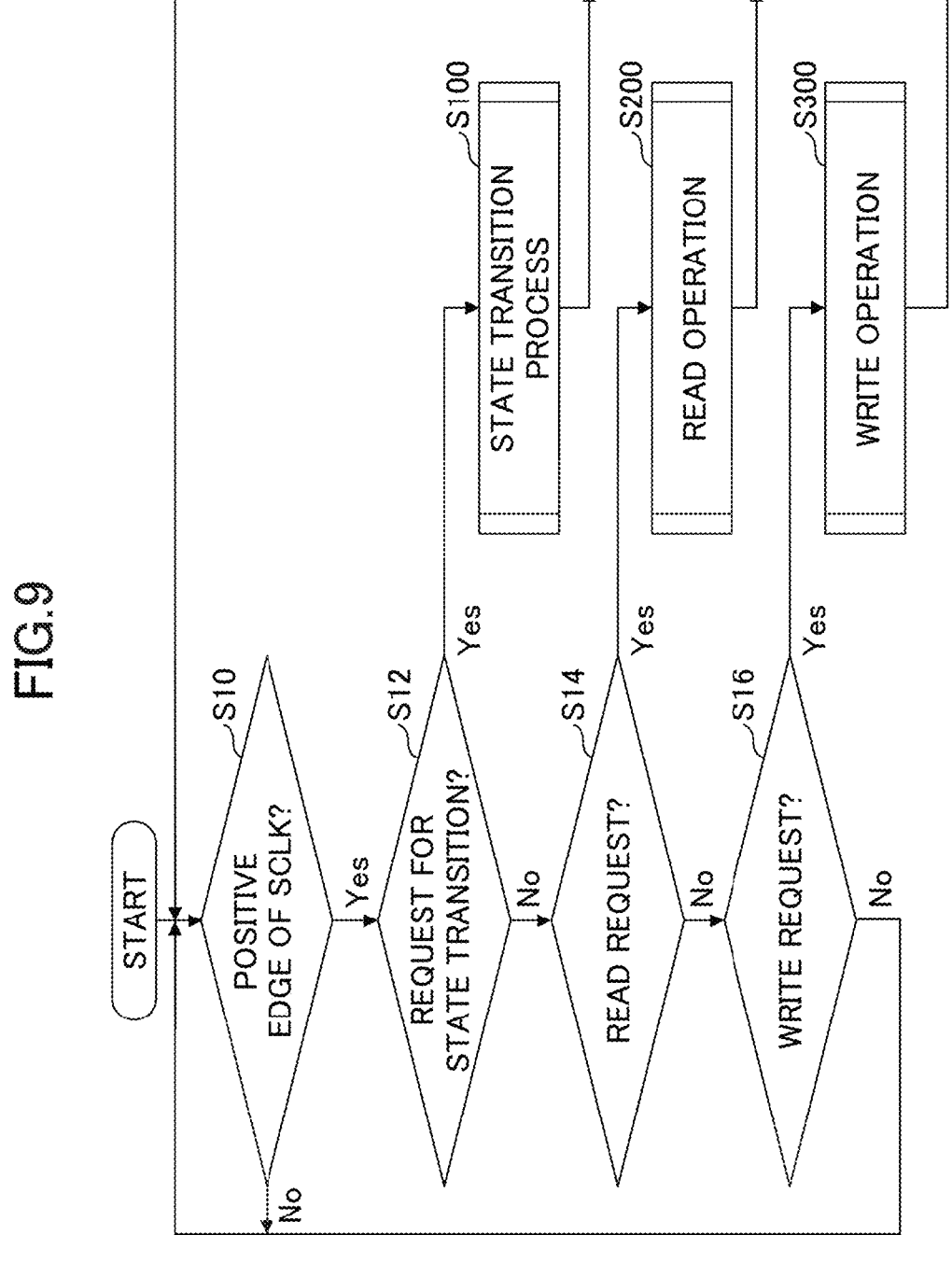
FIG. 9 is a flow chart illustrating an example of operations of the memory group control unit in FIG. 7.

FIG. 10 illustrates an example of Step S100 (state transition process) illustrated in FIG. 9. First, at Step S102, the repeater control unit RCNT determines whether or not the address signal A received together with the state transition command indicates the own memory group MG. The own memory group MG is, by the example in FIG. 1, the own memory group MG of the memory group control unit MCNT, and is the memory group MG as the access target that executes a write operation or a read operation. The repeater control unit RCNT executes Step S104 if the address signal A indicates the own memory group MG, or executes Step S116 if the address signal A does not indicate the own memory group MG.

At Step S104, if the state transition command is the activation command or the sleep release command, the repeater control unit RCNT executes Step S106. The repeater control unit RCNT executes Step S108 if the state transition command is not the activation command or the sleep release command.

At Step S106, the repeater control unit RCNT outputs a sleep signal SLP at the low level and a shutdown signal SD at the low level to the column of memory units MUC as the activation target indicated by the address signal A. Accordingly, the column of memory units MUC as the activation target transitions to the active mode ACT. After Step S106, Step S114 is executed.

At Step S108, if the state transition command is the sleep command, the repeater control unit RCNT executes Step S110, or if the state transition command is not the sleep command, executes Step S112.

At Step S110, the repeater control unit RCNT outputs a sleep signal SLP at the high level (H) and a shutdown signal SD at the low level to the column of memory units MUC as the activation target (target to be transitioned to the active mode ACT) indicated by the address signal A. Accordingly, the column of memory units MUC as the activation target transitions to the sleep mode SLP. After Step S110, Step S114 is executed.

At Step S112, the repeater control unit RCNT outputs a sleep signal SLP at the low level and a shutdown signal SD at the high level to the column of memory units MUC as the activation target indicated by the address signal A. Accordingly, the column of memory units MUC as the activation target transitions to the shutdown mode SD. After Step S112, Step S114 is executed.

At Step S114, by setting the mask circuit MSKC to the masked state, the repeater control unit RCNT suppresses transfer of the control signal CMD and the address signal A to the memory group control unit MCNT at the succeeding stage, and ends the process illustrated in FIG. 10. On the other hand, at Step S116, by setting the mask circuit MSKC to the mask-released state, the repeater control unit RCNT permits transfer of the control signal CMD and the address signal A to the memory group control unit MCNT at the succeeding stage, and ends the process illustrated in FIG. 10.

FIG. 11 illustrates an example of Step S200 (read operation) in FIG. 9. First, at Step S202, the repeater control unit RCNT determines whether or not the address signal A received together with the read request signal indicates the own memory group MG. The repeater control unit RCNT executes Step S204 if the address signal A indicates the own memory group MG, or executes Step S210 if the address signal A does not indicate the own memory group MG.

At Step S204, the repeater control unit RCNT outputs a chip enable signal CEB at the low level to a column of memory units MUC as the read target indicated by the address signal A. The repeater control unit RCNT outputs a chip enable signal CEB at the high level to a column of memory units MUC not to be read.

Next, at Step S206, the repeater control unit RCNT outputs a write enable signal WEB at the high level and a bit write enable signal BWEB at the high level to the own memory group MG. The repeater control unit RCNT outputs the address signal A received together with the control signal CMD to the own memory group MG.

Next, at Step S208, the target repeater control unit RCNT corresponding to the memory group MG as the read target outputs a read enable signal RDEN at the high level. The target repeater control unit RCNT causes the selector SELQ to select an invalid memory read data signal Q from the memory group control unit MCNT at the preceding stage. Note that the repeater control unit RCNT may cause the selector SELQ to select an invalid memory read data signal Q from the memory group MG at the preceding stage. After Step S208, Step S220 is executed.

At Step S210, the repeater control unit RCNT outputs a chip enable signal CEB at the high level, a write enable signal WEB at the high level, and a bit write enable signal BWEB at the high level to each of the columns of memory units MUC. The repeater control unit RCNT outputs the address signal A at the low level to each of the columns of memory units MUC. By not having the logic level of the address signal A transitioned, the power consumption can be reduced.

At Step S212, the repeater control unit RCNT determines whether or not the address signal A received together with the read request signal indicates the memory group MG on the preceding stage side (the preceding stage or a stage before the preceding stage). The repeater control unit RCNT executes Step S214 if the address signal A indicates the memory group MG on the preceding stage side, or executes Step S216 if the address signal A does not indicate the memory group MG on the preceding stage side.

At Step S214, the repeater control unit RCNT outputs a read enable signal RDEN at the low level. In addition, the repeater control unit RCNT causes the selector SELQ to select a memory read data signal Q from the memory group MG at the preceding stage or a memory read data signal Q from the memory group control unit MCNT at the preceding stage. Accordingly, the memory read data signal Q read from one of the columns of memory units MUC of the memory group MG on the preceding stage side can be transferred to the succeeding stage. Note that the repeater control unit RCNT receives the read enable signal RDEN at the high level output from the memory group control unit MCNT at the preceding stage by the OR circuit OR, and transfers the signal to the memory group control circuit MCNT at the succeeding stage. After Step S214, Step S220 is executed.

At Step S216, the repeater control unit RCNT outputs a read enable signal RDEN at the low level. In addition, the repeater control unit RCNT causes the selector SELQ to select an invalid memory read data signal Q from the memory group control unit MCNT at the preceding stage. Note that the repeater control unit RCNT may cause the selector SELQ to select an invalid memory read data signal Q from the memory group MG at the preceding stage. After Step S216, Step S220 is executed.

At Step S220, the repeater control unit RCNT sets the mask circuits MSKC and MSKR to the masked state, and ends the operations illustrated in FIG. 11.

FIG. 12 illustrates an example of Step S220 in FIG. 11. At Step S222, the repeater control unit RCNT sets the mask circuit MSKC to the mask-released state, and permits transfer of the control signal CMD and the address signal A to the memory group control unit MCNT at the succeeding stage.

Next, at Step S224, based on the address signal A received together with the read request signal, the repeater control unit RCNT determines whether or not the memory group MG on the preceding stage side executes a read operation. If the memory group MG on the preceding stage side executes the read operation, Step S226 is executed. If the memory group MG on the preceding stage side does not execute the read operation, Step S228 is executed.

At Step S226, the repeater control unit RCNT sets the mask circuit MSKR to the mask-released state so that the memory read data signal Q from the memory group MG at the preceding stage or the memory read data signal Q from the memory group control unit MCNT at the preceding stage can be transferred to the succeeding stage. After Step S226, Step S230 is executed.

At Step S228, the repeater control unit RCNT sets the mask circuit MSKR to the masked state because the memory read data signal Q from the memory group MG at the preceding stage or the memory read data signal Q from the memory group control unit MCNT at the preceding stage is not transferred. By suppressing transfer of an invalid memory read data signal Q, the power consumption can be reduced. After Step S228, Step S230 is executed.

At Step S230, the repeater control unit RCNT sets the mask circuits MSKW1 and MSKW2 to the masked state, and ends the operations in FIG. 12. By suppressing transfer of an invalid write data signal D and an invalid memory write data signal D, the power consumption can be reduced.

FIG. 13 illustrates an example of Step S300 (write operation) in FIG. 9. First, at Step S302, the repeater control unit RCNT determines whether or not the address signal A received together with the write request signal indicates the own memory group MG. The repeater control unit RCNT executes Step S304 if the address signal A indicates the own memory group MG, or executes Step S312 if the address signal A does not indicate the own memory group MG.

At Step S304, the repeater control unit RCNT outputs a chip enable signal CEB at the low level and a write enable signal WEB at the low level to the column of memory units MUC as the write target indicated by the address signal A. The repeater control unit RCNT outputs a chip enable signal CEB at the high level and a write enable signal WEB at the high level to the column of memory units MUC not to be written.

Next, at Step S306, the repeater control unit RCNT outputs the bit write enable signal BWEB included in the control signal CMD and the address signal A received together with the control signal CMD to the own memory group MG.

Next, at Step S308, the repeater control unit RCNT outputs a read enable signal RDEN at the low level. The repeater control unit RCNT causes the selector SELQ to select an invalid memory read data signal Q from the memory group control unit MCNT at the preceding stage. Note that the repeater control unit RCNT may cause the selector SELQ to select an invalid memory read data signal Q from the memory group MG at the preceding stage.

Next, at Step S310, the repeater control unit RCNT sets the mask circuits MSKC and MSKW1 to the masked state, sets the mask circuit MSKW2 to the mask-released state, and ends the operations in FIG. 13. By setting the mask circuit MSKC to the masked state, transfer of the control signal CMD and the address signal A to the succeeding stage side not related to the write operation is suppressed, and thereby, the power consumption can be reduced. By setting the mask circuit MSKW1 to the masked state, transfer of the memory write data signal D to the succeeding stage is suppressed, and thereby, the power consumption can be reduced. By setting the mask circuit MSK2 to the mask-released state, the memory write data signal D can be transferred to the column of memory units MUC as the write target.

At Step S312, the repeater control unit RCNT outputs a chip enable signal CEB at the high level, a write enable signal WEB at the high level, and a bit write enable signal BWEB at the high level to each of the columns of memory units MUC. The repeater control unit RCNT outputs the address signal A at the low level to each of the columns of memory units MUC. Accordingly, as at Step S210 in FIG. 11, the power consumption can be reduced.

Next, at Step S314, the repeater control unit RCNT outputs a read enable signal RDEN at the low level. The repeater control unit RCNT causes the selector SELQ to select an invalid memory read data signal Q from the memory group control unit MCNT at the preceding stage. Note that the repeater control unit RCNT may cause the selector SELQ to select an invalid memory read data signal Q from the memory group MG at the preceding stage.

Next, at Step S316, the repeater control unit RCNT sets the mask circuits MSKC, MSKR, MSKW1, and MSKW2 to the masked state or the mask-released state. First, the repeater control unit RCNT sets the mask circuit MSCR to the masked state. Next, based on the address signal A received together with the write request signal, the repeater control unit RCNT determines whether or not the memory group MG on the preceding stage side executes a write operation.

If the memory group MG on the preceding stage side executes a write operation, the repeater control unit RCNT sets the mask circuits MSKC, MSKW1, and MSKW2 to the mask-released state. If the memory group MG on the preceding stage side does not execute a write operation, the repeater control unit RCNT sets the mask circuits MSKC and MSKW1 to the mask-released state, sets the mask circuit MSKW2 to the masked state, and then, ends the operations in FIG. 13. If the access request signal and the write data signal D are not transferred to the succeeding stage side, the repeater control unit RCNT sets the mask circuits MSKC and MSKW1 to the masked state, and thereby, the power consumption can be reduced.

Figure 14:
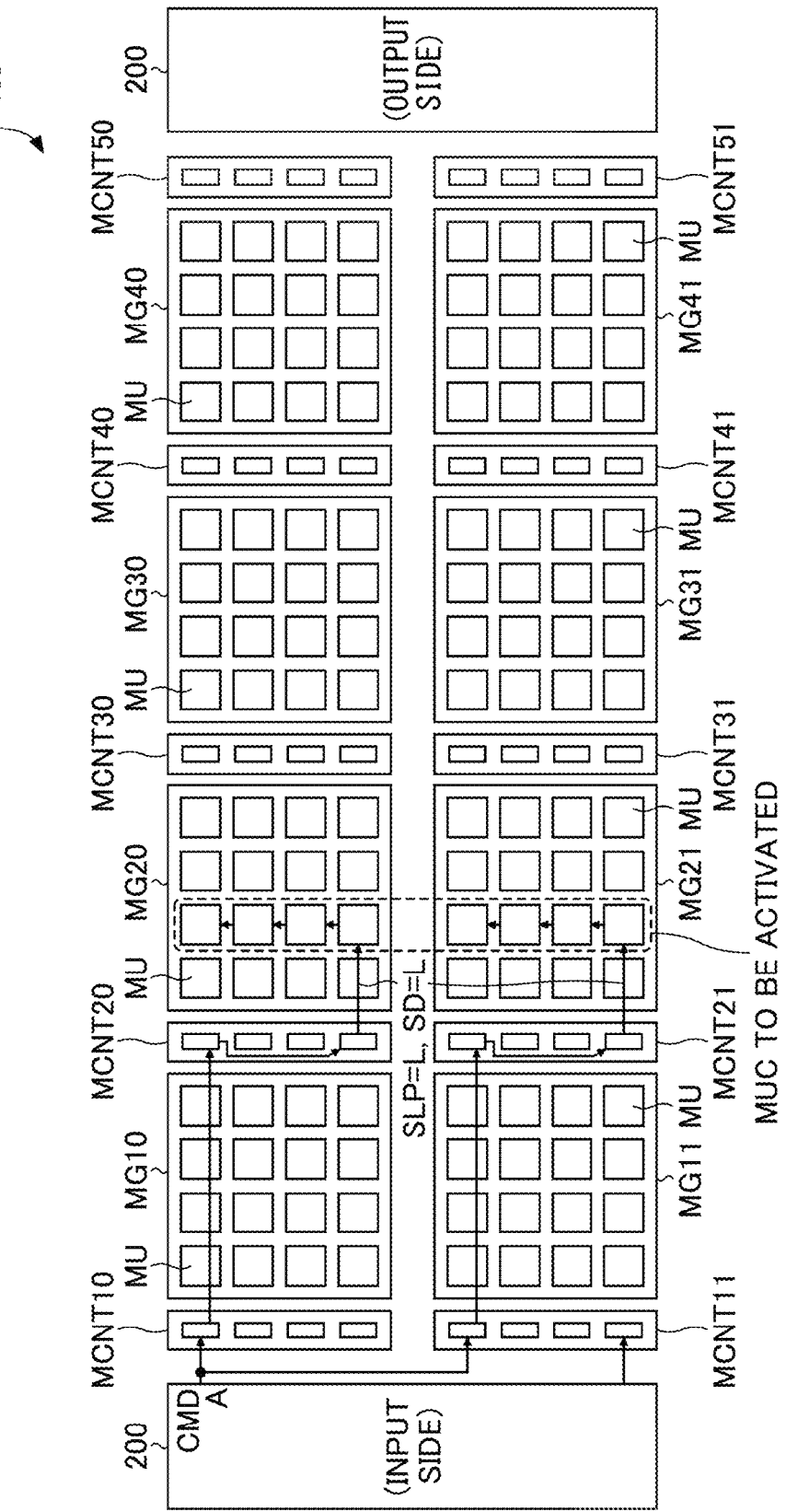
FIG. 14 is an explanatory diagram illustrating an example of operations to cause columns of memory units to transition to an active mode ACT in the memory circuit in FIG. 1.

FIG. 14 illustrates an example of operations to cause columns of memory units MUC to transition to the active mode ACT in the memory circuit 100 in FIG. 1. In FIG. 14, only signals used for transition to the active mode ACT are illustrated.

In the case of receiving an access request (a write request or a read request) signal during the shutdown mode SD, the memory control unit 200 outputs a state transition request to cause columns of memory units MUC as the access target to transition from the shutdown mode SD to the active mode ACT. In addition, in the case of receiving an access request signal during the sleep mode SLP, the memory control unit 200 outputs a state transition request to cause columns of memory units MUC as the access target to transition from the sleep mode SLP to the active mode ACT.

According to a command from the memory control unit 200, each of the memory group control units MCNT outputs a shutdown signal SD at the low level and a sleep signal SLP at the low level to the corresponding column of memory units MUC, if it is a memory state transition request to the column of memory units MUC in the own memory group. In the example illustrated in FIG. 14, the second column of memory units MUC of the memory group MG20 and the second column of memory units MUC of the memory group MG21 are collectively referred to as the target column of memory units MUC (denoted as "MUC TO BE ACTI-VATED" pointing to a dashed-line rectangle in the figure). In the following, the operations will be described in order until reaching the active state.

The memory control unit 200 outputs a state transition request to set the target column of memory units MUC to the active state to the memory group control units MCNT10 and MCNT11 at the first stage. Based on the address signal A included in the state transition request, the memory group control units MCNT10 and MCNT11 determine that none of the columns of memory units MUC included in the own memory groups MG10 and MG11 correspond to the target column of memory units MUC. Therefore, the memory group control units MCNT10 and MCNT11 transfer the state transition request to the memory group control units MCNT20 and MCNT21 at the succeeding stage, respectively.

Based on the address signal A included in the state transition request, the memory group control units MCNT20 and MCNT21 determine that columns of memory units MUC included in the own memory groups MG20 and MG21 correspond to the target column of memory units MUC.

Then, each of the memory group control units MCNT20 and MCNT21 outputs a sleep signal SLP at the low level and a shutdown signal SD at the low level to the target column of memory units MUC in the memory groups MG20 and MG21. Note that the memory group control units MCNT20 and MCNT21 determine that the columns of memory units MUC in the own memory groups MG20 and MG21 correspond to the target column of memory units MUC, and hence, do not transfer the state transition request to the succeeding stage memory group control units MCNT30, MCNT31, MCNT40, and MCNT41.

Figure 16:
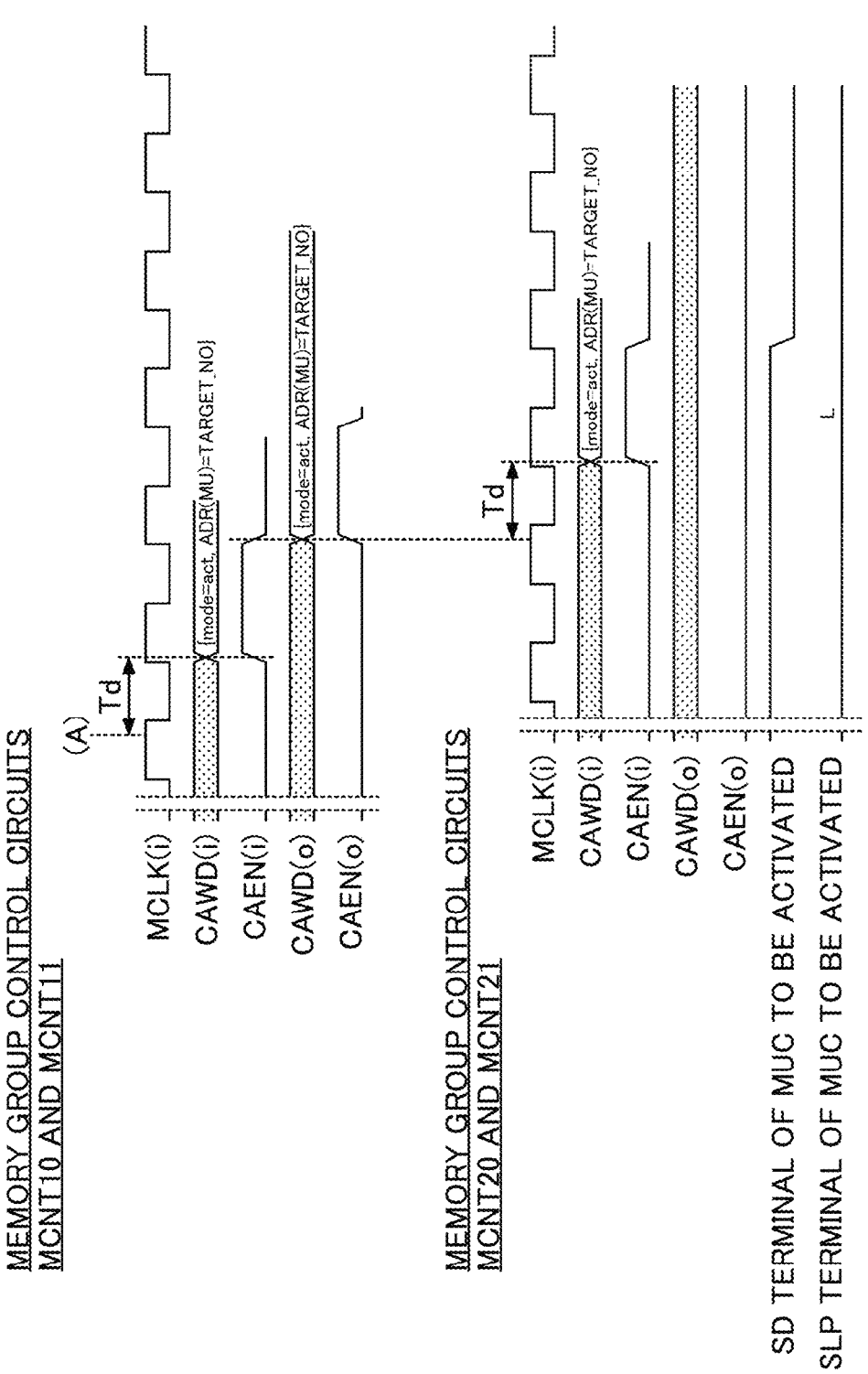
FIG. 16 is a timing chart illustrating the continuation of FIG. 15.

FIGS. 15 and 16 illustrate examples of timing of signals when transitioning to the active mode ACT in FIG. 14. FIGS. 15 and 16 illustrate timing waveforms of various signals corresponding to the operations described with FIG. 14. In FIGS. 15 and 16 and timing charts that will be described later, a reference symbol (i) at the end of a signal indicates an input signal to a target circuit, and a reference symbol (o) at the end of a signal indicates an output signal from a target circuit. In the following, each signal may be described by the reference symbol rather than the signal name. Signal names illustrated in waveforms of the timing chart in FIG. 15 and thereafter may be different from the signal names described above. For example, a reference symbol ID indicates a command signal and the like, a reference symbol ADR indicates an address signal A, and a reference symbol ETC indicates other control signals and the like. Reference symbols AWID(i), AWetc(i), and AWVLD(i) indicate request signals REQ from the system bus SBUS. A reference symbol AWA(i) indicates an address signal ADR from the system bus SBUS. A reference symbol AWRDY(o) indicates an ACK signal to the system bus SBUS.

The system bus input control unit 202 in FIG. 2 detects that an AWID signal, an AWA signal, and an AWetc signal being valid, which are examples of a request signal REQ and an address signal ADR, are being supplied from the system bus SBUS, based on an AWVLD signal at the high-level (an example of a request signal REQ and an address signal ADR) input from the system bus SBUS. The AWID signal includes information identifying a state transition request, and the AWA signal indicates an address used in the state transition request. The AWetc signal indicates additional information used in the state transition request.

The system bus input control unit 202 stores (pushes), in the buffer 204, a CAWD signal (data) that includes a control signal CMD including the additional information and a 512-bit address A as the access unit of the memory area, converted from the AWID signal, the AWA signal, and the AWetc signal received during the high-level period of the AWVLD signal. The system bus input control unit 202 confirms that there is a free entry in the buffer 204 based on a CAFULL signal at the low level, and then, outputs an AWRDY signal at the high level (an ACK signal) indicating that the state transition request has been received to the system bus SBUS. The CAFULL signal is set to the high level when there is no free entry in the buffer 204. A CAPUSH signal indicates a timing of storing in the buffer 204.

The input interface control unit 214 confirms information held in the buffer 204, and based on the address information, detects the column of memory units MUC subject to state transition. The input interface control unit 214 receives the state of the column of memory units MUC subject to the state transition as an MST signal from the memory state management unit 212.

For example, assume that the MST signal indicates the shutdown state SD or the sleep state SLP. In this case, the input interface control unit 214 outputs a command to transition to the active state and information indicating the column of memory units MUC as the activation target to the memory group control units MCNT10 and MCNT11 at the first stage. The command to transition to the active state and the information indicating the column of memory units MUC as the activation target are output to the memory group control units MCNT10 and MCNT11 as a CAWD signal in synchronization with a CAEN signal at the high level.

The command to transition to the active state is also output to the memory state management unit 212. The memory state management unit 212 changes the MST signal from the shutdown state SD to a transit state TOACT toward the active mode ACT in the next clock cycle after receiving the command to transition to the active state. Further, the memory state management unit 212 sets the MST signal to the active state ACT after a time T1 has elapsed.

In FIG. 16, a reference symbol (A) indicates the timing of the reference symbol (A) in FIG. 15. There is a physical distance from the outputs of the input interface control unit 214 to the inputs of the memory group control units MCNT10 and MCNT11. Therefore, a signal output from the input interface control unit 214 reaches the memory group control units MCNT10 and MCNT11 after a time Td. In this example, the columns of memory units MUC subject to the state transition are included in the memory groups MG at the succeeding stage of the memory group control units MCNT20 and MCNT21, and are controlled by the memory group control units MCNT20 and MCNT21. Therefore, after receiving the CAWD signal indicating the command to transition to the active state, the memory group control units MCNT10 and MCNT11 transfer the CAWD signal to the memory group control units MCNT20 and MCNT21 one clock cycle after the reception.

Based on the address included in the received CAWD signal, the memory group control units MCNT20 and MCNT21 detect that columns of memory units MUC in the own memory groups MG are the activation target. Then, the memory group control units MCNT20 and MCNT21 set the SD terminals of the columns of memory units MUC as the activation target from the high level to the low level, to cause it to transition to the active state. Note that the memory group control units MCNT20 and MCNT21 detect the columns of memory units MUC as the activation target, and thereby, mask the output of the CAWD(o) and CAEN(o) signals to the memory group control units MCNT30 and MCNT31 at the succeeding stage so as not to be transferred.

Figure 17:
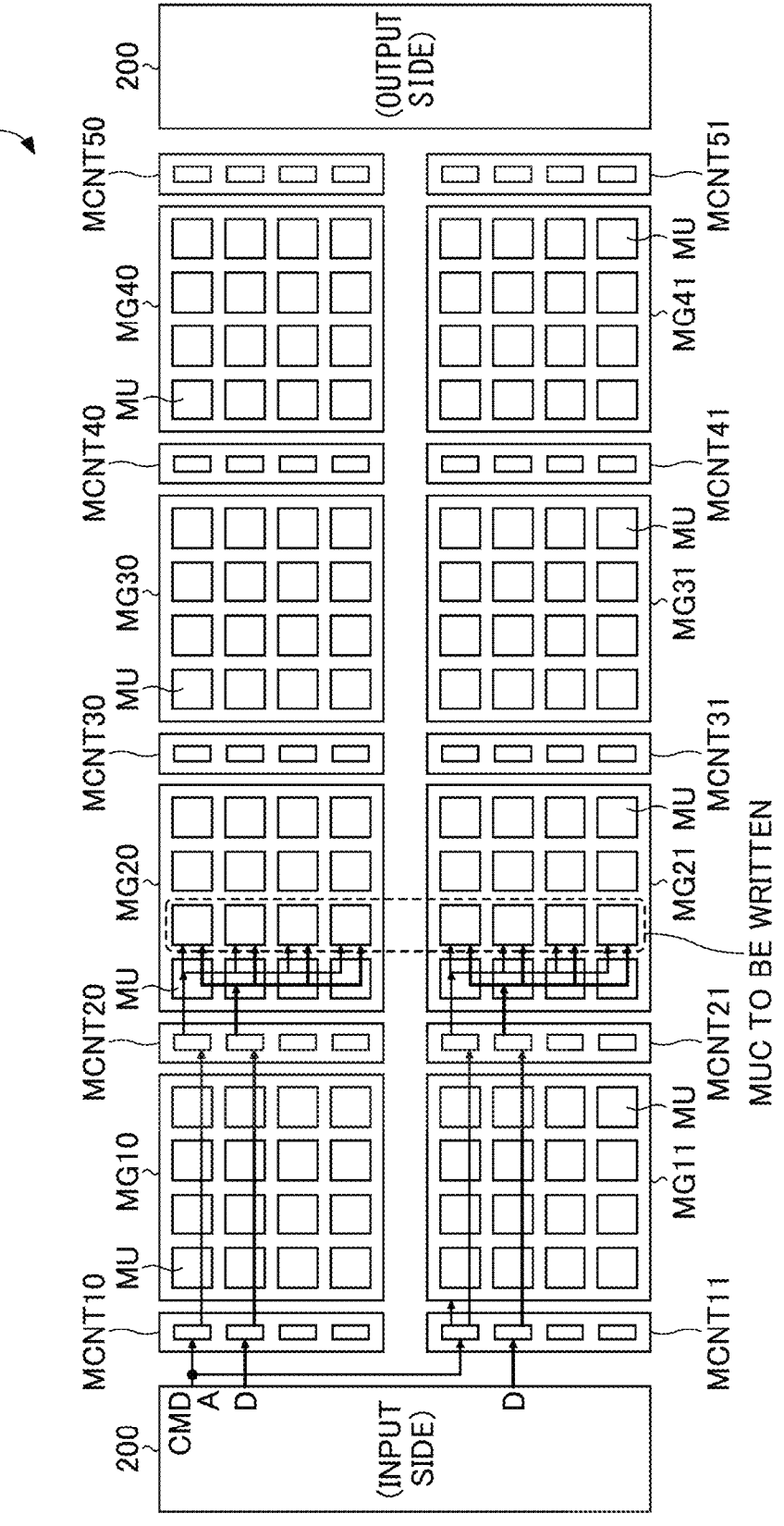
FIG. 17 is an explanatory diagram illustrating an example of a write operation of the memory circuit in FIG. 1.

FIG. 17 illustrates an example of a write operation of the memory circuit 100 in FIG. 1. Detailed description of operations substantially the same as in FIG. 14 will be omitted. In FIG. 17, operations in the memory groups MG20 and MG21 will be described when data is written to the columns of memory units MUC as the write target.

In the case of receiving a write request signal, as described with FIG. 2, the memory control unit 200 sequentially stores, in the buffer 206 illustrated in FIG. 2, 512 bits aggregating at a maximum of eight write data signals WD (each including, e.g., 64 bits) received via the system bus SBUS, and one bit of a LAST signal that will be described later (explanation of the LAST signal will be omitted below, unless otherwise noted). Note that in the case where the column of memory units MUC that includes memory cells as the write target is in the shutdown state, as illustrated in FIG. 14, the memory control unit 200 executes operations illustrated in FIG. 17 after causing the target column of memory units MUC to transition to the active state.

The memory control unit 200 outputs, for example, a 512-bit memory write data signal D together with a control signal CMD and an address signal A to the memory group control units MCNT10 and MCNT11 at the first stage. Based on the received address signals A, the memory group control units MCNT10 and MCNT11 determine that the own memory groups MG10 and MG11 are not the write target. Therefore, the memory group control units MCNT10 and MCNT11 transfer the control signal CMD, the address signal A, and the memory write data signal D to the memory group control units MCNT20 and MCNT21 at the succeeding stage.

Based on the received address signals A, the memory group control units MCNT20 and MCNT21 determine that the own memory groups MG20 and MG21 are the write target. Then, the memory group control units MCNT20 and MCNT21 output 64-bit memory write data signals D to the respective memory units MU as the write target. In addition, the memory group control units MCNT20 and MCNT21 output the control signal CMD and the address signal A to each of the memory units MU as the write target. Then, the write data is written to memory cells of the write target.

As illustrated in FIG. 17, as the address signal received together with the write request signal indicates the own memory group MG, the memory group control units MCNT20 and MCNT21 mask transfer of the control signal CMD, the address signal A, and the memory write data signal D to the memory group control units MCNT30 and MCNT31 at the succeeding stage. In the case where the address signal received together with the write request signal indicates a group other than the own memory group MG, each of the memory group control units MCNT transfers the address signal and the write request signal to the memory group control unit MCNT at the succeeding stage. Accordingly, for example, compared with the case where the control signal CMD, the address signal A, and the memory write data signal D are commonly supplied to each of the memory groups MG, charge and discharge currents of the command line CMD, the address line A, and the write data line D can be suppressed. As a result, increase in power consumption can be suppressed while further suppressing increase in access time of the memory circuit 100.

Figure 18:
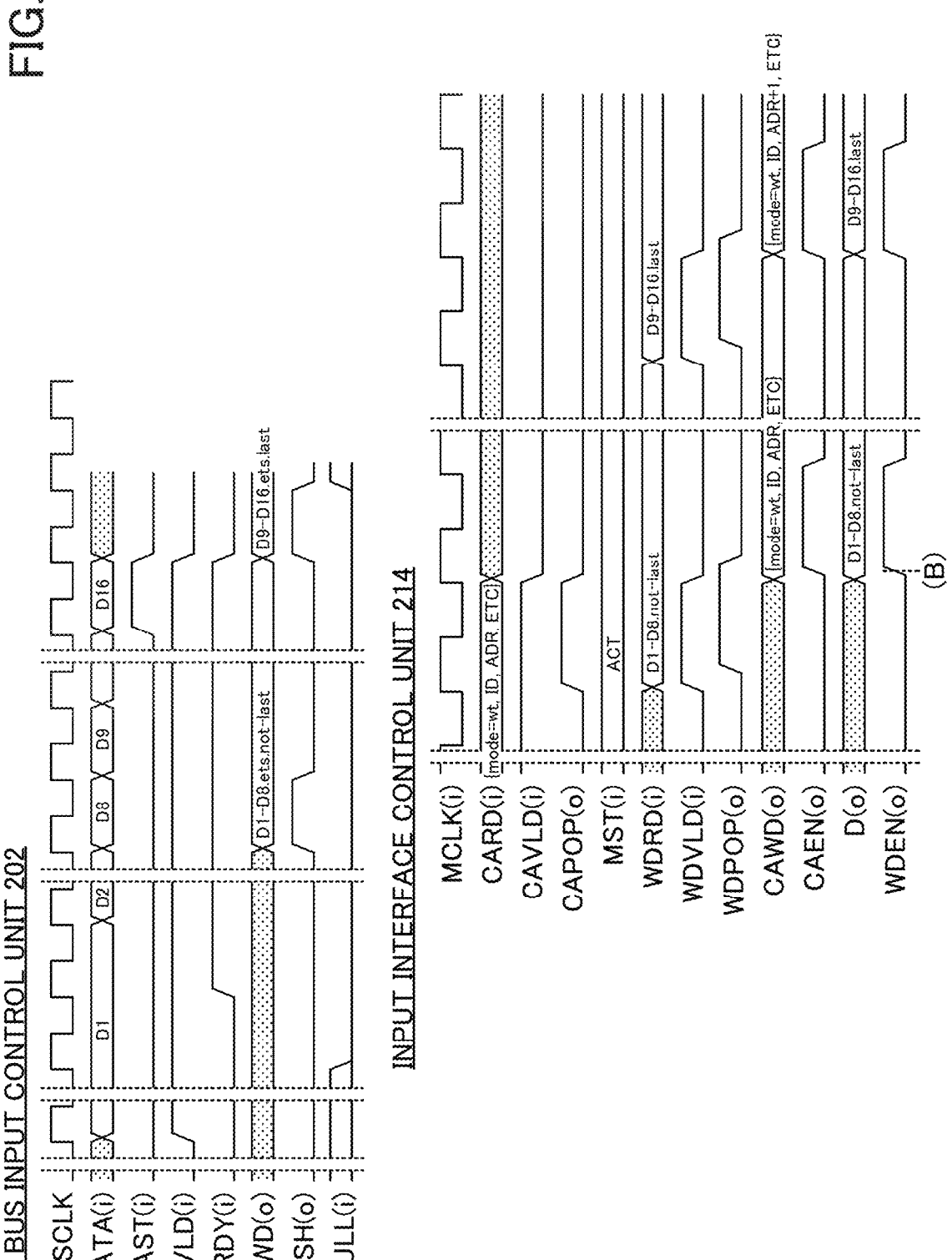
FIG. 18 is a timing chart illustrating an example of timing of signals during the write operation in FIG. 17.
Figure 19:
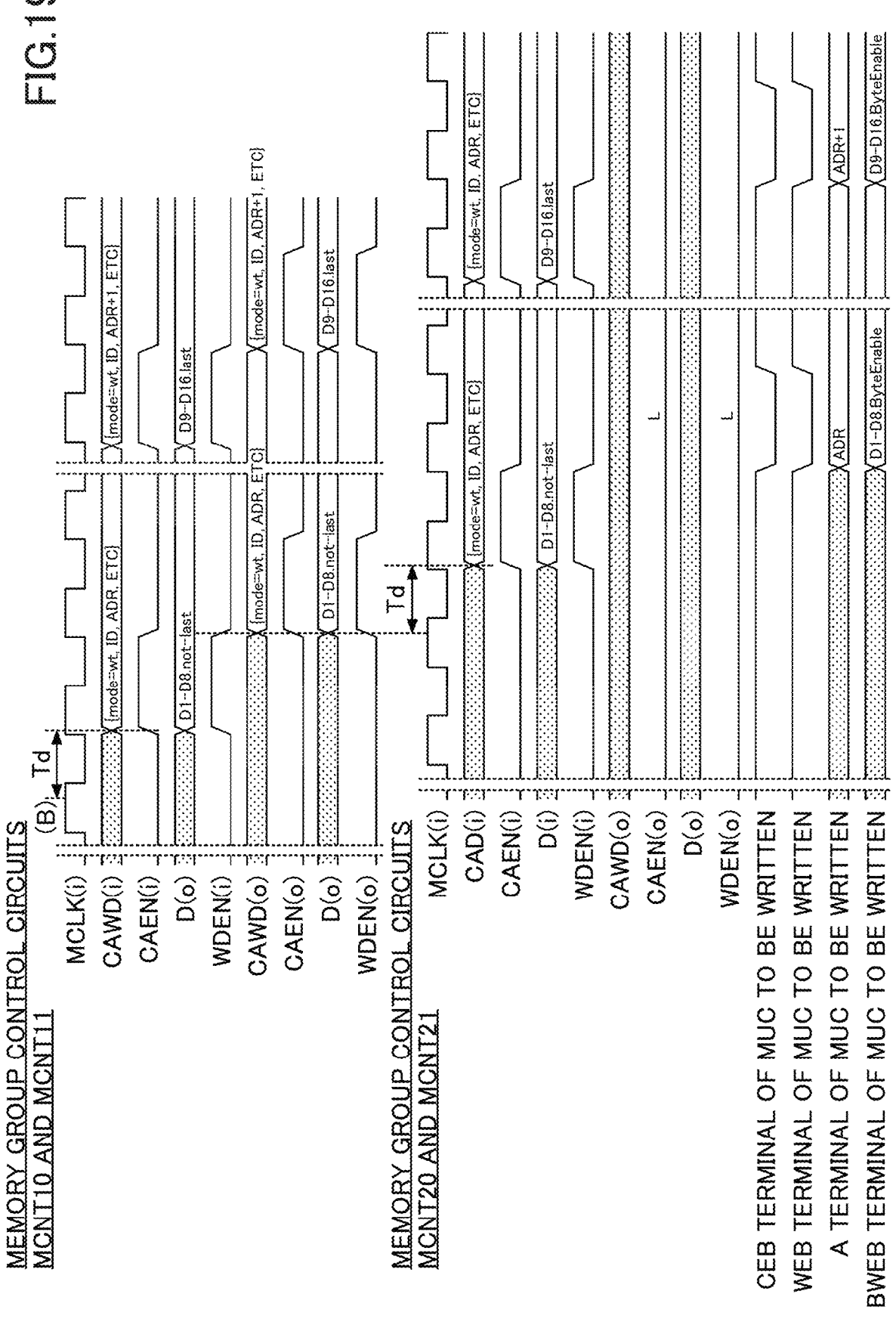
FIG. 19 is a timing chart illustrating the continuation of FIG. 18.

FIGS. 18 to 19 illustrate examples of timing of signals during the write operation in FIG. 17. Detailed description of operations substantially the same as in FIGS. 15 and 16 will be omitted. FIGS. 18 and 19 illustrate timing waveforms of various signals corresponding to the write operation described with FIG. 17.

The system bus input control unit 202 in FIG. 2 detects that a valid WDATA signal (data) or the like is being supplied based on a WVLD signal at the high level. The WDATA signal includes data to be written to memory cells by the write operation, a write address, and the like.

The system bus input control unit 202 temporarily stores the WDATA signal received during the high-level period of the WVLD signal, and stores (pushes) data aggregated at a maximum of eight times in 512 bits in the buffers 204 and 206. The system bus input control unit 202 confirms that there is a free entry in the buffers 204 and 206 based on a WDFULL signal at the low level, and then, outputs a WRDY signal at the high level (an ACK signal) indicating that the write request has been received to the system bus SBUS.

A WDPUSH signal indicates timings of storing the write data and the like in the buffers 204 and 206. In this embodiment, every time 64-bit data is received eight times from the system bus SBUS, 512-bit data is collectively stored in the buffer 206. At this time, a WLAST signal indicating that data from the system bus SBUS is the last one is stored in the buffer 204. Here, "not-last" in the write data signal D indicates that it is not the last data, and "last" indicates that it is the last data.

In the case where a write request is detected from the information held in the buffer 204, the input interface control unit 214 reads the control signal CMD, the address signal A, and the memory write data signal D from the buffers 204 and 206. The input interface control unit 214 determines whether or not it is the last memory write data signal D, based on "last" or "not-last" in the WDRD. In this example, it is illustrated that the 512-bit memory write data signal D is obtained twice from the buffer 206.

Based on the control signal CMD, the address signal A, and the memory write data signal D read from the buffers 204 and 206, the input interface control unit 214 generates a CAWD signal, a CAEN signal, a D signal, and a WDEN signal, and outputs these signals to the memory group control units MCNT10 and MCNT11 at the first stage.

In FIG. 19, a reference symbol (B) indicates the timing of the reference symbol (B) in FIG. 18. The memory group control units MCNT10 and MCNT11 receive the signals output from the input interface control unit 214 after the time Td. Based on the received control signal CMD and address signal A, the memory group control units MCNT10 and MCNT11 determine that the own memory groups MG are not the write access target. Therefore, the memory group control units MCNT10 and MCNT11 transfer the signals received from the input interface control unit 214 to the memory group control units MCNT20 and MCNT21 at the succeeding stage.

Based on the received control signal CMD and address signal A, the memory group control units MCNT20 and MCNT21 detect that the columns of memory units MUC in the own memory groups MG are the write target. Then, the memory group control units MCNT20 and MCNT21 set the CEB terminal and the WEB terminal of the column of memory units MUC of the write target to the low level. In addition, the memory group control units MCNT20 and MCNT21 output the address A and the bit write enable signal BWEB to the A terminal and the B terminal of the column of memory units MUC as the write target. Accordingly, data is written to memory cells of the column of memory units MUC as the write target. As the address signal A received together with the write request signal indicates the own memory group MG, the memory group control units MCNT20 and MCNT21 mask transfer of the signals CAWD (o), CAEN(o), D(o), and WDEN(o) to the memory group control units MCNT30 and MCNT31 at the succeeding stage.

Figure 20:
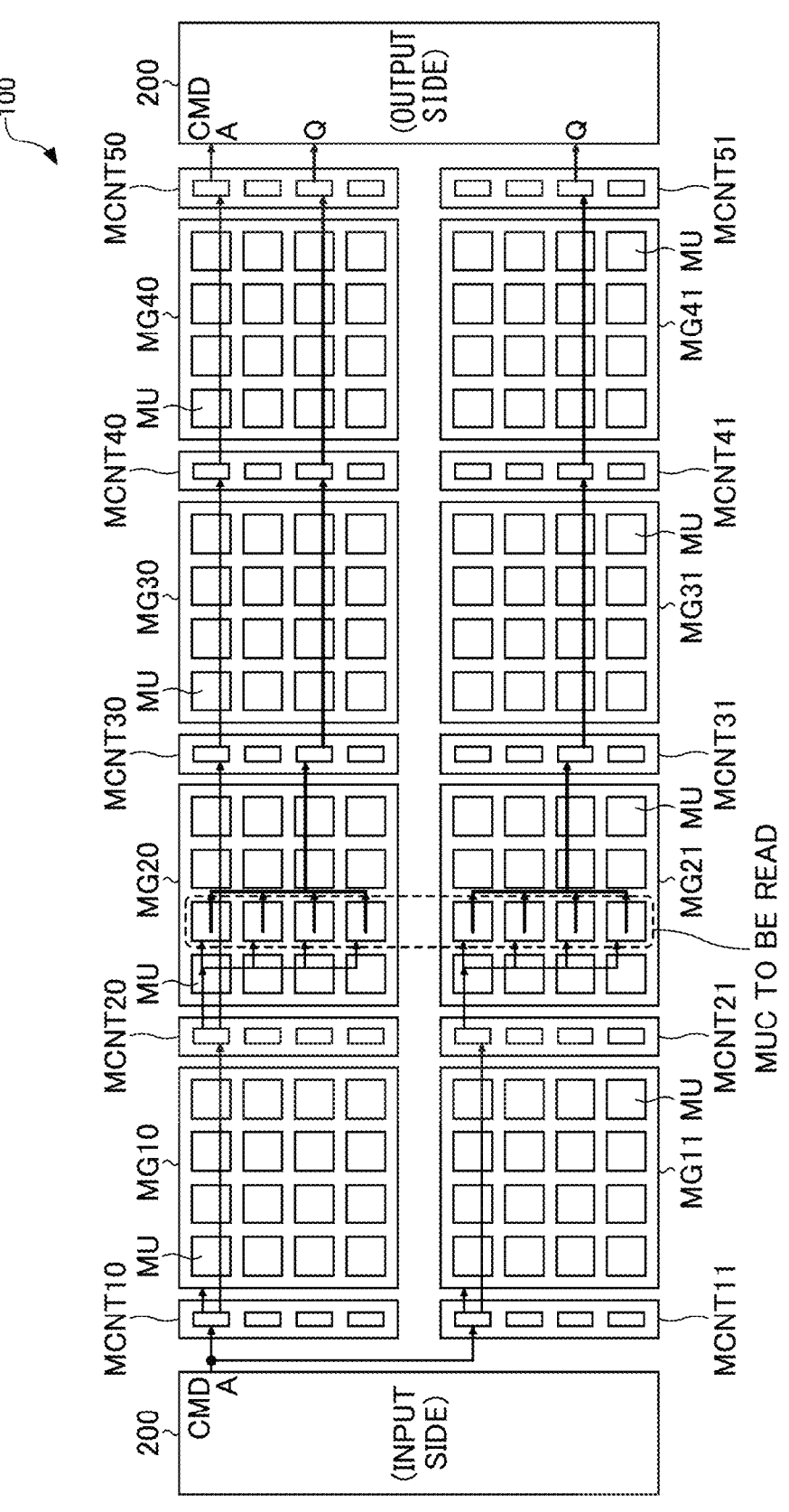
FIG. 20 is an explanatory diagram illustrating an example of a read operation of the memory circuit in FIG. 1.

FIG. 20 illustrates an example of a read operation of the memory circuit 100 in FIG. 1. Detailed description of operations substantially the same as in FIGS. 14 and 17 will be omitted. In FIG. 20, operations in the memory groups MG20 and MG21 will be described when data is read from columns of memory units MUC as the read target.

In the case of receiving a read request, the memory control unit 200 operates in substantially the same way as in the case of receiving a write request, except that a memory write data signal D is not received. Note that in the case where the column of memory units MUC that includes memory cells as the read target is in the shutdown state, as illustrated in FIG. 14, the memory control unit 200 executes operations illustrated in FIG. 20 after causing the target column of memory units MUC (denoted as "MUC TO BE READ" in the figure) to transition to the active state.

The memory control unit 200 (on the input side) outputs the control signal CMD and the address signal A to the memory group control units MCNT10 and MCNT11 at the first stage. Based on the received address signal A, the memory group control units MCNT10 and MCNT11 determine that the own memory groups MG10 and MG11 are not the read target. Therefore, the memory group control units MCNT10 and MCNT11 transfer the control signal CMD and the address signal A to the memory group control units MCNT20 and MCNT21 at the succeeding stage.

Based on the received address signals A, the memory group control units MCNT20 and MCNT21 determine that the own memory groups MG20 and MG21 are the read target. Then, the memory group control units MCNT20 and MCNT21 output the control signal CMD and the address signal A to each of the memory units MU as the read target. Then, the memory read data signal Q is read from memory cells as the read target, and output to the memory group control units MCNT30 and MCNT31 at the succeeding stage.

The memory group control units MCNT30 and MCNT31 transfer the received control signal CMD, address signal A, and memory read data signal Q to the memory group control units MCNT40 and MCNT41 at the succeeding stage. The memory group control units MCNT40 and MCNT41 transfer the received control signal CMD, address signal A, and memory read data signal Q to the succeeding stage memory group control units MCNT50 and MCNT51. The memory group control units MCNT50 and MCNT51 output the received memory read data signal Q to the memory control unit 200 (on the output side) based on the received control signal CMD and address signal A. The memory control unit 200 outputs the received 512-bit memory read data signal Q as serial read data signals DT (each including, e.g., 64 bits), divided multiple times.

In a read operation, the memory block MBLK can receive an access request signal from the memory control unit 200 (on the input side), and output a memory read data signal Q to the memory control unit 200 (on the output side). Accordingly, the sum of the length of a signal line that transfers the access request signal from the memory control unit 200 to the memory group MG as the read target and the length of a signal line that transfers the memory read data signal Q to the memory control unit 200 can be made virtually constant regardless of the access location. As a result, the fluctuation of the read-access time that would occur depending on the location of the memory group MG that executes the read operation can be suppressed.

In the case where the address signal A included in the read request signal indicates the own memory group MG, each of the memory group control units MCNT outputs the read request signal to the own memory group MG. In the case where the address signal included in the read request signal indicates a group other than the own memory group MG, each of the memory group control units MCNT transfers the read request signal to the memory group control unit MCNT at the succeeding stage.

Figure 21:
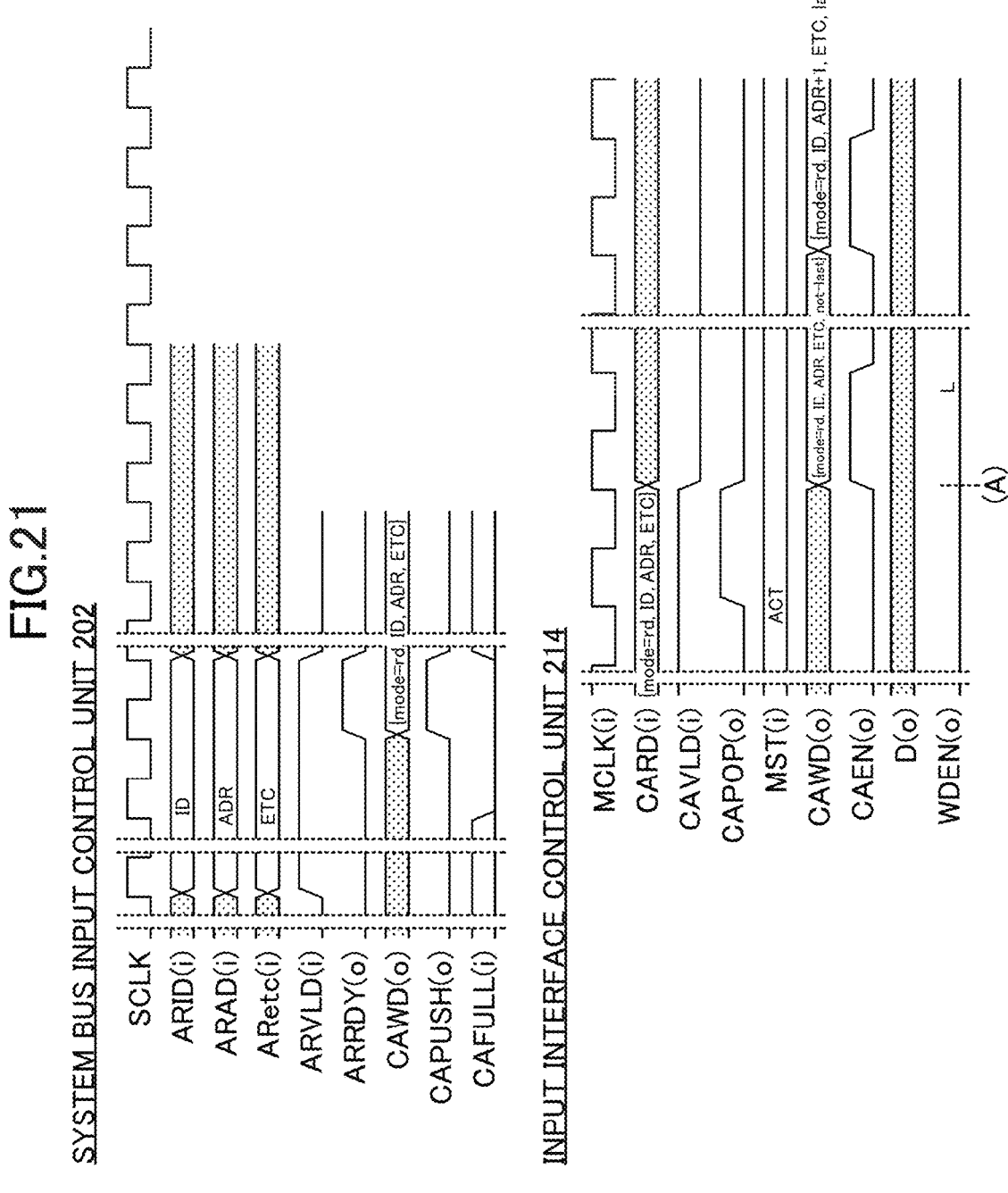
FIG. 21 is a timing chart illustrating an example of timing of signals during a read operation in FIG. 20.
Figure 22:
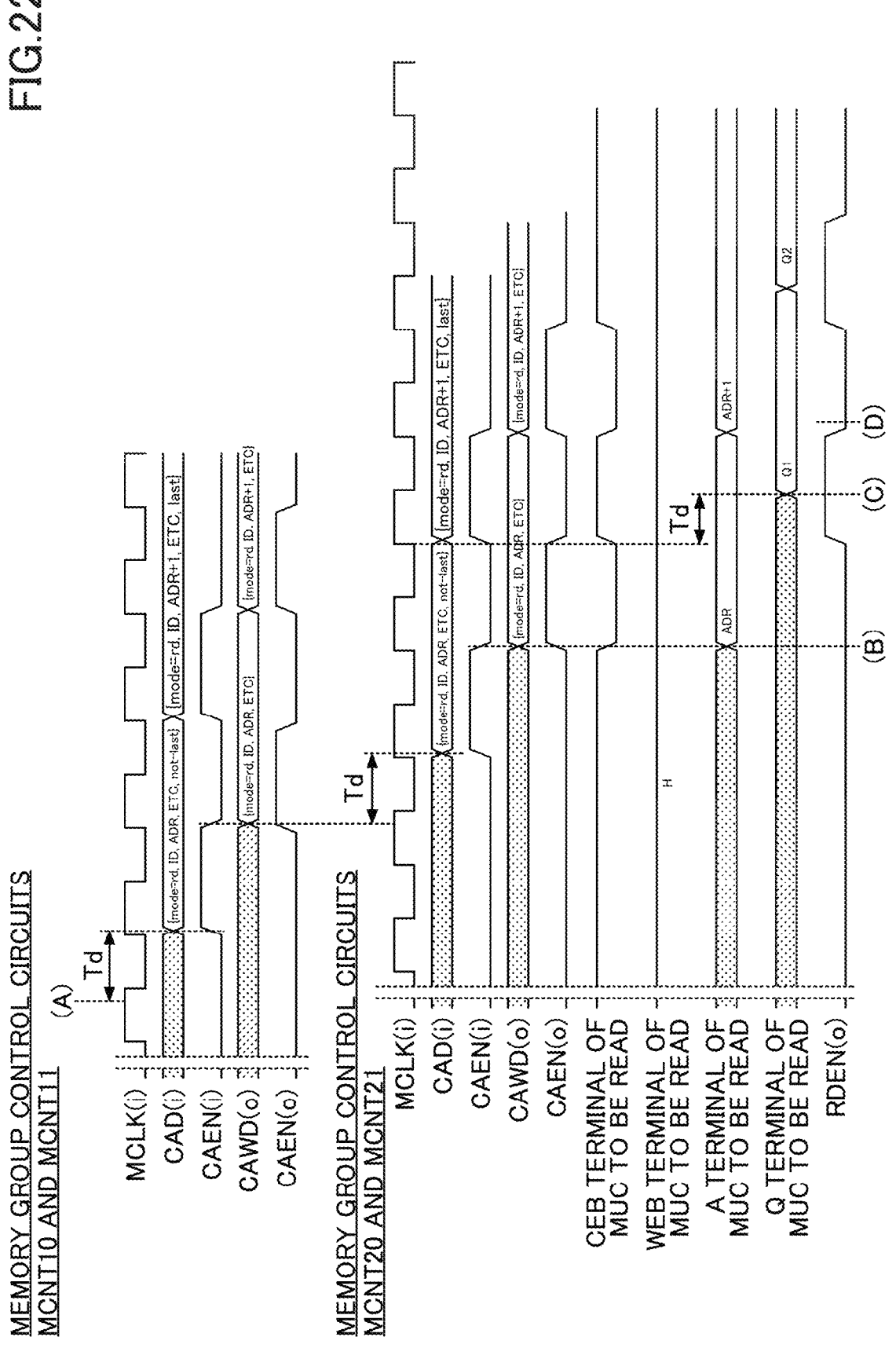
FIG. 22 is a timing chart illustrating the continuation of FIG. 21.
Figure 23:
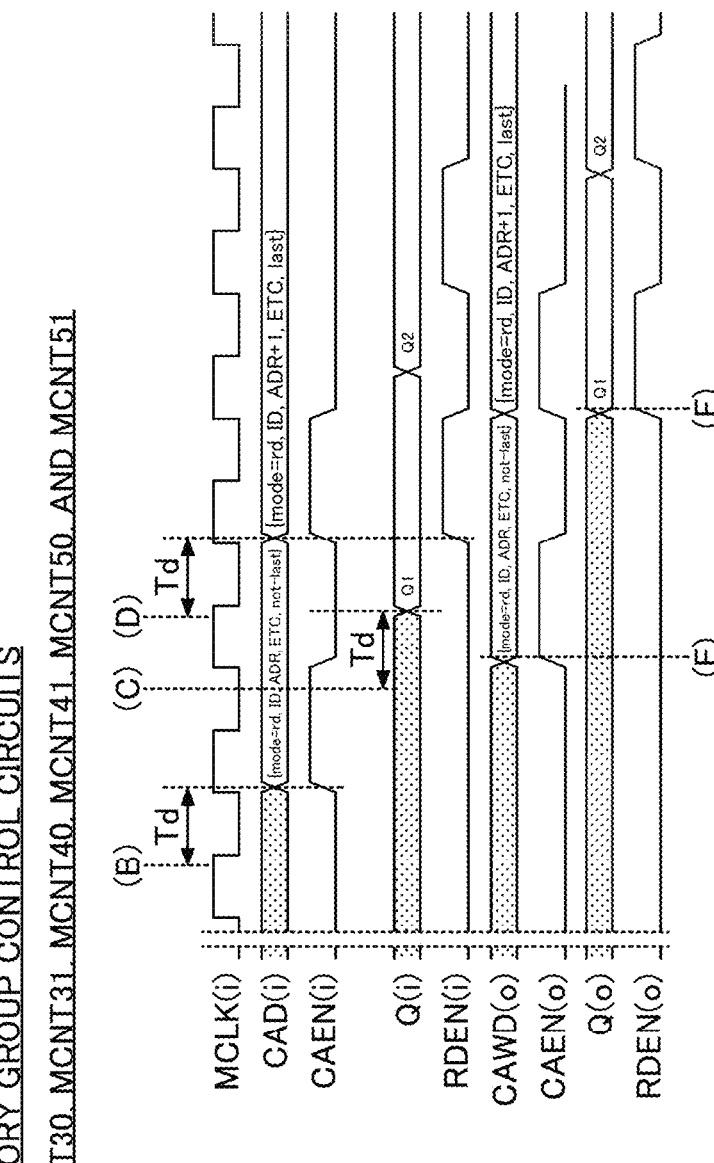
FIG. 23 is a timing chart illustrating the continuation of FIG. 22.
Figure 24:
FIG. 24 is a timing chart illustrating the continuation of FIG. 23.
Figure 25:
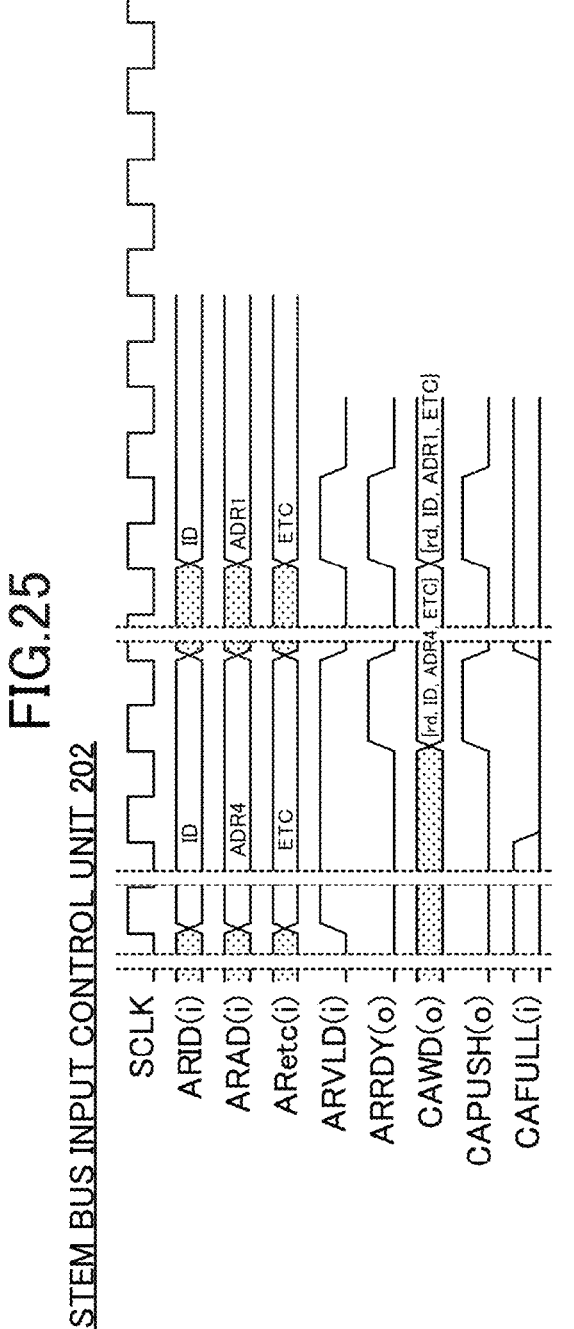
FIG. 25 is a timing chart illustrating another example of timing of signals during a read operation of the memory circuit in FIG. 1.
Figure 25:
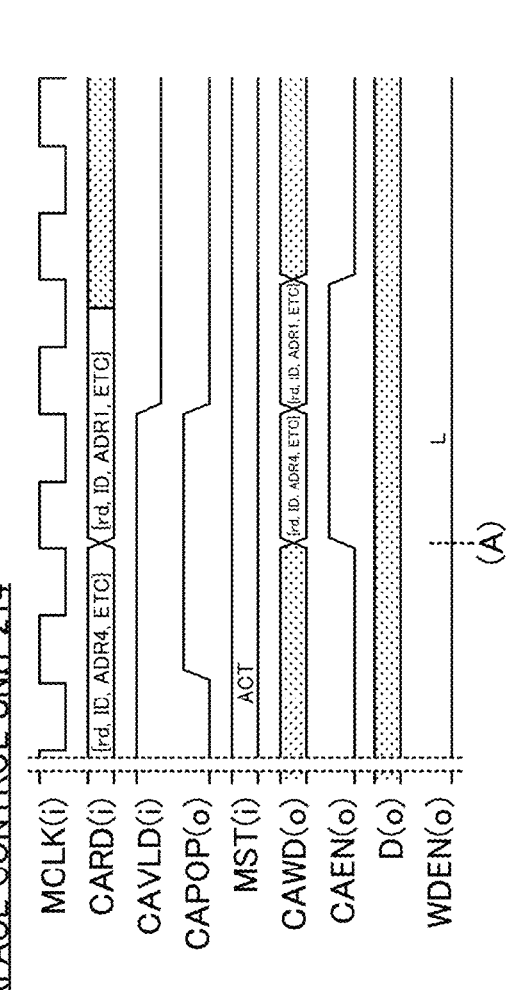
Figure 26:
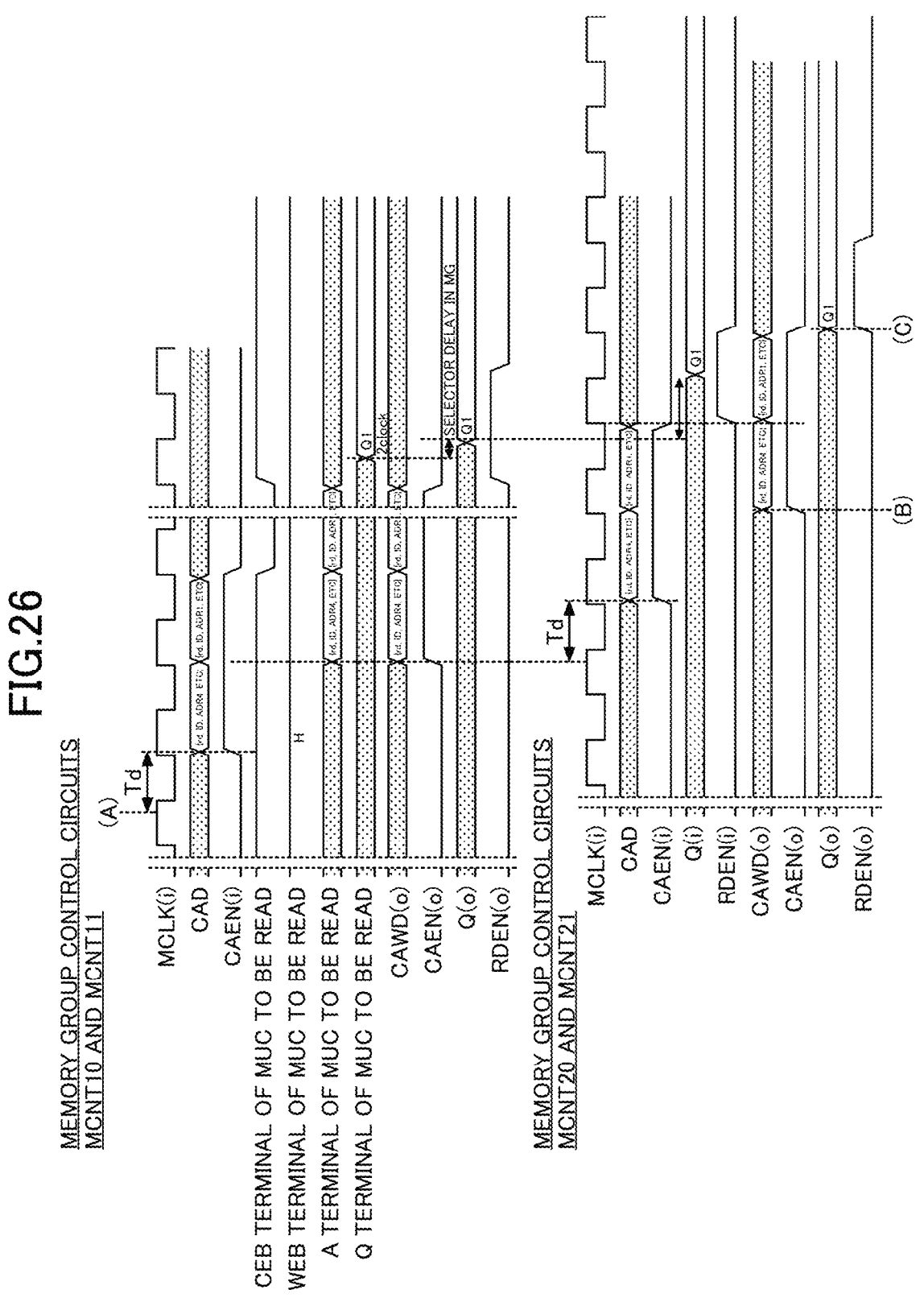
FIG. 26 is a timing chart illustrating the continuation of FIG. 25.
Figure 27:
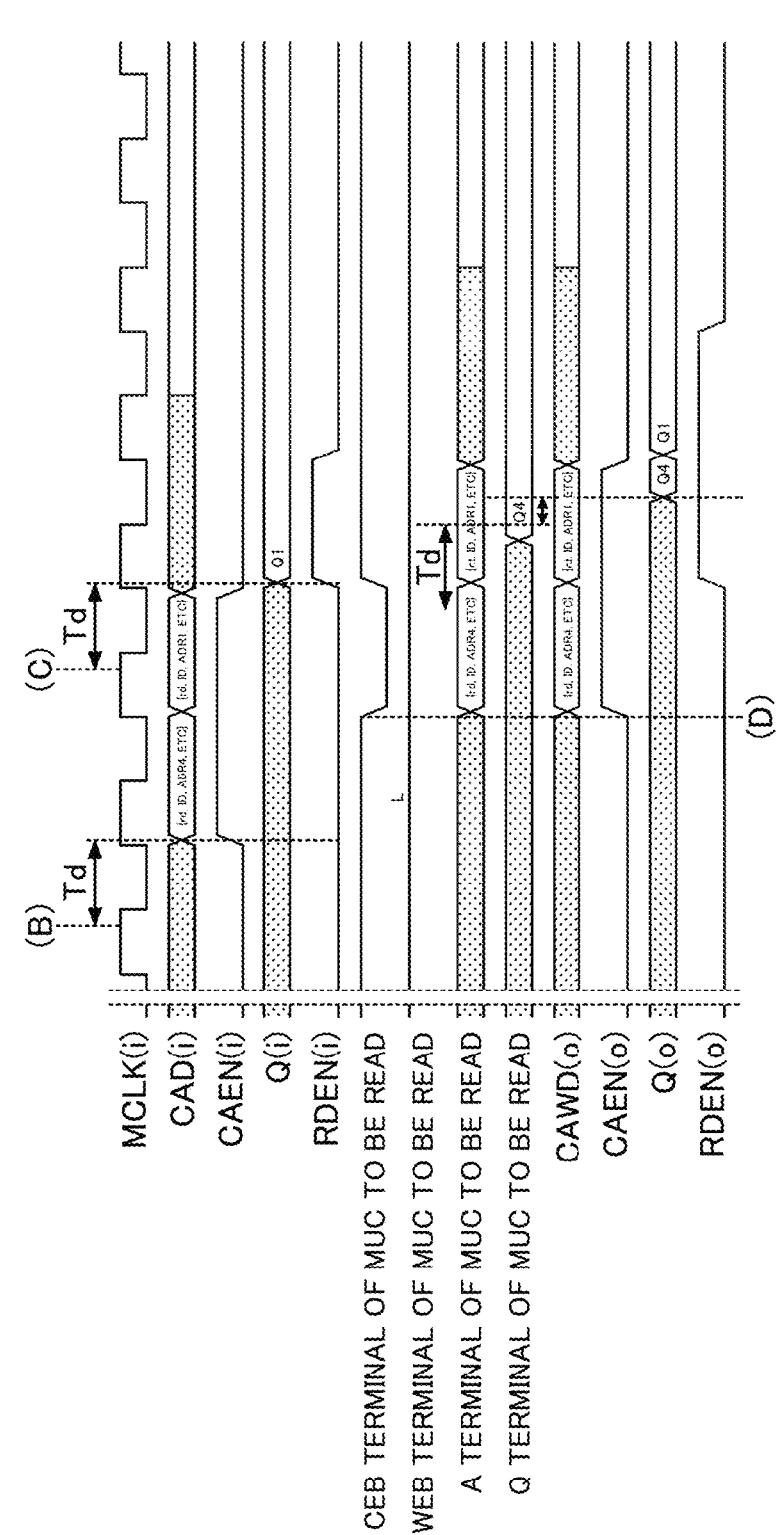
FIG. 27 is a timing chart illustrating the continuation of FIG. 26.
Figure 28:
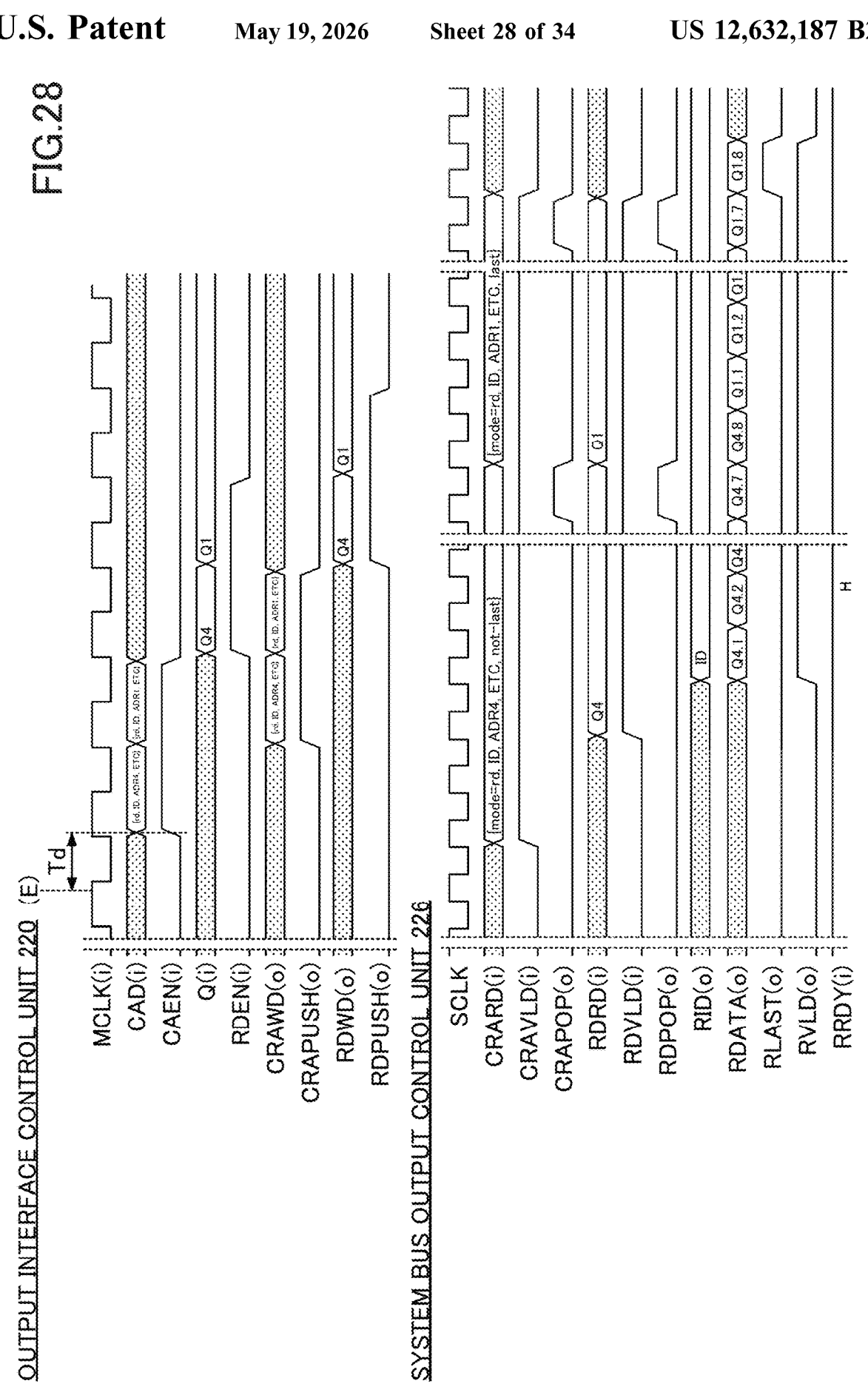
FIG. 28 is a timing chart illustrating the continuation of FIG. 27.

FIGS. 21 to 24 illustrate examples of timing of signals during the read operation in FIG. 20. Detailed description of operations substantially the same as in FIGS. 15, 16, 18, and 19 will be omitted. FIGS. 21 and 24 illustrate timing waveforms of various signals corresponding to the read operation described with FIG. 20. Reference symbols ARID (i), ARetc(i), and ARVLD(i) indicate request signals REQ from the system bus SBUS. A reference symbol ARAD(i)

indicates an address signal ADR from the system bus SBUS. A reference symbol ARRDY(o) indicates an ACK signal to the system bus SBUS.

In FIG. 21, the system bus input control unit 202 in FIG. 2 stores (pushes), in the buffer 204, a CAWD signal (data) that includes a control signal CMD including additional information and an address A indicating 512 bits as the access unit of the memory area, converted from an ARID signal (command), an ARAD signal (address), and an ARetc signal (the other signal), which are examples of the request signal REQ and the address signal ADR received from the system bus SBUS during the high-level period of an ARVLD signal (an example of the request signal REQ and the address signal ADR) input from the system bus SBUS. The system bus input control unit 202 confirms that there is a free entry in the buffer 204 based on a CAFULL signal at the low level input from the system bus SBUS, and then, outputs an ARRDY signal at the high level (an ACK signal) indicating that the read request has been received to the system bus SBUS. A CAPUSH signal indicates a timing of storing the read request signal included in the read request in the buffer 204.

In the case where a read request is detected from the information held in the buffer 204, the input interface control unit 214 reads the control signal CMD, the address signal A, and the like from the buffer 204. Based on the control signal CMD and the address signal A read from the buffer 204, the input interface control unit 214 outputs information used for read access to the memory group control units MCNT10 and MCNT11 at the first stage. For example, the signals output to be used for the read access are the CAWD signal, the CAEN signal, and the WDEN signal. Note that the write data line D is not used in a read operation.

A read request may not be completed by a single access to the column of memory units MUC in the case where the burst length, which is the number of outputs of read data signals RDT for a single read request, is great. In this case, the input interface control unit 214 generates the second and subsequent read requests. Here, "not-last" in the CAWD indicates that the read request is not the last one, and "last" indicates that it is the last one.

In FIG. 22, a reference symbol (A) indicates the timing of the reference symbol (A) in FIG. 21. The memory group control units MCNT10 and MCNT11 receive the signals output from the input interface control unit 214 after the time Td. Based on the received control signal CMD and address signal A, the memory group control units MCNT10 and MCNT11 determine that the own memory groups MG are not the read access target. Therefore, the memory group control units MCNT10 and MCNT11 transfer the signals received from the input interface control unit 214 to the memory group control units MCNT20 and MCNT21 at the succeeding stage.

Based on the received control signal CMD and address signal A, the memory group control units MCNT20 and MCNT21 detect that the columns of memory units MUC in the own memory groups MG are the read target. Then, the memory group control units MCNT20 and MCNT21 set the CEB terminals of the columns of memory units MUC as the read target to the low level, and set the WEB terminals to the high level. In addition, the memory group control units MCNT20 and MCNT21 output the address A to the A terminals of the columns of memory units MUC as the read target. Accordingly, data is read from memory cells of the column of memory units MUC as the read target.

In order to transfer the memory read data signal Q to the memory group control unit MCNT at the succeeding stage, the memory group control units MCNT20 and MCNT21 generate a read data enable signal IRDEN (FIG. 7). The read data enable signal IRDEN is output to the memory group control units MCNT30 and MCNT31 as the read data enable signal RDEN.

In addition, in a read operation, serial-parallel conversion is applied to the memory read data signal Q read from the columns of memory units MUC by the system bus output control unit 226, to be output to the system bus SBUS as the read data signal RDT. Therefore, the memory group control units MCNT20 and MCNT21 output the received control signal CMD and address signal A together with the memory read data signal Q to the memory group control units MCNT30 and MCNT31.

In FIG. 23, reference symbols (B), (C), and (D) indicate the respective timings of the reference symbols (B), (C), and (D) in FIG. 23. The memory group control units MCNT30 and MCNT31 receive the signals output from the memory group control units MCNT20 and MCNT21 after the time Td. The memory group control units MCNT30 and MCNT31 transfer the received control signal CMD, address signal A, and memory read data signal Q to the memory group control units MCNT40 and MCNT41. The memory group control units MCNT40 and MCNT41 transfer the received control signal CMD, address signal A, and memory read data signal Q to the memory group control units MCNT50 and MCNT51. The memory group control units MCNT50 and MCNT51 output the received control signals CMD, address signal A, and memory read data signal Q to the memory control unit 200.

In FIG. 24, reference symbols (E) and (F) indicate the respective timings of the reference symbols (E) and (F) in FIG. 23. The output interface control unit 220 of the memory control unit 200 stores (pushes) the received control signal CMD and address signal A in the buffer 222, and stores (pushes) the received memory read data signal Q in the buffer 224. The system bus output control unit 226 of the memory control unit 200 refers to a CRAVLD signal output from the buffer 222 and an RDVLD signal output from the buffer 224, and waits for the buffers 222 and 224 transitioning to a readable state (a valid state). In the case where the buffers 222 and 224 have transitioned to a readable state and the system bus SBUS is in a ready state (RRDY=H), the system bus output control unit 226 generates an RID signal and an RDATA signal to be output to the system bus SBUS. The RID signal and the RDATA signal are generated to convey read data RDATA (an example of the read data signal RDT) and additional information RID together with RLAST to the system bus side, by using the control signal CMD and the address signal A held in the buffer 222 and the memory read data signal Q held in the buffer 224. In addition, the system bus output control unit 226 sets an RVLD signal indicating that the output signal to the system bus SBUS is valid to the valid level (RVLD=H). The read data from the memory block MBLK is 512-bit data, whereas the read data on the system bus SBUS side is 64-bit data. Therefore, the read data is output to the system bus SBUS, divided into a maximum of eight times. Once a CRAPOP signal and an RDPOP signal are set to the valid level (H), a next set of command, address, and data are output to the buffers 222 and 224.

In the example illustrated in FIG. 24, the system bus output control unit 226 sequentially selects the 512-bit memory read data signal Q read from the memory block MBLK in accordance with the 64-bit data bus width on the system bus SBUS side. Items from the first 64-bit data Q1.1 to Q1.8 are output to the system bus SBUS by eight clocks.

Further, the next 512-bit memory read data signal Q from the memory block MBLK is also output to the system bus SBUS by eight clocks from data Q2.1 to Q2.8. Then, the system bus output control unit 226 outputs an RLAST at the valid level (e.g., the high level) when outputting the data Q2.8 as the last memory read data signal Q, and ends the read operation.

FIGS. 25 to 28 illustrate other examples of timing of signals during a read operation of the memory circuit 100 in FIG. 1. FIGS. 25 to 28 illustrate examples in which a read request of columns of memory units MUC of the memory groups MG10 and MG11 is issued, and then, a read request of columns of memory units MUC of the memory groups MG40 and MG41 is issued.

Operations of the respective circuit elements in FIGS. 25 to 28 are substantially the same as the operations of the respective circuit elements illustrated in FIGS. 21 to 24, except that two read requests are issued sequentially. In other words, in FIGS. 25 to 28, operations for each of the read requests are substantially the same as the operations illustrated in FIGS. 21 to 24.

In this embodiment, the access request signal, the memory write data signal D, and the memory read data signal Q can be transferred between the memory group control units MCNT in a pipeline fashion. Therefore, for example, before the memory block MBLK outputs the memory read data signal Q in response to one read request, other read requests can be sequentially supplied to the memory block MBLK. Accordingly, as illustrated in FIGS. 25 to 28, the memory groups MG40 and MG41 can be read-accessed in the next clock cycle after the read access to the memory groups MG10 and MG11.

Figure 29:
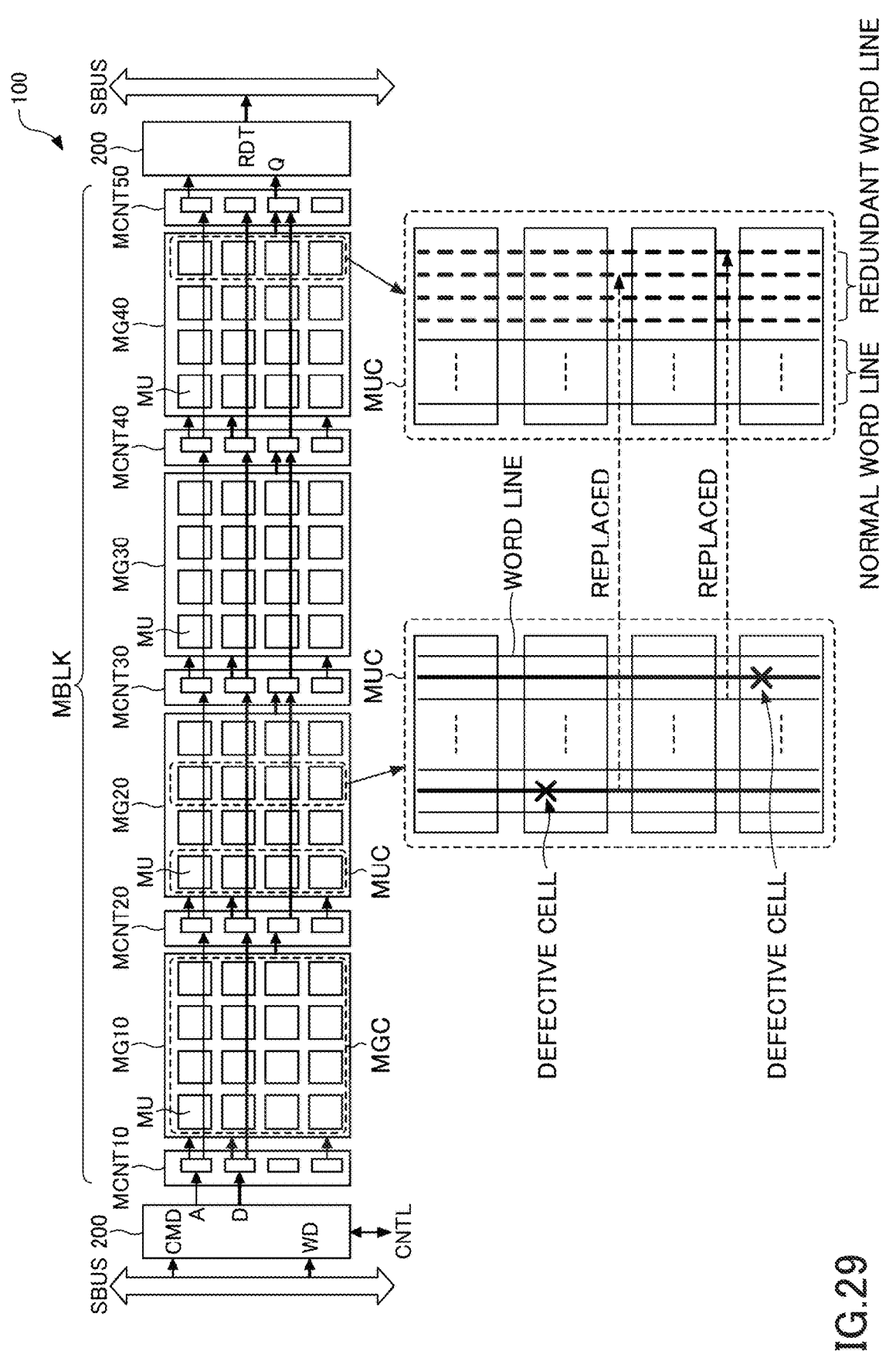
FIG. 29 is a block diagram illustrating an example of a redundant circuit installed in the memory circuit in FIG. 1.

FIG. 29 illustrates an example of a redundant circuit installed in the memory circuit 100 in FIG. 1. In FIG. 29, in order to make the description easier to understand, illustration of the memory groups MG11, MG21, MG31, and MG41, and the memory group control units MCNT11, MCNT21, MCNT31, MCNT41, and MCNT51 is omitted. The redundant circuits corresponding to the memory groups MG11 to MG41 are the same as those corresponding to the memory groups MG10 to MG40.

In order to improve the yield as the percentage of good products, semiconductor memories such as SRAMs normally include redundant memory cells that are operated in place of defective memory cells, separately from memory cells of the required capacity in the memory. Then, in the case where defective memory cells are detected in an operation test in a manufacturing step of semiconductor memories, for example, defective memory cells are replaced with redundant memory cells so that the redundant memory cells are used in place of the defective memory cells. The replacement unit of the word line may be one line or may be four lines.

In the present embodiment, as illustrated in FIG. 29, in the memory group MG40, a predetermined number of normal word lines of a column of memory units MUC adjacent to the memory control unit 200 are used as redundant word lines. In FIG. 29, although four redundant word lines are illustrated, the number of redundant word lines is not limited to four. For example, in the case where the memory circuit 100 is used as a frame memory for image processing as an application of the memory circuit 100, the total memory capacity of the memory block MBLK may not be used entirely because the amount of memory usage is determined by the image size or the like.

For example, the redundant word lines are allocated to the column of memory units MUC adjacent to the memory control unit 200 (input side or output side) in at least one of the memory groups MG40 and MG10, commonly with respect to all the memory groups MG10 to MG40. Taking the memory unit MU illustrated in FIG. 29 as a unit memory, the circuit size of the redundant circuit can be reduced as compared with the case of providing redundant memory cells in each of the 64 memory units MU.

Defect information on addresses indicating defective memory cells (or defective words) detected in the operation test of the memory circuit 100, redundant addresses indicating redundant word lines as replacements, and the like are stored in a non-volatile memory such as e-Fuse provided in the memory circuit 100. Further, the memory circuit 100 may execute a self-test when activating the memory circuit 100 to detect defective memory cells, and store defect information on defective addresses indicating the detected defective memory cells and the like in a volatile memory or a non-volatile memory. In the case of storing in a volatile memory, the self-test upon activation is necessary every time the power supply is turned on, whereas in the case of storing in a non-volatile memory, the self-test is not necessary when the power supply is turned on for the second time and thereafter.

The memory control unit 200 reads defect information from the non-volatile memory when activating the memory circuit 100, and stores the information in a register or the like of the memory state management unit 212. The input interface control unit 214 refers to the memory state management unit 212 when accessing the memory block MBLK, and determines whether or not the accessing address is a defective address. In the case where the accessing address is a defective address, the input interface control unit 214 outputs a redundant address to the memory group control unit MCNT10 (MCNT11) instead of the defective address.

Note that the memory circuit 100 may have redundant memory cells for each of memory groups MG, memory units MU, or memories MEM.

Figure 30:
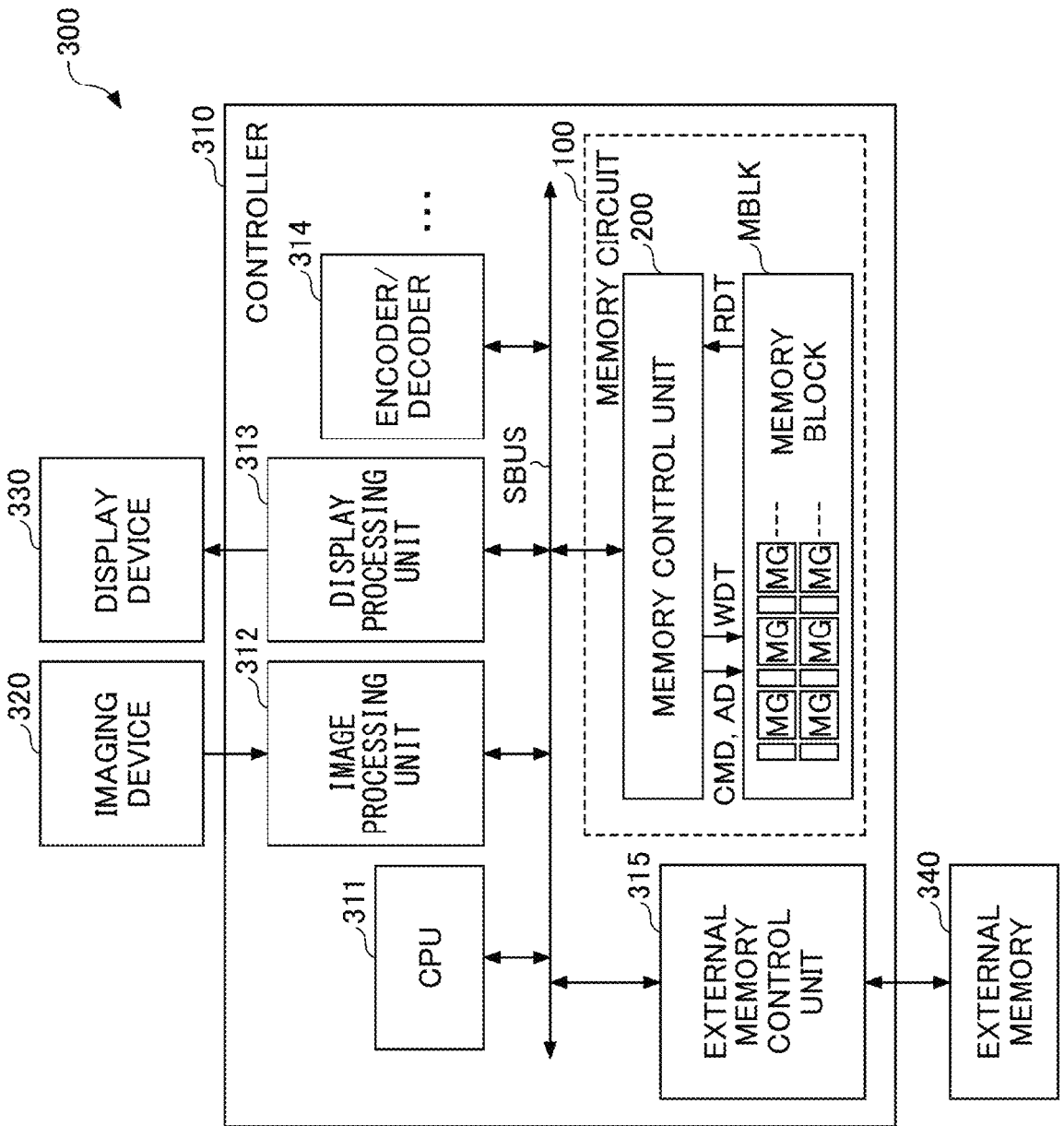
FIG. 30 is a block diagram illustrating an example of a system in which the memory circuit in FIG. 1 is installed.

FIG. 30 illustrates an example of a system 300 in which the memory circuit 100 in FIG. 1 is installed. For example, the system 300 may be a head-mount device such as AR/VR glasses, a digital camera, a game machine, or the like capable of processing moving images. Note that the system 300 may be an image processing system installed in a vehicle. In addition, the system in which the memory circuit 100 is installed is not limited to having the configuration of the system 300.

The system 300 includes a controller 310, an imaging device 320, a display device 330, and an external memory 340. The controller 310 includes a CPU 311, an image processing unit 312, a display processing unit 313, an encoder/decoder 314, an external memory control unit 315, and a memory circuit 100 illustrated in FIG. 1 that are connected to each other through a system bus SBUS. For example, the controller 310 may be designed as a system LSI.

The CPU 311 controls the entire system 300. The image processing unit 312 processes image data obtained by the imaging device 320, converts the processed image data into frame image data that can be displayed on the display device 330, and stores the frame image data in the memory circuit 100. The display processing unit 313 reads the frame image data from the memory circuit 100, and displays an image on the display device 330. The encoder/decoder 314 encodes the image data before the data is stored in the memory circuit 100, and decodes compressed image data read from the memory circuit 100. The external memory control unit 315 controls access of the external memory 340 such as a DRAM (Dynamic Random Access Memory).

For example, the resolution of moving images handled by the system 300 is VGA (Video Graphics Array), full HD, 4K, or the like. The memory circuit 100 of the system 300 is equipped with a quantity of memory groups MG (not illustrated) corresponding to the resolution of the moving image. As described above, even in the case where the number of installed memory groups MG increases or decreases, the clock cycles required for transferring a signal between the memory group control units MCNT remains unchanged, and hence, the timing design can be performed easily and the increase in access time can be suppressed.

Figure 31:
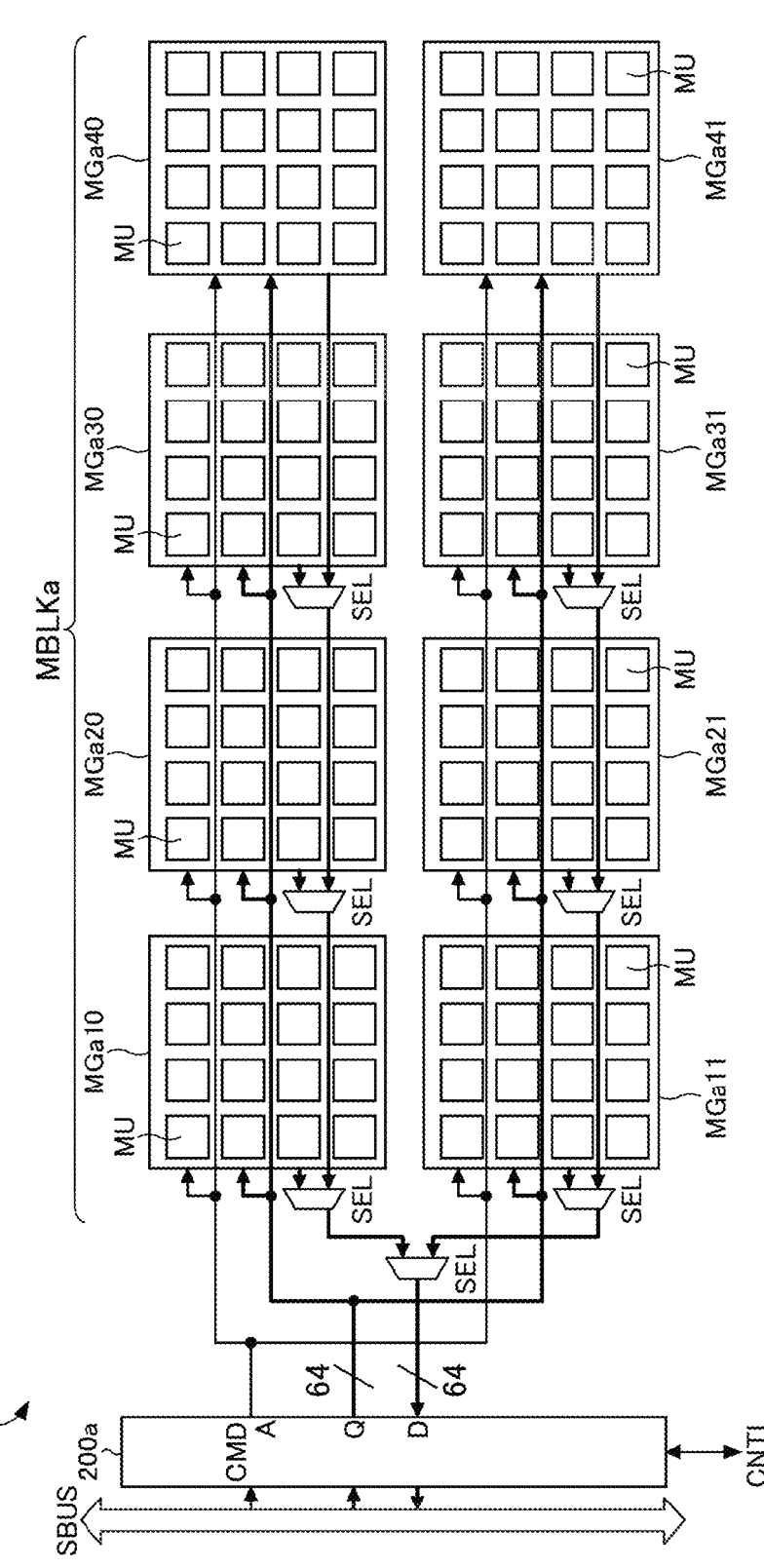
FIG. 31 is a block diagram illustrating an example of another memory circuit.

FIG. 31 illustrates an example of another memory circuit 400. Detailed description of elements substantially the same as in FIGS. 1 to 3 will be omitted. The memory circuit 400 includes a memory block MBLKa that includes multiple memory groups MGa, and a memory control unit 200a. The memory block MBLKa does not have a memory group control unit MCNT unlike the memory block MBLK in FIG. 3. In addition, each of the memory groups MGa selects, upon memory access, one of four memory units MU aligned in a direction orthogonal to the arrangement direction of the memory groups MGa10, MGa20, MGa30, and MGa40, and inputs and outputs 64-bit data.

The memory control unit 200a accesses the memory group MGa in units of 64 bits, in response to an access request signal (a write request signal or a read request signal) received via the system bus SBUS. In addition, the memory control unit 200a is arranged adjacent to the memory groups MGa10 and MGa11. Therefore, for example, read data read from the memory group MGa40 passes over the memory groups MGa30, MGa20, and MGa10, to be transmitted to the memory control unit 200.

Further, the memory circuit 400 has no memory group control unit MCNT between the memory groups MGa. Therefore, the memory control unit 200a outputs a memory write data signal D to a write data line commonly provided for the memory groups MGa10, MGa20, MGa30, and MGa40. The memory control unit 200a receives a memory read data signal Q from, for example, a read data line commonly provided for the memory groups MGa10, MGa20, MGa30, and MGa40. Note that the memory block MBLKa includes a selector SEL for avoiding collision of memory read data signals Q output from the respective memory groups MGa.

Figure 32:
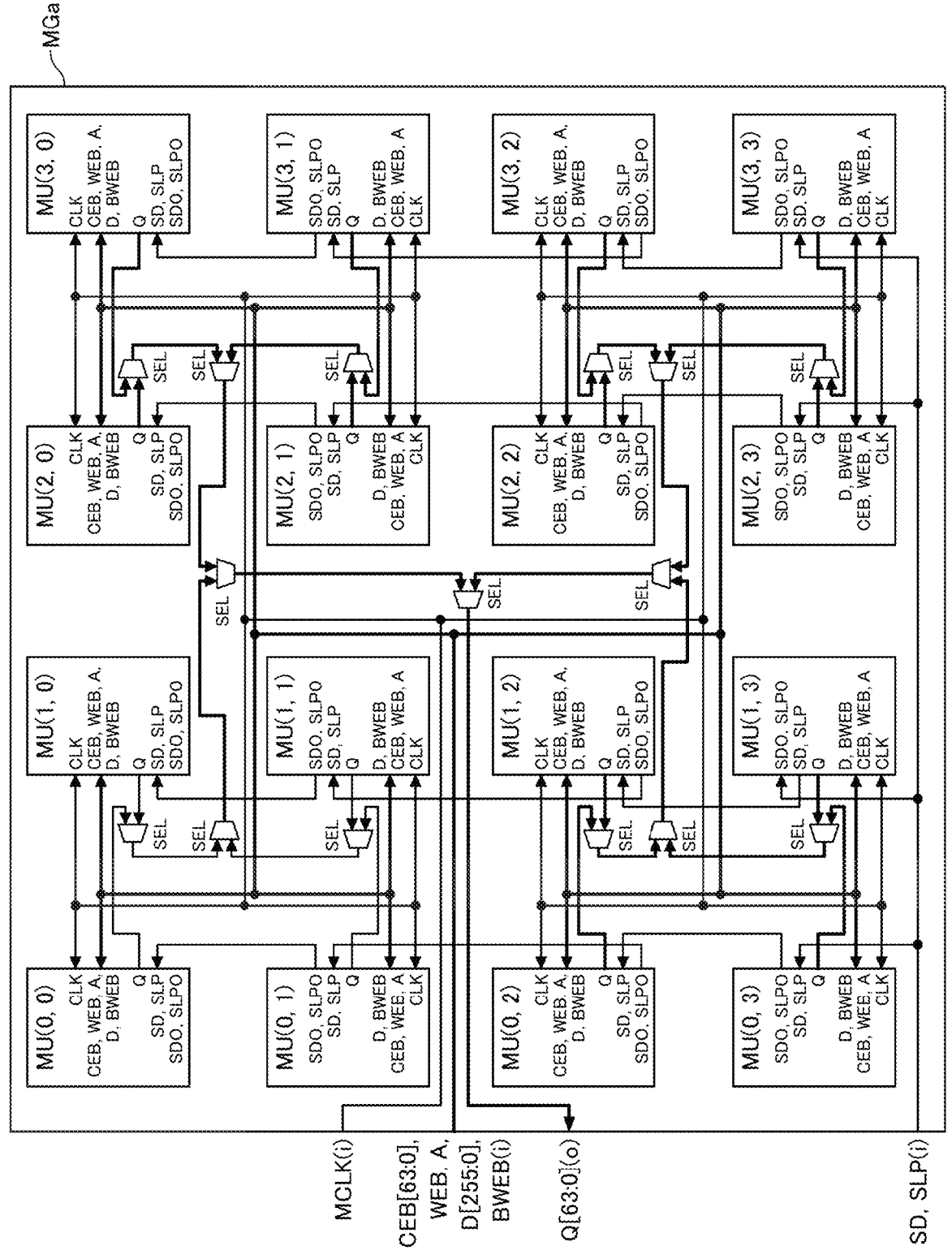
FIG. 32 is a block diagram illustrating an example of a configuration of the memory group in FIG. 31.

FIG. 32 illustrates an example of a configuration of the memory group MGa illustrated in FIG. 31. The memory group MGa includes 16 memory units MU, as in the case of the memory group MG illustrated in FIG. 4. The memory group MGa transmits a 64-bit memory read data signal Q output from each of the memory units MU to a read data terminal Q of the memory group MGa via four selectors SEL. In addition, the memory group MGa commonly supplies a memory write data signal D received at a 64-bit write data terminal D to each of the memory units MU. A 64-bit chip enable signal CEB received by the memory group MG is divided into 4-bit signals and supplied to corresponding memory units MU, to be used for selecting a memory unit MUC and a column of memories MEMC in the memory unit MU.

Figure 33:
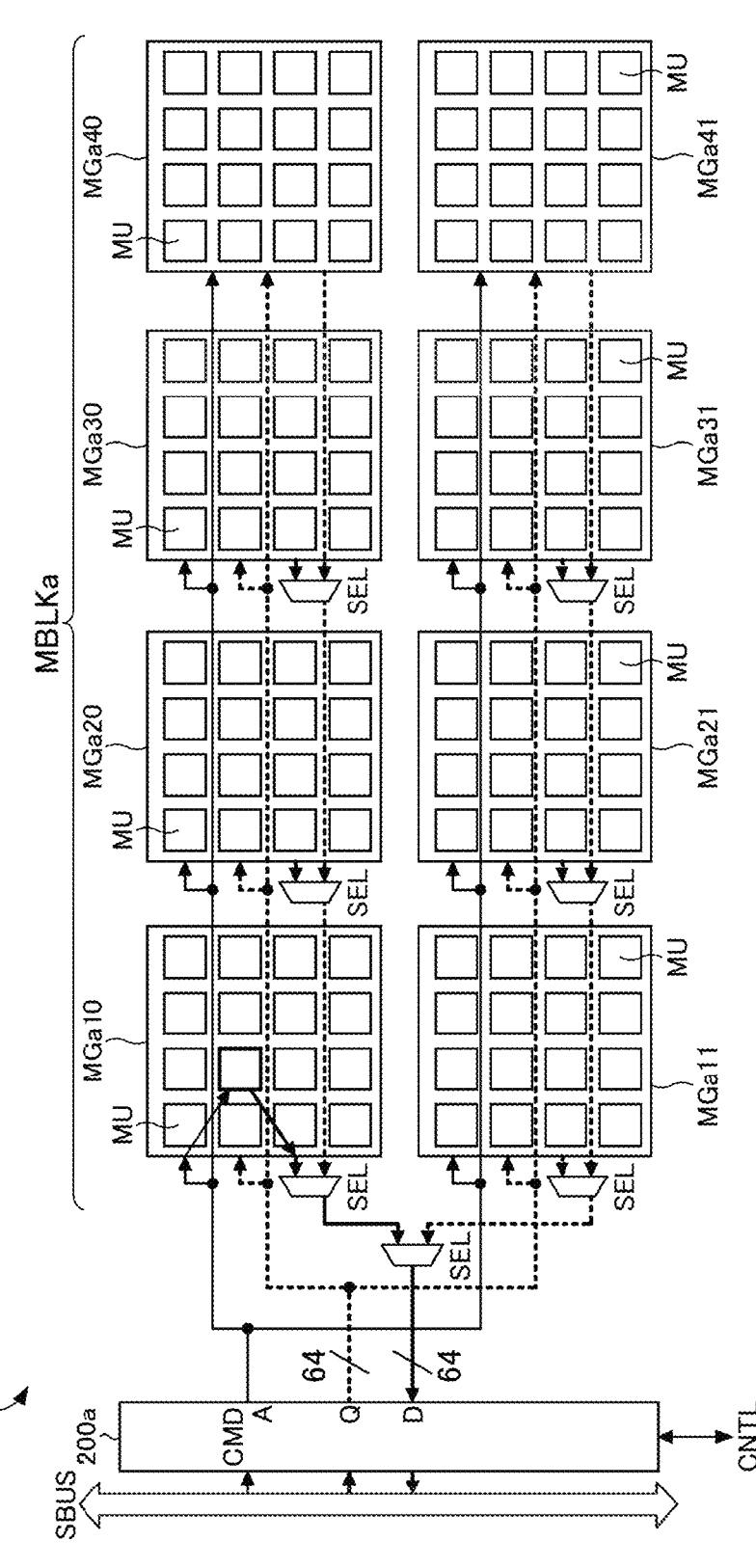
FIG. 33 is an explanatory diagram illustrating an example of a read operation of the memory circuit in FIG. 31.

FIG. 33 illustrates an example of a read operation of the memory circuit 400 in FIG. 31. In the example in FIG. 33, the memory control unit 200a receives a read request to a memory unit MU of the memory group MGa10 that is close to the memory control unit 200a.

The memory control unit 200a outputs a control signal CMD and an address signal A to all of the memory groups MG. The command line CMD and the address line A are routed in common to all of the memory groups MG, and hence, the load capacity becomes greater and the propagation delay time becomes longer as compared to the case of arranging the memory group control units MCNT.

The memory control unit 200a receives the 64-bit memory read data signal Q read from the memory unit MU as the read access target via the selector SEL, and outputs the signal to the system bus SBUS. In this way, the memory circuit 400 executes a 64-bit read operation to the memory block MBLKa for each read request supplied via the system bus SBUS.

Therefore, the memory circuit 400 has a lower read rate of the memory read data signal Q as compared to the memory circuit 100 in FIG. 1 that executes a 512-bit read operation for each read request. Further, the memory circuit 400 accesses the memory block MBLKa at the same frequency as the frequency of the read request signal supplied through the system bus SBUS. Therefore, the timing design of read control of the memory circuit 400 becomes more difficult as compared to the case of the memory circuit 100.

Note that in a write request, as in a read request, the write rate of the memory write data signal D becomes lower as compared to the case of the memory circuit 100 illustrated in FIG. 1, and the timing design of the write control of the memory circuit 400 becomes more difficult as compared to the case of the memory circuit 100.

Figure 34:
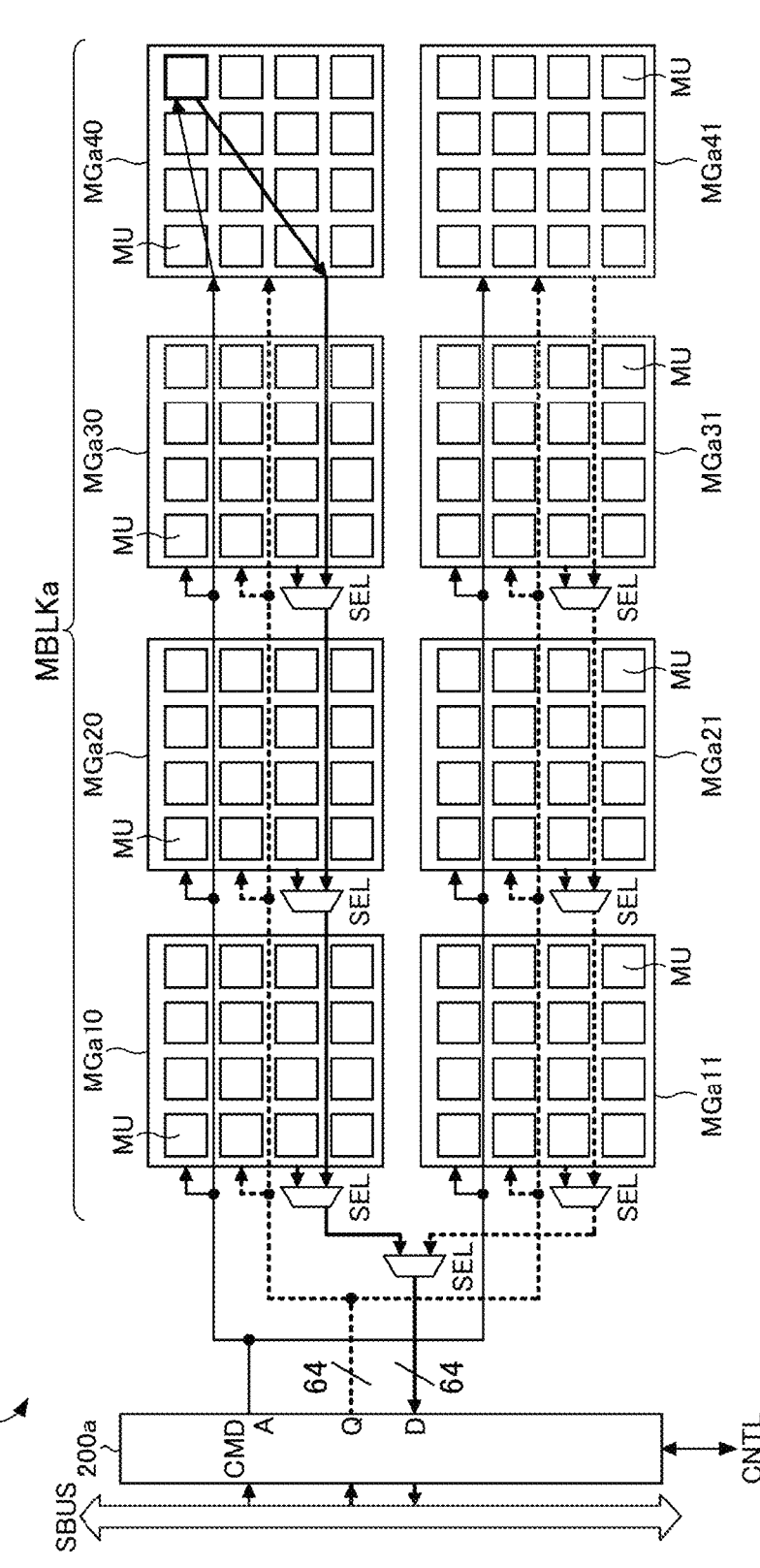
FIG. 34 is an explanatory diagram illustrating another example of a read operation of the memory circuit in FIG. 31.

FIG. 34 illustrates another example of a read operation of the memory circuit 400 in FIG. 31. Detailed description of operations substantially the same as in FIG. 33 will be omitted. In the example in FIG. 34, the memory control unit 200a receives a read request to a memory unit MU of the memory group MGa40 that is away from the memory control unit 200a.

The memory control unit 200a sequentially receives 64-bit memory read data signals Q read from the memory unit MU of the memory group MGa40 as the read access target via the multiple selectors SEL, and outputs the signal to the system bus SBUS. The read data line Q is commonly routed to all of the memory groups MG, and hence, the load is greater and the propagation delay time is longer.

In addition, in read access of the memory group MGa40 that is away from the memory control unit 200a, each of the control signal CMD, the address signal A, and the memory read data signal Q is transmitted across the four memory groups MG. The timing design of the memory circuit 400 is performed assuming the worst case. Therefore, the timing specifications of read access of the memory circuit 400 are determined under limitation of the access timing of the memory group MGa40.

As above, in the first embodiment, the memory group control unit MCNT is provided for each of the multiple memory groups MG. In the case where an access request signal indicates the own memory group MG, each of the memory group control units MCNT outputs the access request signal to the own memory group MG. In the case where the access request signal indicates a group other than the own memory group MG, each of the memory group control units MCNT transfers the access request signal to the memory group control unit MCNT at the succeeding stage. Accordingly, access can be controlled for each of the memory groups MG by each of the memory group control units MCNT. The command line CMD and the address line A are not routed across multiple memory groups MG, and thereby, increase in interconnect load can be suppressed. As a result, increase in power consumption can be suppressed while suppressing increase in access time of the memory circuit 100.

In a write operation, the control signal CMD, the address signal A, and the memory write data signal D are not transferred beyond the memory group control unit MCNT corresponding to the memory group MG as the write target. In a read operation, the control signal CMD and the address signal A are supplied to the memory group MG as the read target, and not to the memory groups MG that are not the read target. Accordingly, for example, compared with the case where the control signal CMD, the address signal A, and the memory write data signal D are commonly supplied to each of the memory groups MG, charge and discharge currents of the command line CMD, the address line A, and the write data line D can be suppressed. As a result, increase in power consumption can be further suppressed while further suppressing increase in access time of the memory circuit 100.

The memory group control unit MCNT includes the selector SELQ that selects a memory read data signal Q from the memory group MG at the preceding stage or a memory read data signal Q from the memory group control unit MCNT at the preceding stage, and transfers the selected signal to the memory group control unit MCNT at the succeeding stage. Accordingly, regardless of the location of the memory group MG that outputs the memory read data signal Q, the memory read data signal Q can be transferred to the memory control unit 200.

The memory circuit 100 includes the memory group control units MCNT and the memory groups MG arranged alternately between the memory control unit 200 (on the input side) and the memory control unit 200 (on the output side). In a read operation, the memory block MBLK can receive an access request signal from the memory control unit 200 (on the input side), and output a memory read data signal Q to the memory control unit 200 (on the output side). Accordingly, the sum of the length of a signal line that transfers the access request signal from the memory control unit 200 to the memory group MG as the read target and the length of a signal line that transfers the memory read data signal Q to the memory control unit 200 can be made virtually constant regardless of the access location. As a result, the fluctuation of the read-access time that would occur depending on the location of the memory group MG that executes the read operation can be suppressed.

The memory control unit 200 aggregates multiple write data signals WD received from the system bus SBUS into a memory write data signal D, and causes the memory group MG to execute the write operation of the memory write data signal D. In addition, the memory control unit 200 converts a memory read data signal Q read from the memory group MG into multiple read data signals RDT, and outputs the converted signals to the system bus SBUS. Accordingly, the operating frequency of the memory block MBLK can be made lower than the operating frequency of the system bus SBUS, and the power consumption of the memory block MBLK can be reduced. The operating frequency of the memory block MBLK can be reduced, and hence, the operating margin of the memory group control unit MCNT and the memory group MG can be set to have some room, and the timing design and the like of the circuit can be performed easily.

Each of the memory group control units MCNT sets a column of memory units MUC that is caused to execute a write operation or a read operation to the active mode ACT, and sets the other columns of memory units MUC to the shutdown mode SD or the sleep mode SLP. Accordingly, the power consumption of the memory circuit 100 can be suppressed. In addition, by switching a column of memory units MUC that does not execute a write operation or a read operation for a predetermined period of time from the active mode ACT to the sleep mode SLP, each of the memory group control units MCNT can further reduce the power consumption of the memory circuit 100.

The respective numbers of clock cycles required for transfer of the access request signal, the memory write data signal D, and the memory read data signal Q between a pair of memory group control units MCNTs arranged on both sides of the memory group MG are set to be the same as each other. Accordingly, also in the case where the number of memory groups MG is increased or decreased to newly design another memory circuit having a different memory capacity, timing design can also be easily performed.

Redundant word lines for rescuing defective memory cells are commonly provided in the multiple memory groups MG in the memory group MG that is close to at least one of the memory group control units MCNT10 and MCNT50. Accordingly, as compared to the case where redundant word lines are provided for each of the memory groups MG, the circuit size of the redundant circuit can be reduced.

As above, the present invention has been described based on the respective embodiments; note that the present disclosure is not limited to the requirements set forth in the embodiments described above. These requirements can be changed within a scope to the extent that they do not depart from the gist of the present inventive concept, and can be suitably defined according to applications.

What is claimed is:

1. A memory circuit comprising:
   a plurality of memory groups each of which includes a plurality of memory cells, and is configured to execute a write operation or a read operation in response to a request signal;
   a plurality of memory group controllers each of which is provided for a corresponding one of the plurality of memory groups; and
   a first memory controller configured to output a request signal received from an outside to an adjacent memory group controller,
   wherein, in a case where an address signal included in the received request signal indicates the corresponding one of the memory groups, said each of the plurality of memory group controllers outputs the request signal to the corresponding one of the memory groups, and in a case where the address signal indicates a memory group other than the corresponding one of the memory groups, outputs the request signal to a memory group controller at a succeeding stage,
   wherein each of the plurality of memory groups includes one or more sub-memory groups each of which is set to either a low-power mode in which power consumption is suppressed while holding data, or an active mode in which a write operation or a read operation can be executed, and
   wherein the memory group controller corresponding to said each of the plurality of memory groups sets a sub-memory group in which a write operation or a read operation is to be executed to the active mode, and sets a sub-memory group that does not execute a write operation or a read operation for a predetermined period of time to the low-power mode.

2. The memory circuit as claimed in claim 1, wherein the first memory controller outputs a write request signal as the request signal together with a write data signal, and wherein, in the case where the address signal indicates the corresponding one of the memory groups, said each of the plurality of memory group controllers outputs the write request signal and the write data signal to the corresponding one of the memory groups, and suppresses output of the write request signal and the write data signal to the memory group controller at the succeeding stage.

3. The memory circuit as claimed in claim 2, wherein the first memory controller converts M N-bit write data signals received from the outside into an (N×M)-bit write data signal, and outputs the (N×M)-bit write data signal to the memory group controller, where M is an integer greater than or equal to two, and N is an integer greater than or equal to one.

4. The memory circuit as claimed in claim 1, wherein the first memory controller outputs a read request signal as the request signal, and wherein, in the case where the address signal indicates the corresponding one of the memory groups, said each of the plurality of memory group controllers outputs the read request signal to the corresponding one of the memory groups, and in the case where the address signal indicates a memory group other than the corresponding one of the memory groups, suppresses output of the read request signal to the corresponding one of the memory groups.

5. The memory circuit as claimed in claim 4, wherein a memory group controller at a second stage or thereafter among the plurality of memory group controllers includes a selector configured to select a read data signal output from a memory group corresponding to a memory group controller at a preceding stage or a read data signal transferred from the memory group controller at the preceding stage, according to the address signal included in the read request signal.

6. The memory circuit as claimed in claim 4, further comprising:

a memory group controller and a second memory controller on a succeeding stage side of a memory group at a last stage among the plurality of memory groups, wherein the memory group controllers and the memory groups are arranged alternately, and wherein a read data signal from one of the plurality of memory groups is transferred from a memory group controller at a last stage to the second memory controller, and output from the second memory controller to the outside.

7. The memory circuit as claimed in claim 6, wherein the second memory controller converts an (N×M)-bit read data signal received from the memory group controller at the last stage into M N-bit read data signals, and outputs the M N-bit read data signals to the outside, where M is an integer greater than or equal to two, and N is an integer greater than or equal to one.

8. The memory circuit as claimed in claim 1, wherein respective numbers of clock cycles required for transfer of an access request signal, a write data signal, and a read data signal between a pair of memory group controllers arranged on both sides of said each of the plurality of memory groups are the same as each other.

9. The memory circuit as claimed in claim 1, wherein each of the plurality of memory groups includes a plurality of word lines connected to a predetermined number of memory cells, and wherein a redundant word line configured to rescue a defective memory cell is assigned to at least one of word lines of a memory group farthest from the first memory controller or a memory group nearest to the first memory controller.

* * * * *